United States Patent [19]

Barello

[11] 4,354,241

[45] Oct. 12, 1982

[54] PROGRAMMABLE ELECTRONIC REAL-TIME LOAD CONTROLLER PROVIDING FOR ADAPTATION OF LOAD CONTROL IN RESPONSE TO VARYING ENVIRONMENTAL CONDITIONS

[75] Inventor: Lawrence J. Barello, Seattle, Wash.

[73] Assignee: Butler Manufacturing Company, Kansas City, Mo.

[21] Appl. No.: 107,554

[22] Filed: Dec. 27, 1979

[51] Int. Cl.$^3$ .................. H02J 13/00; G06F 15/56
[52] U.S. Cl. ...................... 364/492; 307/41; 340/825.06; 364/130; 364/152
[58] Field of Search ............... 364/492, 493, 506, 101; 307/35, 39, 38, 41; 340/147 R

[56] References Cited

U.S. PATENT DOCUMENTS

| | | | |
|---|---|---|---|
| 3,555,251 | 1/1971 | Shavit | 364/493 X |
| 3,964,676 | 6/1976 | Rooks et al. | 236/46 R |
| 4,031,406 | 6/1977 | Leyde et al. | 307/41 |
| 4,034,233 | 7/1977 | Leyde | 307/41 |
| 4,064,485 | 12/1977 | Leyde | 340/147 R |
| 4,071,745 | 1/1978 | Hall | 364/104 |
| 4,136,392 | 1/1979 | Westphal et al. | 364/492 |
| 4,153,936 | 5/1979 | Schmitz et al. | 364/493 |
| 4,228,511 | 10/1980 | Simcoe et al. | 364/493 X |

Primary Examiner—Edward J. Wise
Attorney, Agent, or Firm—Christensen, O'Connor, Johnson & Kindness

[57] ABSTRACT

A programmable electronic real-time load controller includes: a plurality of load control circuits, each being adapted to be interconnected with a load; a hardware clock; and a data processor for executing a set of program instructions stored in a program memory to effect real-time control of the load control circuits by comparing real-time information from the hardware clock with a time schedule stored in an event memory of the data processor. The time schedule is in the form of one or more control events and corresponding event times for each load, with each control event representing a period of time during each predetermined control interval subsequent to its corresponding event time that a load is to be on. In order to permit the controller to adapt the time schedule to varying environmental conditions, the controller is provided with additional components including a second program memory, at least one indoor temperature sensor, and an outdoor temperature sensor. Environmentally-adaptive modifications to real-time control include: an advance start modification, in which an event time associated with a load is advanced in relation to the deviation of outdoor temperature from a first reference temperature; a duty-cycle shift modification, in which the on-time of a load currently being duty-cycled in real-time is increased in relation to the deviation of indoor temperature from a second reference temperature; and, a night setback modification, in which a load is turned on whenever indoor temperature is outside predetermined high and low limits. Provision is made for effecting analog-to-digital conversion of the temperatures; for selecting any load for each of the various modifications; for grouping the loads at the facility into first and second zones, and by providing an indoor temperature sensor for each zone; for selecting the value of a zone deadband for the duty-cycle shift modification; and, for selectively displaying information related to real-time control, or, the various indoor and outdoor temperatures and an advance time computed in the advance start modification.

46 Claims, 45 Drawing Figures

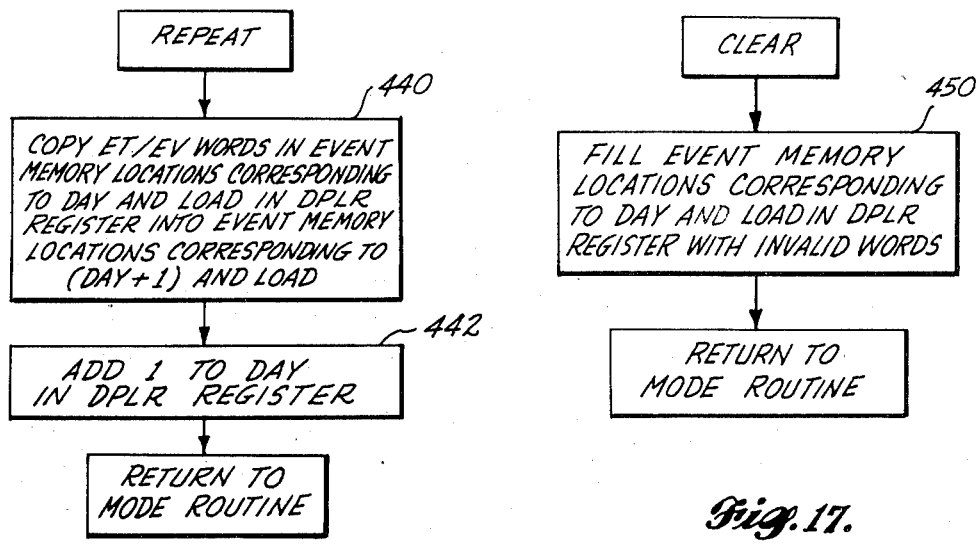
Fig. 16.
Fig. 17.
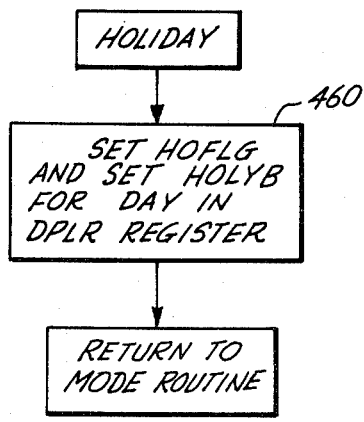
Fig. 18.
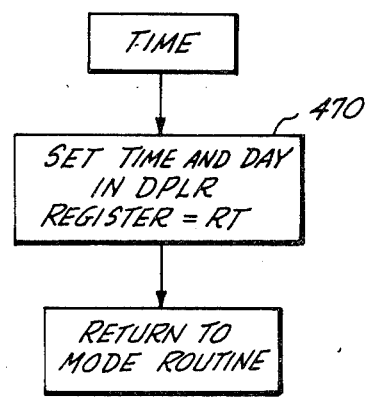
Fig. 19.

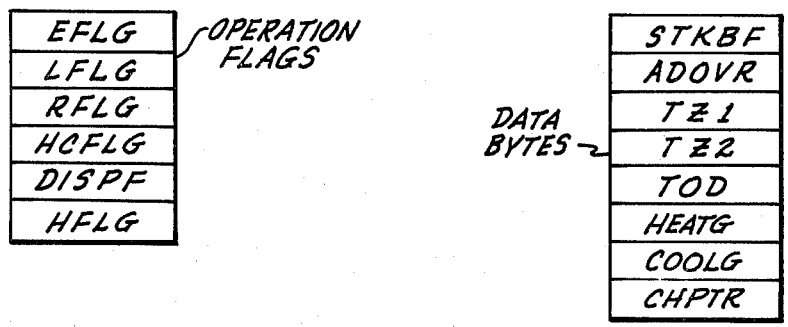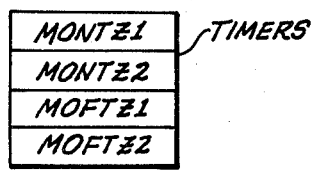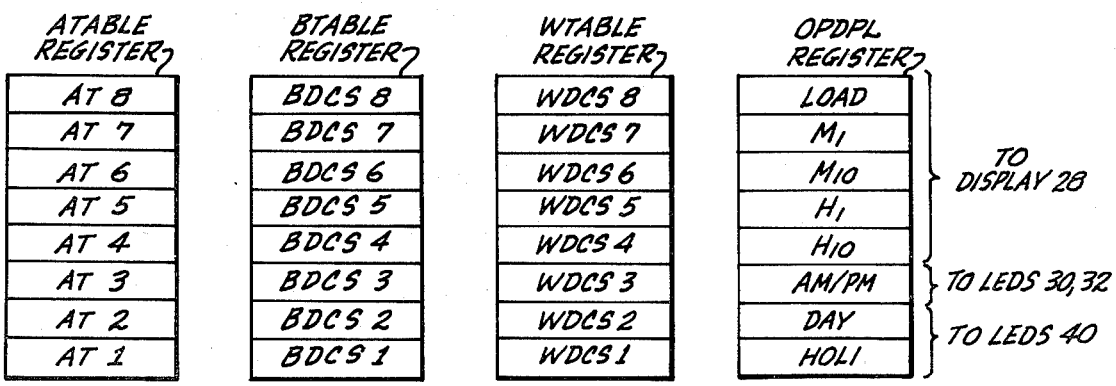
Fig. 23.
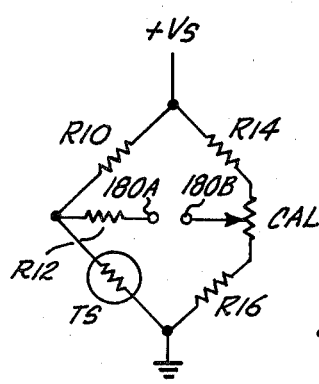
Fig. 22(a).

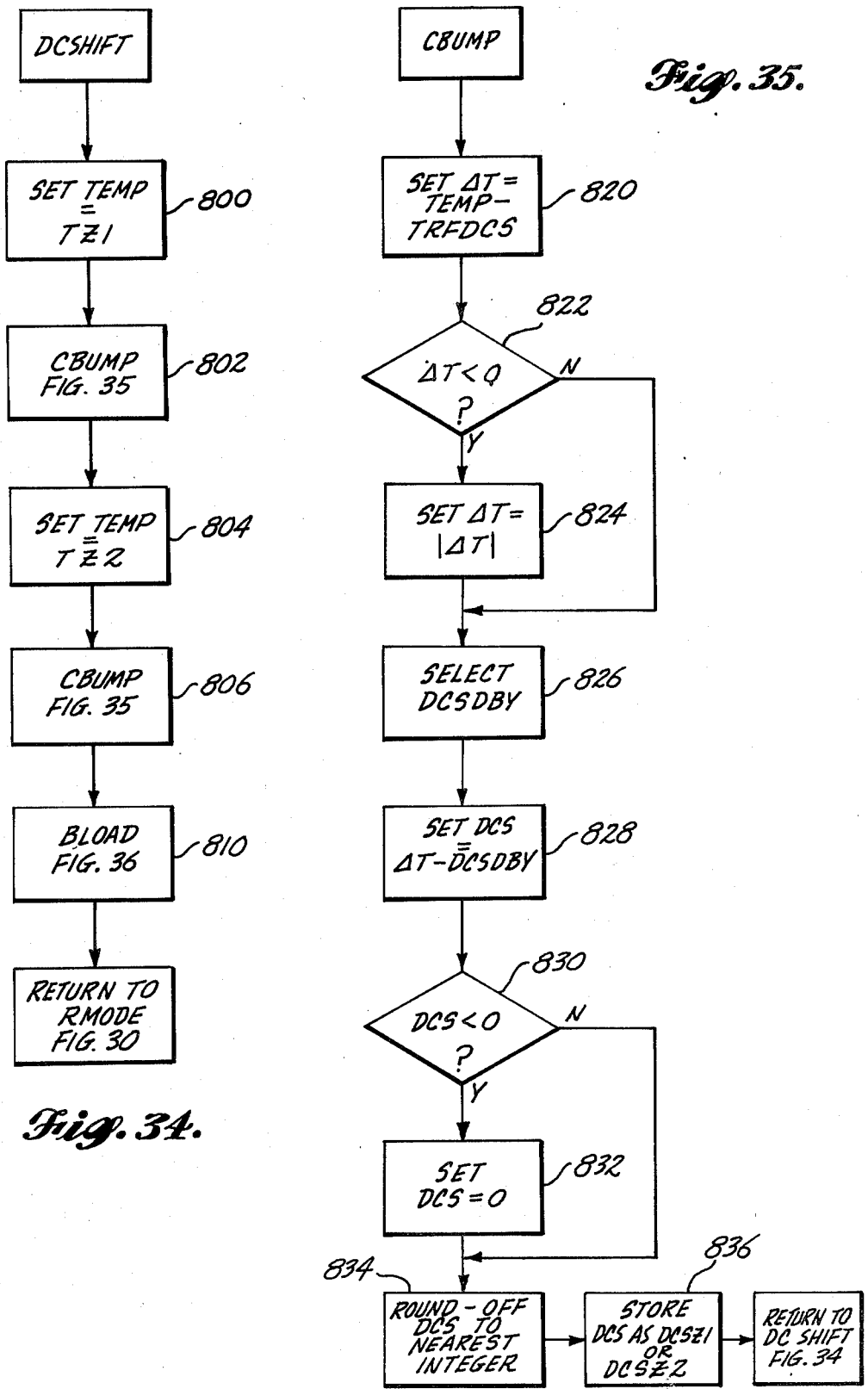

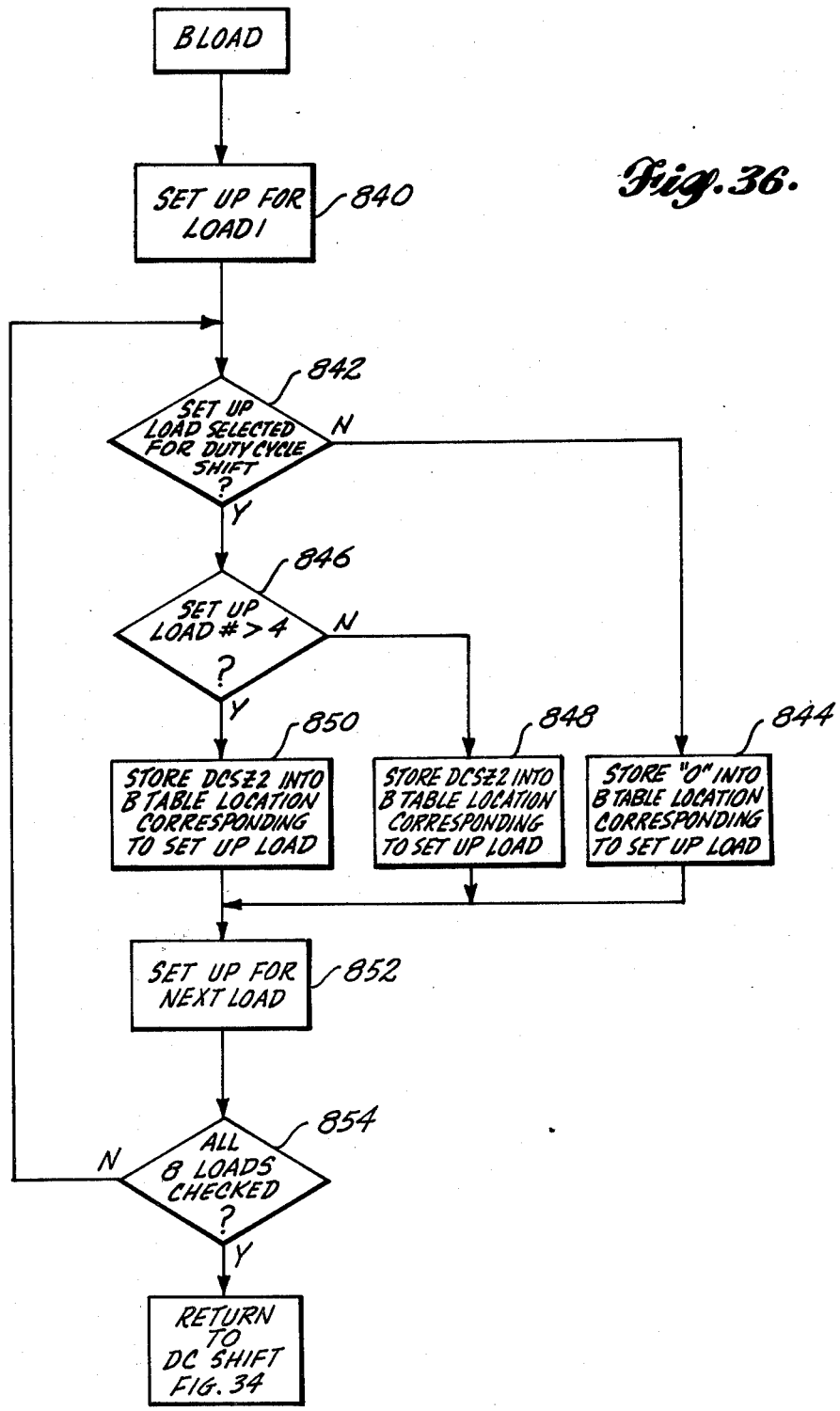

PROGRAMMABLE ELECTRONIC REAL-TIME LOAD CONTROLLER PROVIDING FOR ADAPTATION OF LOAD CONTROL IN RESPONSE TO VARYING ENVIRONMENTAL CONDITIONS

FIELD OF THE INVENTION

This invention generally relates to apparatus for controlling the energization states of a plurality of electrical loads, and, more particularly, to such an apparatus in which such energization states are controlled in real-time in accordance with a time schedule and in which the time schedule is adapted in response to varying environmental conditions.

BACKGROUND OF THE INVENTION

As disclosed in U.S. Pat. No. 4,293,915, issued Oct. 6, 1981, entitled "Programmable Electronic Real-Time Load Controller", Carpenter et al., and assigned to the assignee of the present invention, a programmable electronic real-time load controller includes: a plurality of load control circuits, each being adapted to be interconnected with an electrical load circuit or "load"; a hardware clock; and, a programmed data processor for responding to real-time information from the hardware clock to effect control of the energization state of each load in accordance with a time schedule that has been entered by a user into the data processor. The user is permitted to flexibly program the time schedule by selecting, in advance, a number of control events and associated event times for each of the plurality of loads and for each of the plurality of days in a week. Each selected control event either causes the load to be turned on, to be turned off, or to be duty-cycled, from a time in real-time corresponding to the associated event time to a time in real-time corresponding to a subsequent event time. Accordingly, the "on time" of each load is conformed to the periods during which energization of the load is required so as to limit energy consumption at the facility at which the loads are located.

Although the real-time control effected by such a load controller provides acceptable operation under most circumstances, there are certain situations in which strict adherence to a time schedule has certain disadvantages. These situations include those in which environmental conditions external to the facility change in an unexpected and significant manner.

For example, a particular heating or cooling load may be programmed off under real-time control during a certain period of time, e.g., during times when the facility is not being used for normal business purposes, and may be programmed to be on at a certain time so as to bring the facility to a desired inside temperature at the start of the next business day. If the outdoor temperature sharply drops or rises during the time that the heating or cooling load is programmed off, the heating or cooling load will not, by adhering to the time schedule, be able to bring the indoor temperature of the facility to a desired level at the start of occupancy.

As another example, the programming off of a heating or cooling load during night hours or during other periods of nonoccupancy may result in the indoor temperature at the facility falling or rising to a level during the period of nonoccupancy that is capable of causing damage to equipment or material within the facility, that is, perishable materials may spoil or pipes may freeze.

As yet another example, duty-cycle control of a heating or a cooling load by the load controller may present problems on an especially cold or hot day, inasmuch as the reduced capacity of the heating or cooling load due to duty-cycling may be such as to make the heating or cooling load unable to maintain a desired temperature within the facility.

It is therefore an object of this invention to provide an apparatus that permits the real-time control implemented by a programmable electronic real-time load controller to be modified in accordance with changing environmental conditions.

It is another object of this invention to provide such an apparatus which causes the controller to implement an advance start feature in which the time in real-time that a selected load is turned on or duty-cycled is advanced in relation to the amount by which outdoor temperature deviates from a predetermined reference temperature.

It is yet another object of this invention to provide such an apparatus which causes the controller to implement a night setback feature in which a selected load that is programmed off by real-time control is turned on as indoor temperature at the facility deviates from a predetermined reference temperature.

It is still another object of this invention to provide such an apparatus which causes the controller to implement a duty-cycle shift feature in which the on-time of any selected load being duty-cycled is increased in relation to the amount by which indoor temperature at the facility deviates from a predetermined reference temperature.

It is a further object of this invention to provide such an apparatus which permits the user to select or deselect any given load for such advance start, night setback or duty-cycle shift features.

It is yet a further object of this invention to provide such an apparatus which senses the indoor temperatures in a plurality of zones at the facility, and which uses the sensed temperature for a particular zone to cause the controller to modify the real-time control provided for those loads associated with such zone.

It is still a further object of this invention to provide such an apparatus which can be implemented in an easy and inexpensive manner by the use of readily available, integrated circuit, microprocessor components which are compatible with and which function under control of the data processor within the controller.

SUMMARY OF THE INVENTION

In the preferred embodiment of the invention, the foregoing objects, as well as other objects and advantages that will be apparent from a consideration of the specification, are achieved in an apparatus that permits an electronic controller, adapted to provide real-time control of the energization states of a plurality of electrical loads in accordance with a time schedule, to also provide environmentally-adaptive modifications of the time schedule in accordance with temperature at a facility at which the loads are located.

The controller is of a type that includes: clock means determining real-time; an event memory storing the time schedule in the form of one or more control events and corresponding event times for each load, each control event representing a period of time during each predetermined control interval subsequent to its corresponding event time that a load is to be on; a program memory storing a set of program instructions for real-time control; and, a processing means for executing the set of program instructions to effect real-time control by comparing real-time from the clock means with the time schedule in the event memory, by accordingly determining an on state or an off state for each load, and by energizing those loads in an on state and by deenergizing those loads in an off state.

The apparatus comprises a second program memory storing a set of program instructions for the environmentally-adaptive modifications to real-time control. Means are provided for developing a first analog signal representing an indoor temperature at the facility and a second analog signal representing outdoor temperature at the facility. A digital-to-analog signal conversion means is provided for converting a first digital input signal into a corresponding analog signal, and a comparator is provided for comparing either the first analog signal or the second analog signal with the analog signal from the digital-to-analog signal conversion means to provide a first digital output signal representative of the difference therebetween. Selecting means are also provided for selectively supplying either the first analog signal or the second analog signal to the comparator in response to a second digital input signal. Means are provided for respectively transferring the first digital input signal from the processing means to the digital-to-analog signal conversion means, the second digital input signal from the processing means to the selecting means, and the first digital output signal to the processing means.

The processing means is operative to also execute the set of program instructions stored in the second program memory to effect the environmentally-adaptive modifications by:

effecting analog-to-digital conversion of the indoor temperature and the outdoor temperature through the selective supplying of the first digital input signal to the digital-to-analog signal conversion means, the selective supplying of the second digital input signal to the selecting means, and the selective monitoring of the first digital output signal from the comparator;

implementing an advance start modification through advancing an event time for a load, in relation to the deviation of the outdoor temperature from a first reference temperature;

implementing a duty-cycle shift modification through increasing the time that a load is in the on state during each control interval, in relation to the deviation of the indoor temperature from a second reference temperature; and, implementing a night setback modification through determining an on state for a load whenever the indoor temperature exceeds predetermined high and low limits thereof.

The foregoing objects, as well as other objects and advantages, are also achieved in an electronic controller for controlling the energization states of a plurality of electrical loads. The controller comprises: a plurality of load control circuits, each load circuit being adapted to be interconnected with a load, and having a load-on state when its load is to be on, and a load-off state when its load is to be off; clock means for determining real-time; sensor means for sensing at least one environmental temperature at a facility at which the plurality of electrical loads are located; event memory means storing a time schedule for real-time control of the plurality of electrical loads; program memory means storing a set of program instructions; and, a processing means responsive to the set of program instructions.

The processing means is operative to: obtain the time schedule from the event memory means; obtain a sensed environmental temperature from the sensor means; modify the time schedule in accordance with the sensed environmental temperature; obtain real-time from the clock means; and, place the load control circuit for each load in its load-on and its load-off states by comparing real-time with the modified time schedule.

Brief Description of the Drawings

The invention can best be understood by reference to the following portion of the specification, taken in conjunction with the accompanying drawings, in which:

FIG. 16 is a flow chart of the program steps undertaken by the microprocessor in a REPEAT subroutine;

FIG. 17 is a flow chart of the program steps undertaken by the microprocessor in a CLEAR subroutine;

FIG. 18 is a flow chart of the program steps undertaken by the microprocessor in a HOLIDAY subroutine;

FIG. 19 is a flow chart of the program steps undertaken by the microprocessor in a TIME subroutine;

FIG. 22(a) is a schematic diagram of a Wheatstone bridge circuit forming part of the apparatus in FIG. 22;

FIG. 23 is a schematic representation of additional operation flags, timers, data bytes, and registers contained within the scratch pad memory within the microprocessor and required for the environmental adaptation of real-time control;

FIG. 34 is a flow chart of the program steps undertaken by the microprocessor in a DCSHIFT subroutine;

FIG. 35 is a flow chart of the program steps undertaken by the microprocessor in a CBUMP subroutine;

FIG. 36 is a flow chart of the program steps undertaken by the microprocessor in a BLOAD subroutine;

DESCRIPTION OF A PREFERRED EMBODIMENT

GENERAL DESCRIPTION OF PROGRAMMABLE ELECTRONIC REAL-TIME LOAD CONTROLLER

The apparatus of the present invention is particularly adapted for use with a programmable electronic real-time load controller of the type described and claimed in U.S. Pat. No. 4,293,915. In particular, the apparatus is embodied in a set of components, and associated interconnections, that are mounted on a printed circuit card (FIG. 22) adapted to be inserted into the housing of the controller and interconnected therewith, and a set lof program instructions (FIGS. 27-37) that are stored within the program memory located on the printed circuit card and particularly adapted to be executed by the microprocessor of the controller. In order to environmentally adapt real-time control, certain modification are also made to the program instructions normally used by the microprocessor in implementing real-time control (most notably, those represented in FIGS. 7(a), 9(a), 9(b), 24, 25, 26(a), 26(b) and 38), with a consequent addition to the information stored within a scratch pad memory of the controller (as seen in FIG. 23). Accordingly, it is necessary to describe in detail the structure and operation of the controller before proceeding to a detailed description of the structure and operation of the apparatus in FIG. 22.

Figure 1:
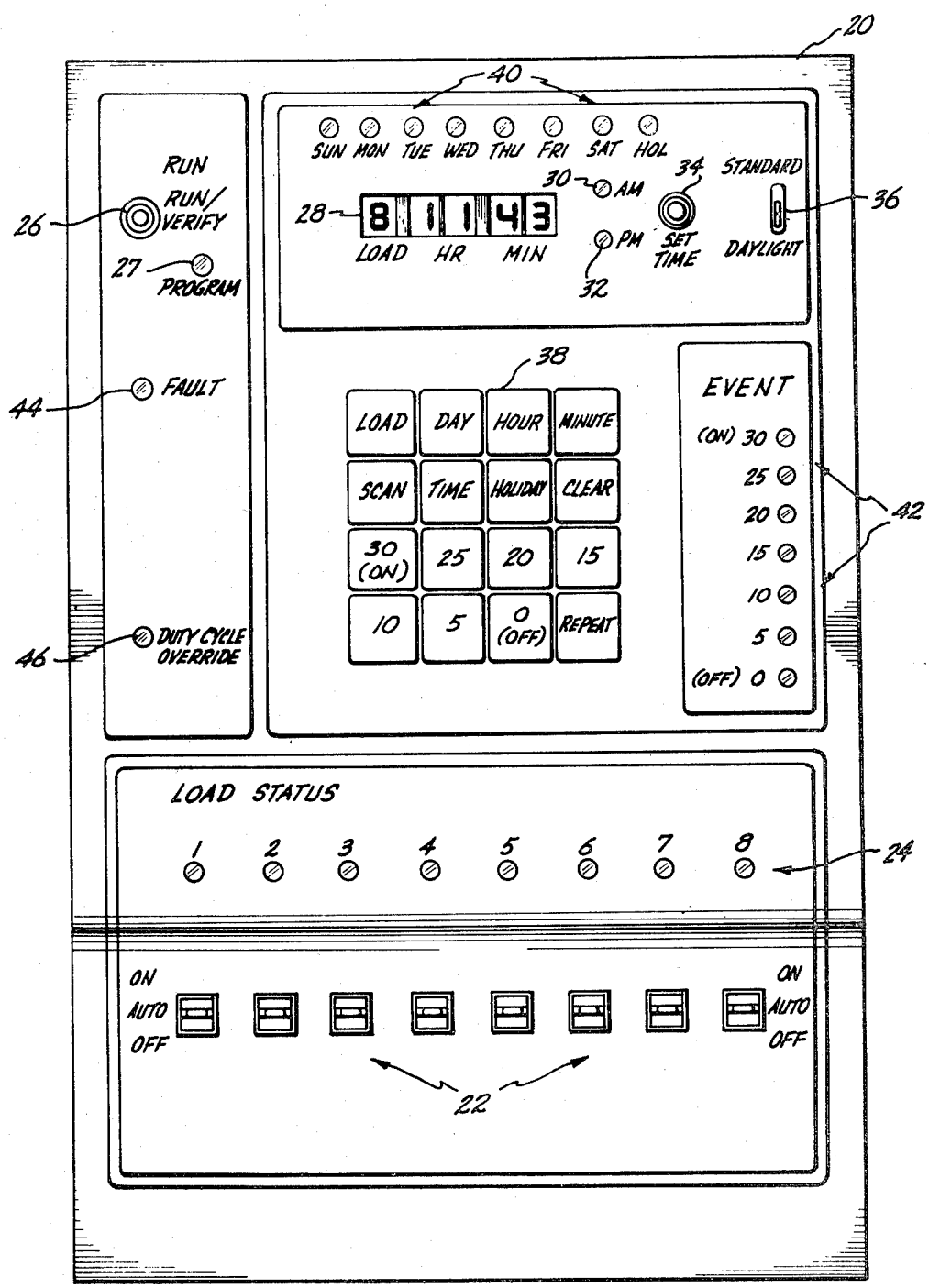
FIG. 1 is a pictorial view of a front panel of a preferred embodiment of the apparatus.

With reference to FIG. 1, a preferred embodiment of the programmable electronic real-time load controller includes a housing 20 on whose top panel are located a plurality of controls and displays that permit a user to transmit information to and receive information from a data processor, preferably a microprocessor and related components, located within the housing 20, and that also permit the user to override the control actions being undertaken by the controller if desired.

A plurality of load control switches 22 (one for each load circuit to be controlled, e.g., eight) are provided, with each load control switch 22 having three positions respectively labelled ON, AUTO and OFF. As described hereinafter with reference to FIGS. 2 and 3, each load control switch 22 forms part of a load control circuit which includes a load relay having normally-open, SPST contacts adapted for series interconnection with a load circuit (hereinafter referred to for convenience as a "load"). When each load control switch 22 is in its ON or its OFF position, its associated load is respectively turned on or turned off, irrespective of the operation of the microprocessor within the controller. When each load control switch 22 is in its AUTO position, the energization state of its associated load is controlled by the microprocessor through control of the energization state of the corresponding load relay.

A plurality of LEDs 24 labelled LOAD STATUS are provided, one for each load, with each LED 24 being lit when its associated load is turned on, and being extinguished when its associated load is turned off.

Figure 2:
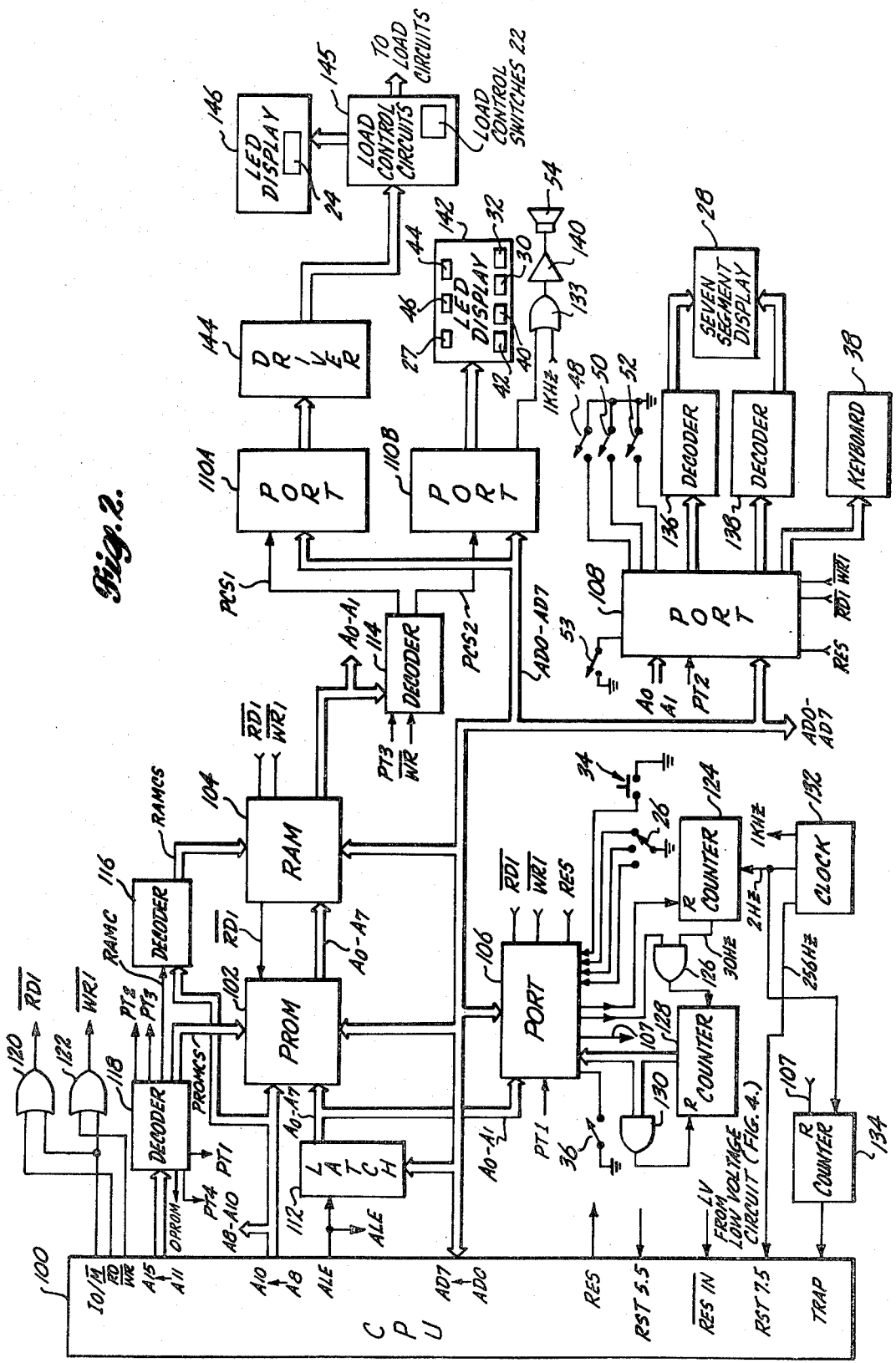
FIG. 2 is an electrical block diagram of the preferred embodiment, including a microprocessor, and particularly adapted to implement not only real-time control but also to adapt such real-time control is response to varying environmental conditions when used with the components of the apparatus illustrated in FIG. 22.

The microprocessor has three modes of operation, denominated "program," "run/verify," and "run" which can be selected by the user through the positioning of a mode switch 26 to respective PROGRAM, RUN/VERIFY or RUN positions. When the microprocessor is in the program mode of operation, the load relays are maintained in the energization states established prior to the time that the microprocessor entered the program mode of operation, and the user is permitted to enter a time schedule into the microprocessor for load control, or to alter any schedule that has been previously entered. When the microprocessor is in either the run/verify or the run modes of operation, the energization states of the load relays are controlled by the microprocessor in accordance with the time schedule, but the user is not permitted to alter the time schedule. To prevent inadvertent changes to the schedule, the microprocessor will enter the program mode of operation only if the user places the mode switch 26 to its PROGRAM position within a predetermined period of time, e.g., five seconds, after the user has actuated a "hidden" program enable switch 48 (FIG. 2). When the microprocessor is in the program mode of operation, an LED 27 is lit.

In order to provide certain information to the user regarding the operation of the controller, there is provided a display 28, an LED 30 labelled AM, and LED 32 labelled PM, and a plurality of LEDs 40 respectively labelled SUN, MON, TUE, WED, THU, FRI, SAT and HOL. The display 28 has a plurality of seven-segment, alphanumeric character displays including a LOAD character display (which displays a number identifying a load, e.g., "1" to "8"), two HR character displays (tens and units), and two MIN character displays (tens and units). As described hereinafter, the controller includes a hardware clock which provides real-time information to the microprocessor. In the run mode, the microprocessor normally causes the LOAD character display to be blanked, and the remaining character displays and LEDs 30, 32 and 40 to display real-time. In the program mode of operation, the time within the hardware clock may be adjusted upon actuation of a switch 34 labelled SET TIME. In all three modes of operation, the real-time information used by the microprocessor for load control may be advanced by one hour from the time in the hardware clock in accordance with the setting of a switch 36 labelled STANDARD/DAYLIGHT.

A keyboard 38, which is enabled only when the microprocessor is in either the run/verify or the program mode, permits the user to enter a schedule for load control into the microprocessor, or to alter any previously-entered schedule, and also permits the user to obtain a display of the schedule and of real-time. Included in the keyboard 38 are a plurality of keys labelled LOAD, DAY, HOUR, MINUTE, SCAN, TIME, HOLIDAY, CLEAR, 30(ON), 25, 20, 15, 10, 5, 0(OFF) and REPEAT.

At this point, it should be noted that the controller permits the scheduling of a plurality of control events, or, changes in the load control function being effected by the controller, for each load for each day of a week, plus a holiday schedule for each load. Each control event has associated therewith a unique event time. A control interval, e.g., thirty 30 minutes, is established, and each control event is defined as the number of minutes during each successive control interval subsequent to the event time that a load will be turned on.

In the preferred embodiment, three load control functions are provided, these being "on," "off" and "duty-cycle." To schedule a control event representing either the "on" or "off" control functions, the user selects the desired load and event time by actuation of the appropriate keys in keyboard 38, and actuates either the 30(ON) or 0(OFF) keys. To schedule a control event having a duty-cycle control function, the user selects the desired load and event time by actuation of the appropriate keys in keyboard 38, and actuates one of the 25, 20, 15, 10, or 5 keys.

When either the "on" or "off" control functions have been so scheduled, the microprocessor, when placed in the run or run/verify modes, will maintain the selected load either on or off, from a time in real-time corresponding to the event time of the control event to a time in real-time corresponding to a subsequent event time of another control event. When a "duty-cycle" control function has been scheduled, the microprocessor will maintain the selected load on for a selected portion of each subsequent control interval in real-time from the event time of the control event to a subsequent event time of another control event. For example, if the 25 key has been actuated, the microprocessor will maintain the selected load on for the first twenty-five minutes of each successive thirty minute interval in real-time subsequent to the event time.

While the microprocessor is in the program or run/verify modes, display of a selected load, day, and event time is made by the display 28 and LEDs 30, 32, and 40, and display of a selected control event is made by a plurality of LEDs 42 whose labels correspond to those of the vent keys (e.g., 30(ON), 25, 20, 15, 10, 5, 0(OFF)) in keyboard 38.

In order to schedule control events, the user first places the microprocessor into the program mode as previously described. The user then actuates: the LOAD key until the desired load number appears in display 28; the DAY key until the LED 40 corresponding to the desired day is lit; and, the HOUR and MINUTE keys until the desired event time is displayed by display 28 and LEDs 30, 32. The desired control event is then entered into an event memory within the microprocessor by actuation of the corresponding event key, and is acknowledged by the microprocessor by the lighting of the corresponding LED 42. After entry of all the desired control events for a given day and for a given load, scheduling of control events may be effected for another day after the user actuates the DAY key until the LED 40 corresponding to the desired day is lit. Alternatively, the schedule of control events for a given load and for a given day may be repeated for subsequent days, one at a time, by actuation of the REPEAT key in keyboard 38. After all control events have been scheduled for a given load and for an entire week, the scheduling process is repeated for the remaining loads in a manner identical to that previously described.

The microprocessor also permits a separate holiday schedule to be established for each load, with the holiday schedule having any sequence of control events that may be desirable. To enter the holiday schedule, the DAY key is actuated while the microprocessor is in the program mode until the LED 40 labelled HOL is lit. The holiday schedule for each load is then entered in a manner identical to that previously described.

Any previously-entered schedule can be altered by rescheduling control events and event times when the microprocessor is in the program mode. Also, the schedule for a given load and for a given day (including a holiday) may be deleted by actuation of the LOAD and DAY keys until the desired load number and day (including holiday) are displayed, and by subsequent actuation of the CLEAR key.

In order to obtain display of real-time information when the microprocessor is in either the run/verify or the program modes, the TIME switch may be actuated.

As previously described, the time within the hardware clock may also be changed through actuation of the SET TIME switch 34. Specifically, the DAY, HOUR and MINUTE keys are actuated until a desired time is displayed. Subsequent actuation of the SET TIME switch 34 will cause the microprocessor to change the time within the hardware clock to the time as displayed.

While the microprocessor is in either the run/verify or the program modes, the user may obtain a display of the schedule for each load and for each day (including a holiday). To obtain such a display, the user actuates the LOAD and DAY keys until the desired load number and day are displayed. Actuation of the SCAN key then causes the microprocessor to display the scheduled event times and control events, in a sequence of successive event times, through display 28, LEDs 30 and 32, and LEDs 42.

Let it be assumed that a schedule for load control has been entered (or altered), and that the microprocessor is now placed in its run/verify mode (by appropriate positioning of the mode switch 26). Thereupon, the LOAD character display in display 28 is blanked, and the remaining character displays in display 28, and LEDs 30, 32, and 40, display real-time information obtained from the hardware clock. In effecting load control, the microprocessor continuously compares real-time information obtained from the hardware clock with the schedule, and effects the control functions represented by the control events in the schedule at the times in real-time corresponding to the event times in the schedule. If no control events have been scheduled for a given load for the day in real-time, the microprocessor automatically scans back through the previous six days in the schedule and controls the load in accordance with the control function represented by the last-entered control event. If no control events have been entered in the schedule for the load, the load is maintained off.

To avoid a large inrush of power in the case where the schedule calls for more than one load to be turned on at the time that the microprocessor is placed in either the run or run/verify modes, the microprocessor turns on the loads in a predetermined sequence and at predetermined intervals.

As previously described, the schedule cannot be entered or altered when the microprocessor is in the run or run/verify modes. However, when the microprocessor is in the run/verify mode, one or more of the days in any given week in real-time can be selected as a holiday, whereupon the microprocessor follows the holiday schedule for all loads upon occurrence of that day or days in real-time. To accomplish this selection, the DAY key is actuated until LED 40 corresponding to the desired day is lit, and the HOLIDAY key is actuated. When the thus-selected day occurs in real-time, the LED 40 corresponding to the thus-selected day and the LED 40 labelled HOL will be lit, and the microprocessor will control all loads in accordance with the holiday schedule. After occurrence of the thus-selected day in real-time, the microprocessor will adhere to the regular schedule upon the next occurrence of that day in real-time, unless the day is again selected as a holiday.

An LED 44 labelled FAULT and an audible alarm 54 (FIG. 2) are also provided. When a proper keyboard entry is made by the user, the audible alarm 54 is actuated for a short period of time. When an improper keyboard entry is attempted, however, the FAULT LED is lit for a short period of time and the entry is not accepted by the microprocessor. An internal check is also made by the microprocessor of its event memory. If an event memory malfunction is detected, the microprocessor causes the FAULT LED 44 and the audible alarm 54 to be energized, whereupon the user must return the microprocessor to its program mode of operation and reschedule all control events before the microprocessor can be returned to its run/verify modes of operation.

Provision is also made for allowing an external device to override the operation of the microprocessor in certain circumstances. Specifically, a set of terminals is provided to which may be connected a set of external contacts 50 (FIG. 2). The contacts 50, referred to hereinafter as the load 1 enable switch 50, must be closed in order for the microprocessor to control load number 1 in accordance with the schedule entered therein. For example, switch 50 may comprise the contacts of a photocell, which open during daylight, and load number 1 may comprise a lighting load. In such a case, the microprocessor will be enabled to turn on or turn off load number 1 only during non-daylight hours, and load number 1 will otherwise be maintained off.

Figure 22:
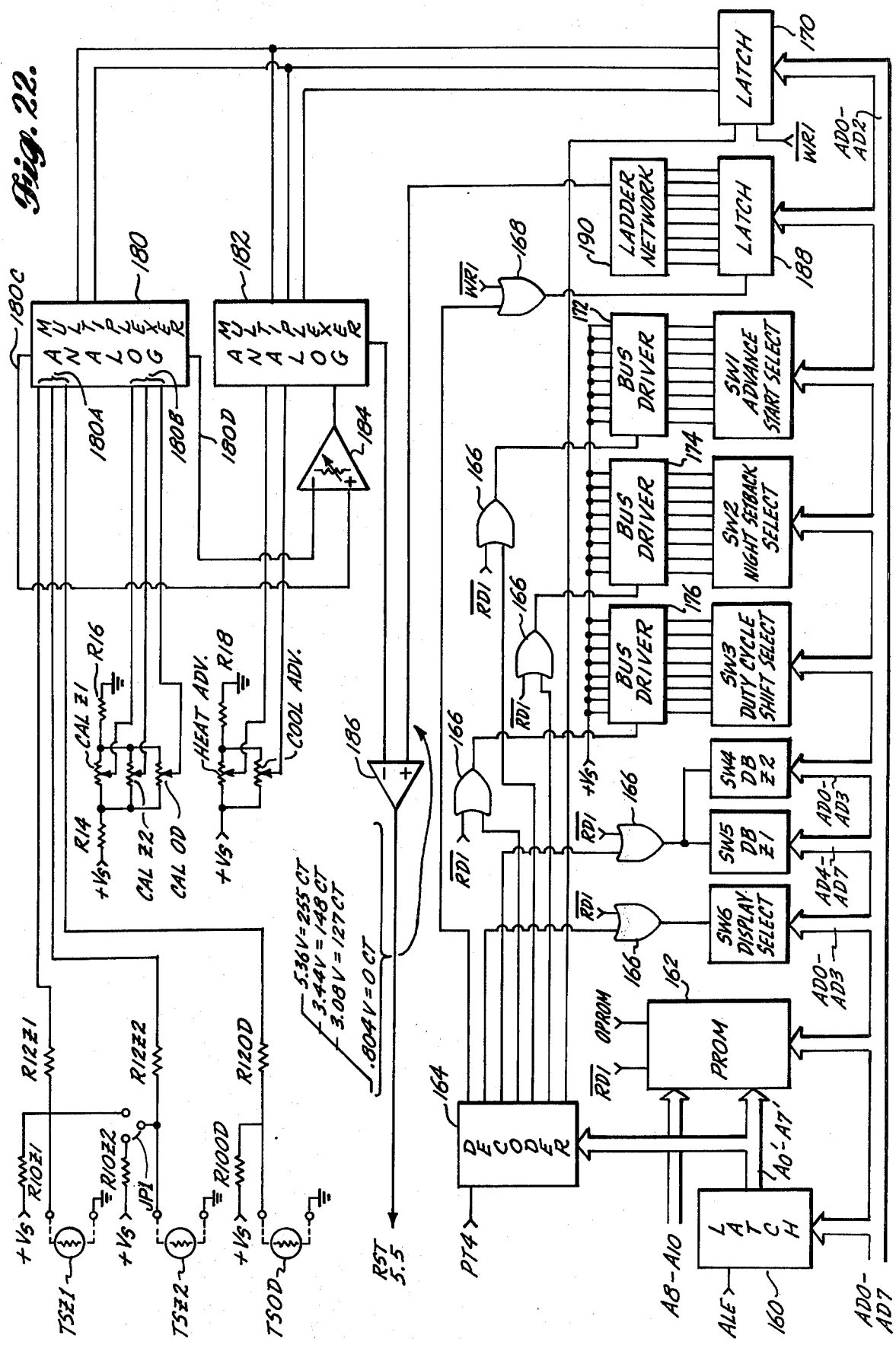
FIG. 22 is an electrical block diagram of the components of the apparatus required for the controller to adapt real-time control in response to environmentally varying conditions.

There is also provided a set of terminals adapted to be connected to a set of contacts 52 (FIG. 2) which are hereinafter referred to as the duty-cycle override switch 52. Whenever switch 52 is closed, all loads whose current control events represent a "duty-cycle" control function are maintained on, and an LED 46 labelled DUTY-CYCLE OVERRIDE is lit. For example, switch 52 may comprise the contacts of a thermostat which close when a set temperature is reached. The microprocessor may accordingly function to provide duty-cycle control functions for loads such as cooling equipment only until the cooling equipment has brought the facility's temperature to that set in the thermostat, thereby allowing more efficient cooling. Finally, an adaptive option switch 53 (FIG. 2) is closed whenever the printed circuit card containing the components of the apparatus in FIG. 22 is inserted into housing 20 and interconnected with the microprocessor, so that the microprocessor can be informed that environmentally-adaptive modification of real-time control is to be implemented.

ENVIRONMENTALLY-ADAPTIVE MODIFICATIONS

As described hereinafter, the environmentally-adaptive modifications take three forms: an advance start modification, in which the event time of a control event for a selected load is advanced from that set forth in the time schedule by an amount, or advance time, that has a predetermined relation to the deviation of outdoor temperature from a reference temperature; a night setback modification, in which a selected load is turned on, even though the selected load is being maintained off by real-time control, whenever indoor temperature is outside predetermined high and low limits; and, a duty-cycle shift modification, in which a currently-active duty-cycle control function for a selected load is modified in relation to the deviation between indoor temperature and a reference temperature so as to increase the "on-time" of the selected load during each control interval.

MICROPROCESSOR STRUCTURE AND GENERAL OPERATION

With reference now to FIG. 2, the microprocessor in the preferred embodiment of the controller has a plurality of components including a CPU (Central Processing Unit) 100, a PROM (Programmable Read Only Memory) 102, a RAM (Random Access Memory) 104, a first port 106, a second port 108, and a third port divided into ports 110A, 110B. The foregoing components may comprise one or more, commercially-available integrated circuit chips, of which the following are representative:

TABLE I

| Component | Designation |
| --- | --- |
| CPU 100 | Intel 8085 Microprocessor |
| PROM 102 | Two Intel 2716 16K (2KX8) UV Erasable PROM |
| RAM 104 | Ten Intel M5101L-4 256×4-bit Static CMOS RAMs |
| Ports 106, 108 | Intel 8255 Programmable Peripheral Interface |
| Port 110A | 74LS374 8-bit Latch (available from a number of manufacturers) |
| Port 110B | Three 74LS374 |

A low address/data bus, comprising leads AD-0–AD7, interconnects corresponding terminals of CPU 100, PROM 102, RAM 104, ports 106, 108, 110A, 110B, and a latch 112. A lead ALE interconnects corresponding terminals of CPU 100 and latch 112. A plurality of leads A0–A7 interconnect corresponding output terminals of latch 112 with corresponding terminals of PROM 102 and RAM 104. In addition, leads A0–A1 interconnect latch 112 with ports 106, 108 and with a decoder 114.

A first group of high address terminals of CPU 100 are interconnected with PROM 102 and with a decoder 116 by leads A8–A10. A second group of high address terminals of CPU 100 are interconnected with a decoder 118 by leads A11–A15.

Decoder 118 has a plurality of output terminals which are interconnected with port 106, port 108, decoder 114, and decoder 116 by respective leads PT1, PT2, PT3 and RAMC. Decoder 118 also has a plurality of output terminals which are interconnected with the integrated circuit chips within PROM 102 by corresponding leads PROMCS. Likewise, decoder 116 has a plurality of output terminals which are interconnected with the integrated circuit chips within RAM 104 by corresponding leads RAMCS. Decoder 114 has a plurality of output terminals which are interconnected with port 110A and port 110B by respective leads PCS1 and PCS2.

Terminals IO/$\overline{\text{M}}$ and $\overline{\text{RD}}$ of CPU 100 are connected to corresponding inputs of an OR gate 120, and terminals IO/$\overline{\text{M}}$ and $\overline{\text{WR}}$ of CPU 100 are connected to corresponding inputs of an OR gate 122. The output of OR gate 120 is connected by a lead $\overline{\text{RD1}}$ to PROM 102, RAM 104 port 106 and port 108, and the output of OR gate 122 is connected by a lead $\overline{\text{WR1}}$ to RAM 104, port 106, port 108 and decoder 114. Finally, a RES terminal of CPU 100 is interconnected with corresponding terminals of ports 106, 108.

In order to permit the controller to environmentally adapt realtime control, a number of the leads of the microprocessor in FIG. 2 are connected (through an appropriate connector) to corresponding leads of the components of the apparatus in FIG. 22, including leads A8–A10, AD0–AD7, $\overline{\text{RD1}}$, and ALE. A RST 5.5 (interrupt) input of CPU 100 is connected by a lead with a corresponding output of the apparatus in FIG. 22, and respective output terminals of decoder 118 are connected by leads OPROM, and PT4 to corresponding leads of the apparatus in FIG. 22.

The foregoing components, and their interconnections, form a largely conventional microprocessor, in which PROM 102 contains a program memory comprising a set of program instructions for various routines and subroutines which are described hereinafter with reference to FIGS. 7–21, and in which RAM 104 contains a scratch pad memory which is organized as described hereinafter with reference to FIG. 5, and an event memory which is organized as described hereinafter with reference to FIG. 6. Ports 106 and 108 function as input/output ports, whereas ports 110A, 110B function as output ports.

Within each routine or subroutine, the set of program instructions in PROM 102 are addressed and executed by CPU 100 in a predetermined sequence, established by a program counter within CPU 100. For each program instruction so addressed, CPU 100 undertakes an instruction cycle, with each instruction cycle including a plurality of machine cycles. The machine cycles permit CPU 100 to retrieve an instruction from PROM 102 and to execute the instruction by the addressing and transmission of data to and from CPU 100, RAM 104 and ports 106, 108 and 110A, 110B. Within each instruction cycle, addresses or data are transmitted on leads AD0–AD7. When an address is being transmitted by CPU 100 on leads AD0–AD7, a signal is provided on lead ALE therefrom which causes latch 112 to store therein the address, and to present the address thus stored on leads A0–A7. At all other times, leads AD0–AD7 are used for the transmission of data. The address on leads A0–A7, together with further address information on leads A8–A10, is used to signify a memory location within the chips in PROM 102. Likewise, the address on leads A0–A7 is used to signify a memory location within the chips in RAM 104. The address on leads A0–A1, plus address information on leads AD0–AD7 is used to signify that ports 106 and 108 should connect one of their input or output terminals, to be described hereinafter, with leads AD0–AD7 for the transmission or reception of data. Likewise, address information on leads AD0–AD7 is used to signify that ports 110A, 110B should connect one or more of their output terminals, to be described hereinafter, to leads AD0–AD7 for the reception of data.

In order to signify which of the thus-addressed components of the microprocessor is to be interconnected with the leads AD0–AD7 for the transmission or reception of data, CPU 100 provides signals on leads A11–A15 to decoder 118, which responsively provides chip select signals on leads PT1, PT2, PT3, or PROMCS to respectively enable port 106, port 108, ports 110A and 110B, or one of the chips within PROM 102. Decoder 118 is also responsive to the signals on leads A11–A15 from CPU 100, together with the signals on leads A8–A10 therefrom, to provide chip select signals on leads RAMCS to respectively enable one of the chips within RAM 104. Likewise, decoder 114 is responsive to signals on leads A0–A1, and to the chip select signal on lead PT3, to provide chip select signals on leads PCS1 or PCS2 to respectively enable either port 110A or port 110B.

Actual data transmission on leads AD0–AD7, however, is not permitted until times during each instruction cycle as determined by CPU 100 and as signified by signals on terminals IO/$\overline{\text{M}}$, $\overline{\text{RD}}$ and $\overline{\text{WR}}$. By combining of these signals in OR gates 120, 122, the signals on leads $\overline{\text{RD1}}$ and $\overline{\text{WR1}}$ permits all ports to be treated as if they were memory locations (memory-mapped I/O). Upon provision of a signal on lead $\overline{\text{RD1}}$, the data in an addressed memory location in an enabled chip within PROM 102 or RAM 104 is placed on the leads AD0–AD7. Likewise, the data represented by signals on any addressed input terminal in ports 106, 108, when enabled, is placed on leads AD0–AD7. Upon the provision of a signal on lead $\overline{WR1}$, any data on leads AD-0–AD7 is written into an addressed memory location in an enabled chip within RAM 104, or, supplied to any addressed and enabled output terminal in ports 106, 108, 110A, 110B.

Finally, various buffers within ports 106, 108, 110A, 110B, that are used for temporary storage of data being received from or transmitted to one of the input or output terminals thereof, are reset or cleared upon the provision of a signal on lead RES from CPU 100 to ports 106, 108, and by the provision of suitable data on leads AD0–AD7 to ports 110A, 110B.

Further details regarding the structure and operation of the microprocessor may be found in the "Intel Component Data Catalog 1978" and in the "MCS-85 User's Manual", copyright 1977, Intel Corporation, both of which are expressly incorporated by reference herein.

A first group of input terminals of port 106 is respectively connected to SET TIME switch 34 and to respective terminals of the mode switch 26, in order to determine the actuation of SET TIME switch 34 and the positioning of mode switch 26 to either the RUN, RUN/VERIFY, or PROGRAM positions. A first output terminal of port 106 is connected to the reset (R) input of a counter 124, and a second output terminal of port 106 is connected to a first input of an OR gate 126 whose other input is connected to the output of counter 124. The output of OR gate 126 is connected to the signal input of a counter 128 which has a plurality of output terminals that are interconnected with a second group of input terminals of port 106 and with corresponding inputs of an AND gate 130. The output of AND gate 130 is connected to the reset (R) input of counter 128. Another input terminal of port 106 is interconnected with STANDARD/DAYLIGHT switch 36 in order to determine the positioning thereof to either the STANDARD or DAYLIGHT positions.

A clock 132 provides a plurality of clock signals comprising: a first clock signal (e.g., at a frequency of 1 kHz) which is connected by an appropriate lead to a first input of an AND gate 133 to be described hereinafter; a second clock signal (e.g., at a frequency of 2 Hz) which is applied to the signal inputs of counter 124 and a counter 134; and, a third clock signal (e.g., at a frequency of 256 Hz) which is connected by an appropriate lead to an RST 7.5 (interrupt) input of CPU 100. A third output terminal of port 106 is connected by a lead 107 to a reset (R) input of counter 134, and the output of counter 134 is connected to a TRAP input of CPU 100.

Clock 132, counter 124, gate 126, counter 128, and gate 130 comprise the hardware clock which accumulates real-time information used by the microprocessor. Clock 132 preferably comprises a crystal-stabilized oscillator and a counter which divides a signal from the oscillator to provide the aforementioned clock signals. Counter 124 preferably comprises a counter which functions to divide the frequency of the second clock signal from clock 132 to provide an output signal (e.g., at a frequency of 30 Hz) to gate 126. Normally, gate 126 functions to pass the output signal from counter 124 to the signal input of counter 128, with counter 128 being responsive to the output signal from counter 124 so as to accumulate a count representing the number of minutes that have transpired, in real-time, during a week. The count within counter 128 is coupled to the microprocessor through the output terminals of counter 128 and the second group of input terminals of port 106. When counter 128 has accumulated a count representing the total number of minutes in a week, gate 130 provides an output signal to reset counter 128, whereupon counter 128 again begins to accumulate a count representative of the number of minutes, in real-time, during a subsequent week.

As previously noted, the microprocessor is capable of setting the time (or count) within the hardware clock to a desired time (or count) upon actuation of the SET TIME switch 34. To accomplish this function, the microprocessor provides a signal on the first output terminal of port 106 to reset counter 124, and provides a high frequency signal on the second output terminal of port 106 which is gated through gate 126 to advance the count within counter 128 until that count is at the desired time.

Provision is also made for monitoring the timing of the execution of program instructions by CPU 100. To accomplish this function, the counter 134 is set to overflow, and to accordingly provide an output signal, after an interval determined by a predetermined number of pulses in the second output signal from clock 132. When counter 134 overflows, the output signal therefrom at the TRAP input of CPU 100 causes CPU 100 to reset its program counter and to reinitialize its operation. However, if CPU 100 is executing program instructions in a timely manner, a signal is provided on the third output terminal of port 106 at periodic intervals, each of which is less than the overflow interval of counter 134, which causes counter 134 to be reset without overflowing.

The third clock signal from clock 134 causes CPU 100 to undertake an INTERRUPT subroutine, to be described hereinafter, in which the displays of the microprocessor are refreshed and in which certain internal timers in RAM 104 are decremented.

A first group of input and output terminals of port 108 is interconnected with keyboard 38 and is used to scan and detect key actuations therein in a conventional manner. Second and third groups of output terminals of port 108 are interconnected by decoders 136, 138 with scan and display inputs of the character display 28, with decoders 136 and 138 functioning in a conventional manner to provide demultiplexing and subsequent display of data obtained from port 108. The remaining input terminals of port 108 are interconnected, respectively, with the program enable switch 48, with the load 1 enable switch 50, with the duty-cycle override switch 52, and with the adaptive option switch 53, in order to detect actuation of those switches.

Port 110B has a first output terminal which is connected to a second input of gate 133. The presence of a signal on the first output terminal of port 110B causes the first clock signal (at 1 kHz) from clock 132 to be gated through an amplifier 140 to cause actuation of the audible alarm 54. Port 110B also has a group of output terminals which are interconnected with a conventional LED display 142 including the "PROGRAM" LED 27, the AM LED 30, the PM LED 32, the LEDs 40, the LEDs 42, the FAULT LED 44, and the DUTY-CYCLE OVERRIDE LED 46, whereupon a signal on any one of the output terminals of port 110B causes the corresponding LED to be lit.

Port 110A has a plurality of output terminals which are interconnected by means of a driver circuit 144 with a plurality of load control circuits 145, each of which includes one of the load control switches 22 and which is described in more detail hereinafter with reference to FIG. 3. Each of the load relays within the plurality of load control circuits 145 is adapted to be interconnected with an electrical load circuit, and each load control circuit 145 is interconnected with a corresponding one of the LEDs 24 forming part of a conventional LED display 146.

LOAD CONTROL CIRCUITS 145

Figure 3:
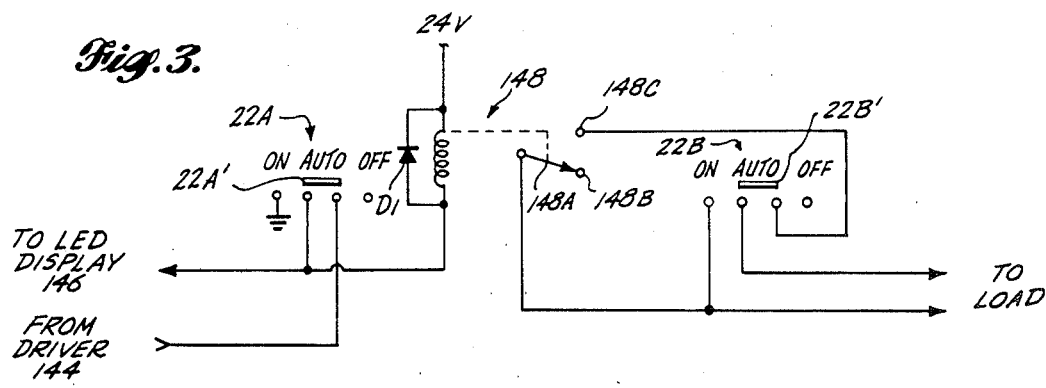
FIG. 3 is an electrical schematic diagram of a load relay circuit illustrated more generally in FIG. 2.

With reference now to FIG. 3, each load control circuit 145 includes the load control switch 22 which is divided into first and second, ganged sections 22A, 22B. Each switch section 22A, 22B includes a plurality of stationary contacts, of which the left hand contact is labelled ON, the middle two contacts are labelled AUTO, and the right hand contact is labelled OFF (corresponding to the labelled positions illustrated in FIG. 1). Switch section 22A is provided with a movable contact member 22A', and switch section 22B is provided with a movable contact member 22B', each of which is adapted to bridge two of the stationary contacts thereof. The ON stationary contact of switch section 22A is connected to ground, and the right-hand AUTO stationary contact thereof is connected to a corresponding output terminal of the driver circuit 144. The left-hand AUTO stationary contact of switch section 22A is connected to a corresponding LED 24 in LED display 146, and to one side of the coil of a load relay 148 whose other side is connected to a source of supply voltage by lead 24V. A diode D1 connected in shunt with the coil of load relay 148 provides reverse-voltage protection for the output transistor in the corresponding driver circuit 144. A movable contact arm 148A of load relay 148 is connected to a first lead going to the associated load circuit, and to the ON stationary contact of switch section 22B. Upon de-energization of the load relay 148, movable contact arm 148A engages stationary contact 148B thereof, which is unconnected. Upon energization of load relay 148, movable contact arm 148A is in engagement with stationary contact 148C thereof, which is connected to the right-hand AUTO stationary contact in switch section 22B. The left-hand AUTO stationary contact in switch section 22B is connected to a second lead going to the load circuit.

With the movable contact members 22A', 22B' in the position illustrated in FIG. 3, the energization state of the load relay 148 is under control of the microprocessor. When the microprocessor is maintaining the load off, driver circuit 144 provides a high impedance level on its output which, when coupled through switch section 22A, causes load relay 148 to be de-energized. As a result, the leads going to the load circuit are disconnected from each other, inasmuch as movable contact arm 148 is in engagement with stationary contact 148B thereof. When the microprocessor is maintaining the load on, driver circuit 144 provides a low level signal which, when coupled through switch section 22A, permits load relay 148 to be energized from the supply voltage appearing on lead 24V. The low level signal from driver circuit 144 is also coupled through switch section 22A to the corresponding LED 24 in LED display 146 to provide a current path thereto. When load relay 148 is energized, a connection is made between the leads going to the load circuit, through switch section 22B and contacts 148C, 148A.

As can be noted, no connection is made to the OFF stationary contacts of switch sections 22A, 22B. Accordingly, when the movable contact members 22A', 22B' are moved to bridge the OFF and right-hand AUTO stationary contacts of switch sections 22A, 22B, the connections between the leads going to the load circuit and between the driver circuit 144 and the LED display 146 are broken. Accordingly, the associated load circuit is maintained off, and the associated LED 24 is extinguished, notwithstanding the nature of the signal from driver circuit 144. Likewise, if the movable contact members 22A', 22B' are moved so as to bridge the ON and left-hand AUTO stationary contacts of switch sections 22A, 22B, a connection is made between the leads going to the load circuit, and between the associated LED 24 in LED display 146 and a low level signal (e.g., ground), whereby the associated load circuit is maintained on and the associated LED 24 is lit, notwithstanding the nature of the signal from driver circuit 144.

POWER SUPPLY

Figure 4:
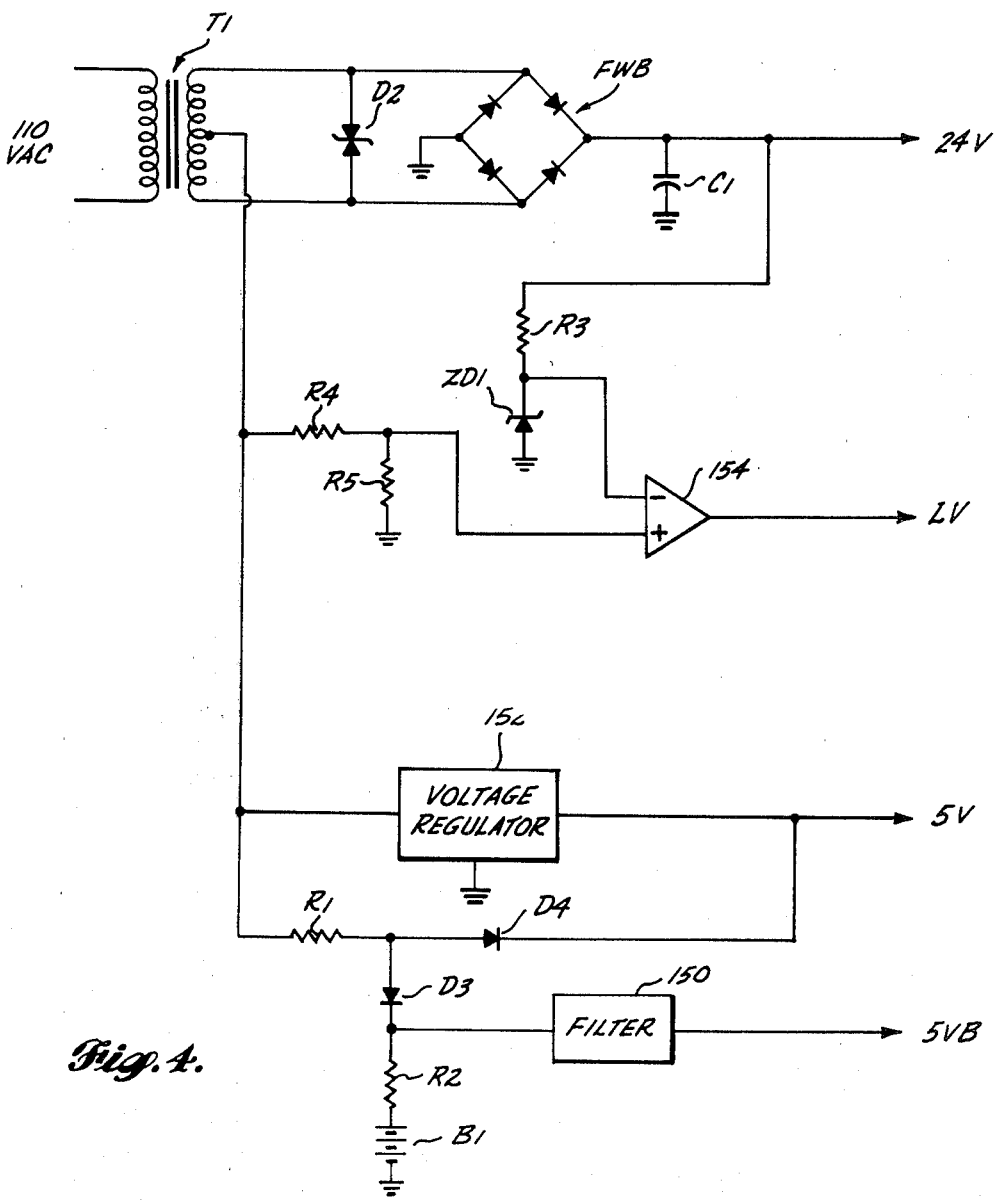
FIG. 4 is an electrical schematic diagram of a power supply and low voltage detection circuit usable with the controller of FIG. 2.

With reference now to FIG. 4, a power supply capable of providing appropriate dc supply voltages for the components of the controller from a source of alternating current, and also capable of detecting a low voltage condition in the source of alternating current, is illustrated. The source of alternating current (nominally at 110 vac) is connected across the primary winding of a transformer T1. The resultant ac voltage appearing across a center-tapped secondary winding of transformer T1 is applied across a grounded full wave bridge rectifier FWB to whose output is connected the lead 24V (whose dc voltage is nominally 24 volts), with a voltage transient protection diode D2 being connected across bridge FWB to prevent noise transients from appearing on lead 24V. The ac voltage on the center tap of the secondary winding of transformer T1 (e.g., 12 vac) is connected by a resistor R1, a diode D3, and a resistor R2 to the positive terminal of a battery B1, whose negative terminal is connected to ground. The common junction of diode D3 and resistor R2 is coupled through a filter circuit 150 to a lead 5VB, upon which appears a dc supply voltage (nominally at 5 volts) for the components of the hardware clock (clock 132, counters 124, 128 and 134, and gates 126, 130) and for RAM 104. A diode D4 is connected from the common junction of resistor R1 and diode D3 to a lead 5V, upon which appears a dc supply voltage (nominally at 5 volts) for the remaining components of the controlled illustrated in FIG. 2. The dc supply voltae on lead 5V is regulated by a grounded voltage regulator 152 connected in shunt with resistor R1 and diode D4. Resistors R1 and R2 and diode D3 also function as a trickle charger for the battery B1, so that battery B1 is maintained in a state of full charge during the times that power is being supplied from the source of alternating current.

If a power outage should be experienced, it is desirable to terminate the operation of the microprocessor in effecting load control, but to maintain the hardware clock in an operating condition and to maintain the contents of the scratch pad memory and event memory within RAM 104 so that the microprocessor may resume load control upon power restoration. Accordingly, capacitor C1 is connected from lead 24V to ground, and series-connected resistor R3 and zener diode ZD1 are connected from lead 24V to ground. The common junction of resistor R3 and zener diode ZD1 is connected to the negative input of a fast acting comparator 154 whose output is connected by a lead LV to a RES IN terminal of CPU 100 (FIG. 2). Resistors R4 and R5 are connected from the center tap of the secondary winding of transformer 11 to ground, and the common junction of resistors R4 and R5 is connected to the positive input of comparator 154. The values of resistors R3, R4 and R5, and the reference voltage of zener diode ZD1, are chosen so that the signal applied to the positive input of comparator 154 is greater than the signal applied to the negative input of comparator 154 when the ac voltage from the source of alternating current is at its nominal value thereof (110 vac). If the ac voltage from the source of alternating current should suddenly drop, as in the case of a power outage, the signal at the negative input of comparator 154 will decrease at a slower rate (due to the action of capacitor C1) than the signal at the positive input thereof. As the ac voltage from the source of alternating current continues to drop, a point will be reached, e.g., at 95 vac, at which the signal at the negative input of comparator 154 becomes greater than the signal at the positive input thereof. As a result, comparator 154 provides a low logic level signal on line LV which places CPU 100 in a reset condition, whereby ports 106, 108, 110A, 110B are reset to thereby effect blanking of all displays and de-energization of the load relays 148 within load control circuits 145. As the ac voltage from the source of alternating current continues to drop, the supply voltages present on leads 5V, 24V will not be sufficient to maintain the components connected thereto in operation, and the microprocessor will cease to function. However, the supply voltage on lead 5VB will now be supplied from the battery B1, and will continue to maintain the hardware clock in operation and to maintain the contents of the scratch pad memory and the event memory within RAM 104. By appropriate choice of the battery B1, the hardware clock may be maintained in operation and the contents of the scratch pad memory and event memory in RAM 104 may be maintained for a considerable period of time in the case of power outage, e.g., fourteen days.

MICROPROCESSOR—SCRATCH PAD MEMORY IN RAM 104

Figure 5:
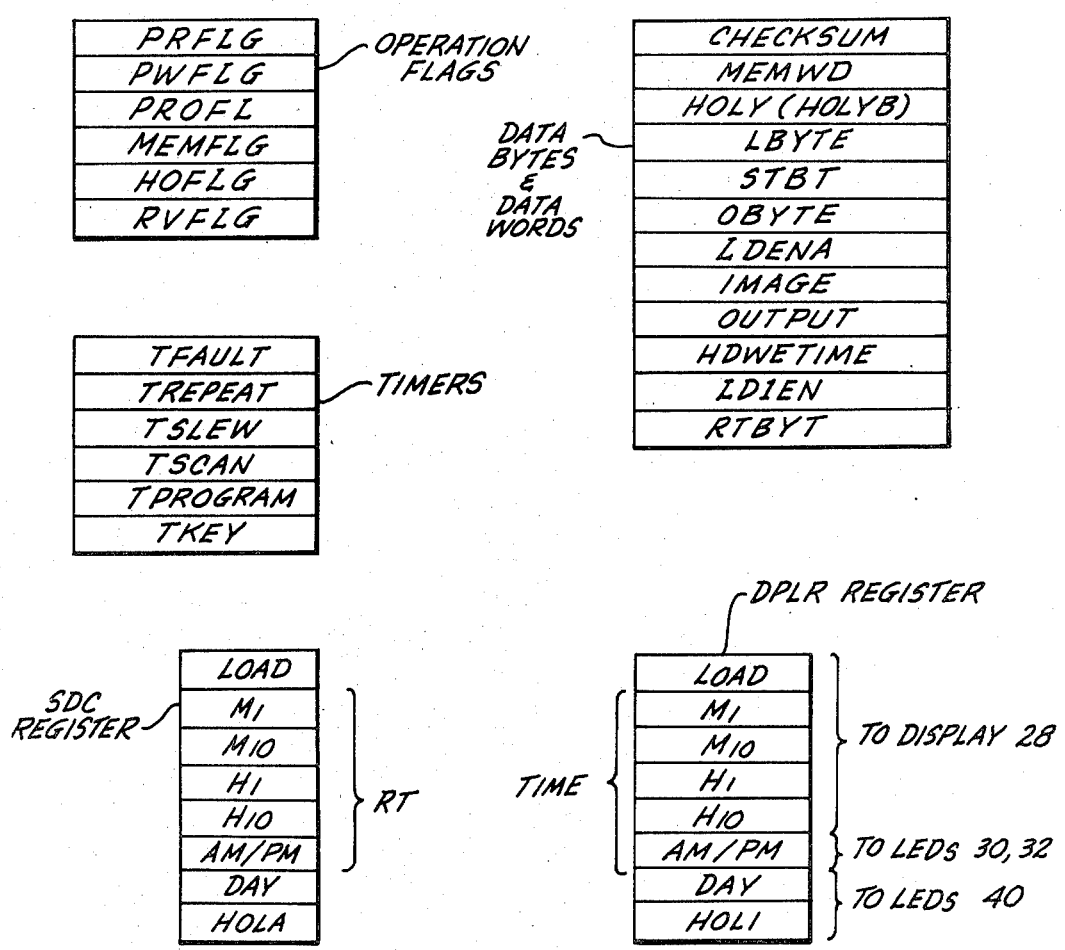
FIG. 5 is a schematic representation of various operation flags, timers, data bytes and registers contained within a scratch-pad memory within the microprocessor.

With reference now to FIG. 5, the scratch pad memory within RAM 104 is organized into a plurality of operation flags, a plurality of timers, a plurality of data bytes and data words, an SDC (seven-day clock) register and a DPLR (display) register, with each operation flag, timer, data byte and each field within the SDC and DPLR registers having a unique memory location within RAM 104. Each of the operation flags comprises a single data bit which is set or cleared by CPU 100 upon execution of certain program instructions in the routines and subroutines to be described hereinafter. Each of the timers comprises a data byte which is set to a predetermined count, and decremented in response to signals from the hardware clock during an INTERRUPT subroutine described hereinafter, in order to provide timing for various operations utilized in the routines and subroutines. The data bytes and data words comprise 8-bit data bytes and 16-bit data words (excepting the LDIEN byte) whose format and use will be described hereinafter. The SDC register includes a plurality of fields, collectively referred to as RT, and a DAY field which contain the real-time information within any week corresponding to real-time information obtained from the hardware clock. Specifically, the RT fields within the SDC register consist of: $M_1$ and $M_{10}$ fields, representing real-time minutes in units and tens; $H_1$ and $H_{10}$ fields, representing real-time hours in units and tens; and, an AM/PM field, representing whether real-time minutes and real-time hours are am or pm. The SDC register also has a LOAD field which always contains invalid data, and a single-bit HOLA field which is set when the real-time day is a holiday.

The DPLR register has a plurality of fields, including TIME and DAY fields whose organization corresponds to the RT and DAY fields within the SDC register. The DPLR register also has a LOAD field whose contents represent a load number, and a single-bit HOLI field which is set in certain circumstances to correspond to the HOLA field in the SDC register. Program instructions (not illustrated) are provided which cause CPU 100 to transfer the contents of the DPLR register to the display 28, to LEDs, 30, 32 and to LEDs 40 (FIGS. 1 and 2) with such transfer occurring during the INTERRUPT subroutine described hereinafter.

When the microprocessor is also to implement an environmentally-adaptive modification of real-time control, the scratch pad memory within RAM 104 includes additional data as described hereinafter with reference to FIG. 23.

MICROPROCESOR—VENT MEMORY IN RAM 104

Figure 6:
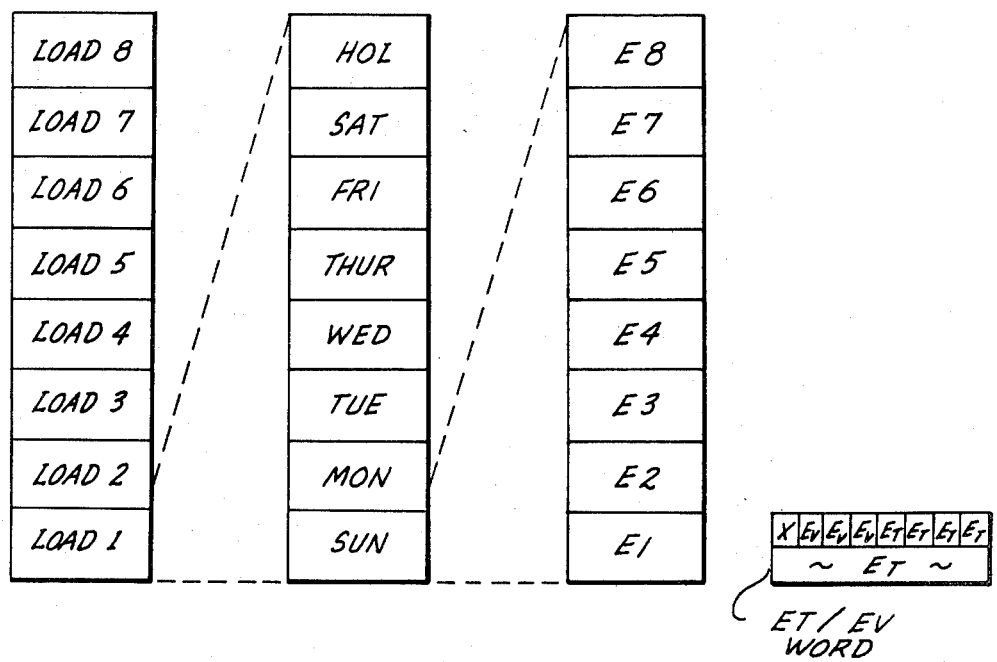
FIG. 6 is a schematic representation of the organization of an event memory within the microprocessor.

The event memory within RAM 104 is organized as illustrated in FIG. 6. Specifically, information relating to the schedule utilized by the microprocessor is stored in the form of ET/EV data words, with each such ET/EV data word including three bits representing a predetermined code for a control event (EV), and twelve bits representing the event time (ET) of that control event. The event memory locations for the ET/EV words are grouped first by loads (e.g., LOAD 1, LOAD 1, etc.). Within each such load group, the ET/EV words are grouped by days within a week (e.g., SUN, Mon, etc.). In addition, event memory locations are provided within each load group for the ET/EV data words relating to a holiday schedule (e.g., HOL). Within each day group, and within the holiday group, event memory locations are provided for eight ET/EV data words (e.g., E1, E2, etc.). As illustrated, the event memory therefore provides storage for eight control events for each day of the week, plus a holiday, for each one of eight loads, for a total of 512 control events.

MICROPROCESSOR—MAIN PROGRAM LOOP

Figure 7A:
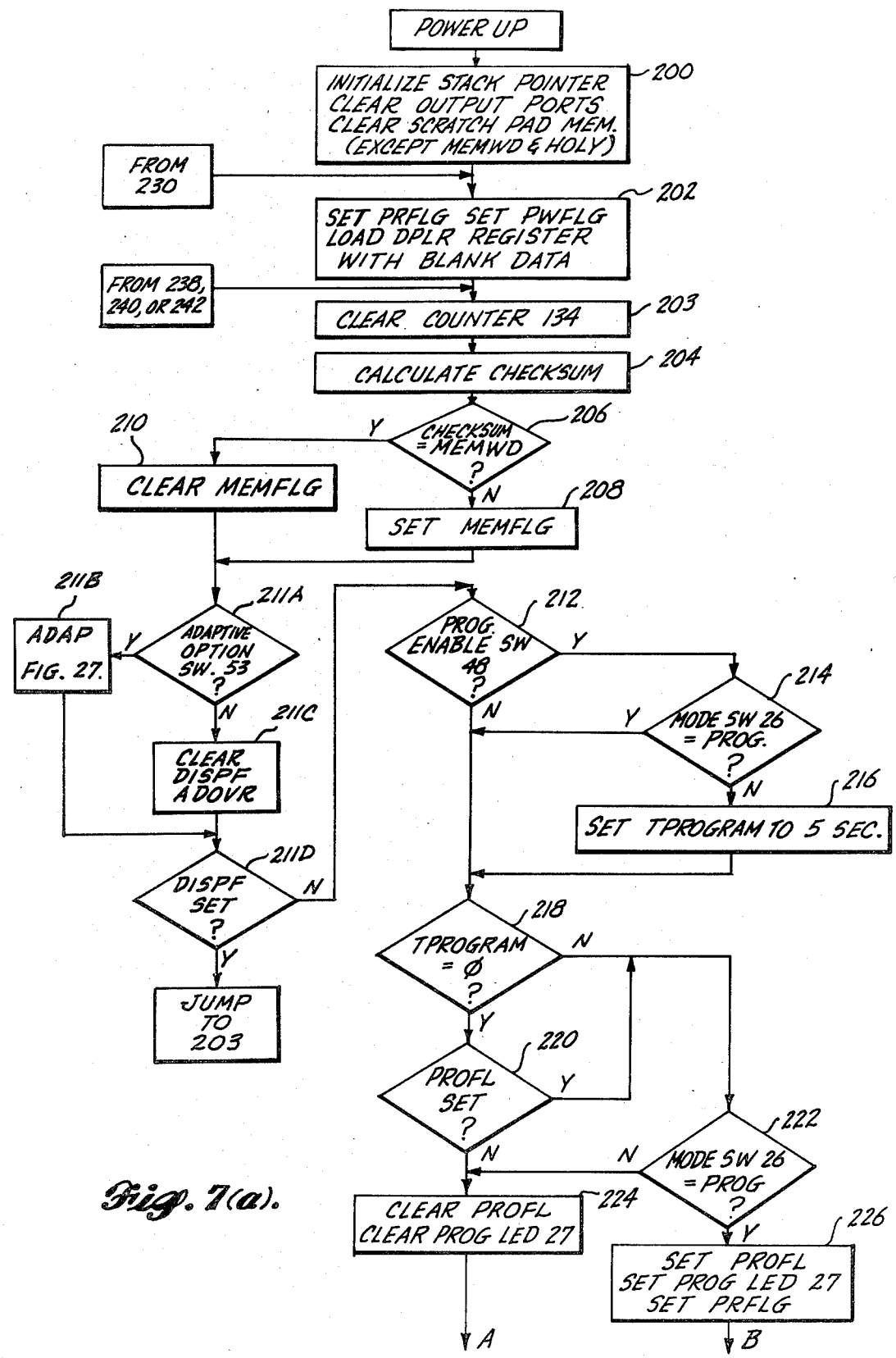
FIGS. 7(a) and 7(b) are a flow chart illustrating the program steps undertaken by the microprocessor in a main program loop.
Figure 7C:
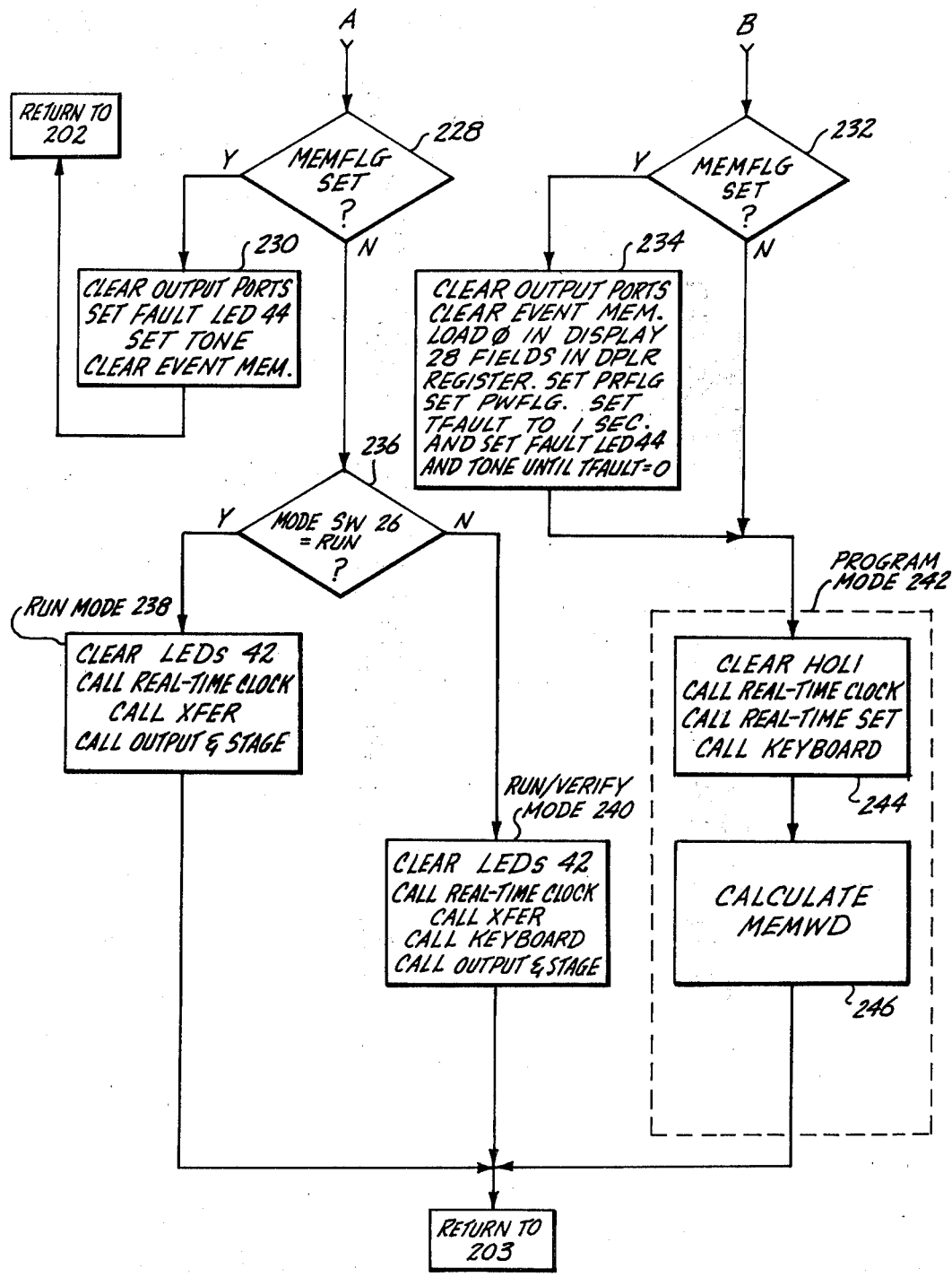

FIGS. 7(a) and 7(b) illustrate the main program loop of program instructions stored within PROM 102.

Upon application of power to the microprocessor, a POWER UP condition is detected by CPU 100 which enables CPU 100 to enter step 200, in which a stack pointer in RAM 104 is initialized. RAM 104, in addition to the scratch pad memory previously described, includes a stack, or holding, register which is used by CPU 100 to temporarily store certain information relating to the program step being executed by CPU 100 when a control signal from the hardware clock (e.g., the third clock signal at 256 Hz) appears on input terminal RST 7.5 thereof. Upon the production of each such control signal, CPU 100 is programmed to immediately enter into the INTERRUPT subroutine. Accordingly, the stack register is provided to provide temporary storage of program information so that CPU 100 can return to a specific program step after completion of the INTERRUPT subroutine. The stack register is configured as a circulating register, with the address of the first byte in the program step then being executed being located in the stack pointer. Also in step 200, all output terminals in ports 106, 108 and 110A, 110B are cleared, and all contents of the scratch pad memory (FIG. 5), excepting the MEMWD and HOLY data bytes, are cleared.

CPU 100 then proceeds, in step 202, to set the PRFLG and PWFLG operation flags (FIG. 5) and to load all the fields in the DPLR register with blank data, whereupon the display 28 is blanked and the LEDs 30, 32 and all LEDs 40 are extinguished. In step 203, CPU 100 enters its main program loop and clears (i.e., resets) counter 134. Normally, CPU 100 will pass through the main program loop and return to step 203 in less time than is required for counter 134 to overflow. However, if CPU 100 should in some manner be inhibited from timely completing a pass through the main program loop, counter 134 will overflow as previously described, whereby CPU 100 is programmed (not illustrated) to return to step 200 and to reinitialize its operations. CPU 100 then proceeds, in step 204, to calculate and store the CHECKSUM data word, with CHECKSUM comprising the numerical sum of all data bits within the event memory (FIG. 6). CPU 100 then makes a test, in step 206, to determine if the CHECKSUM data word equals the MEMWD data word. As described hereinafter, MEMWD is calculated when the microprocessor is in the program mode and also equals the numerical sum of all data bits within the event memory. If power has been applied to the microprocessor for the first time, MEMWD will have not been previously calculated and accordingly the determination in step 206 will be negative. If power has been restored to the microprocessor after a power outage, MEMWD should equal CHECKSUM, provided that power has been restored within the hold-up period established by battery B1 (e.g., 14 days), and the determination in step 206 will be affirmative. In any case, if the event memory malfunctions, the determination in step 206 will be negative. If the determination in step 206 is negative, CPU 100 proceeds, in step 208, to set the MEMFLG operation flag. If the determination in step 206 is positive, CPU 100 proceeds, in step 210, to clear MEMFLG. When MEMFLG is set, the microprocessor forces the user to select the program mode, as described hereinafter.

From either step 208 or step 210, CPU 100 proceeds in step 211A, to determine if the adaptive option switch 53 has been actuated. If the determination in step 211A is affirmative, CPU 100 proceeds, in step 211B, to the ADAP routine described hereinafter with reference to FIG. 27. If the determination in step 211A is negative, CPU 100 proceeds, in step 211C, to clear a DISPF operation flag and an ADOVR data byte. As explained hereinafter, the DISPF operation flag is set when certain information relating to the operation of the apparatus in FIG. 22 is to be displayed by display 28. When the DISPF operation flag is cleared, the information displayed by display 28 is that obtained from the DPLR register. As also explained hereinafter, the ADOVR data byte comprises an output from the apparatus in FIG. 22 and includes eight bits, one for each load, with each bit being set when its associated load is to be turned on to effect night setback modification of real-time control, and being otherwise cleared. Accordingly, if adaptive option switch 53 has not been actuated, the operations in step 211C insure that only the information within the DPLR register will be displayed by display 28, and that the energization states of the loads will be under real-time control in accordance with the predetermined time schedule without night setback modification. If adaptive option switch 53 has not been actuated, the advance start and duty-cycle shift modifications are likewise not made to the predetermined time schedule, as seen hereinafter in conjunction with the discussion of the LOAD UPDATE routine and its various subroutines.

From either step 211C or step 211B, CPU 100 proceeds, in step 211D, to determine if the DISPF operation flag has been set. If the determination in step 211D is affirmative, CPU 100 jumps to step 203. However, for purposes of the following discussion and until consideration of the environmentally-adaptive modifications in specific connection with FIGS. 22-40, it will be assumed that no such modifications are to be implemented. Under such an assumption, the determinaton in step 21D is accordingly negative, wherby CPU 100 proceeds, in step 212, to determine if the program enable switch 48 is being actuated. Let it be assumed that the user has not so actuated the program enable switch 48, whereupon the determination in step 212 is negative. As a result, CPU 100 proceeds, in step 218, to determine if the TPROGRAM timer is at zero. Since TPROGRAM has been cleared in step 200, the determination in step 218 is affirmative, whereupon CPU 100, in step 220, determines if the PROFL operation flag has been set. Since PROFL has been cleared in step 200, the determination in step 220 is negative, whereupon CPU 100, in step 224, clears PROFL and the PROGRAM LED 27.

Thereafter, in step 228, CPU 100 determines if MEMFLG has been set. Let it be assumed that power has been initially applied to the microprocesor, or that an event memory malfunction has occurred, and that MEMFLG has been set in step 208. The determination in step 228 is therefore affirmative, whereupon CPU 100, in step 230, clears the output terminals in ports 106, 108 and 110A, 110B, and clears all memory locations within the event memory. CPU 100 also sets (i.e., lights) the FAULT LED 44, and causes the production of a tone by audible alarm 54, to accordingly signify to the user that the microprocessor must be placed in its program mode. CPU 100 then returns to step 202, and continues to circulate in the loop described until the user has actuated the program enable switch 48.

MAIN PROGRAM LOOP—PROGRAM MODE

Upon actuation of the program enable switch 48, the determination in step 211 is affirmative, whereuon CPU 100, in step 214, determines if the mode switch 26 has been set to its PROGRAM position. If the user has set the mode switch 26 to its PROGRAM position before actuating the program enable switch 48, the determination in step 214 is affirmative, whereby CPU 100 proceeds through steps 218 et seq. as previously described, whereupon the FAULT LED 44 and the tone from audible alarm 54 are maintained on to signify to the user that the program mode must be entered in a proper manner.

If the user has not set the mode switch 26 to its PROGRAM position before actuating the program enable switch 48, however, the determination in step 214 is negative, whereupon CPU 100, in step 216, sets the TPROGRAM timer to a count representing five seconds.

Upon setting of TPROGRAM, the determination in step 218 is negative, whereupon CPU 100, in step 222, again determines if the mode switch 26 has been set to the PROGRAM position. If the determination in step 222 is negative, CPU 100 continues to loop through steps 224, 228, 230, 202, 203, 204, 206, 208, 211A, 211C, 211D, 212, 218, 220 and 222 for a period of five seconds (i.e., until TPROGRAM has decremented to zero), acccordingly giving the user that period of time in which to set the mode switch 26 to the PROGRAM position.

Assuming that the user has set the mode switch 26 to the PROGRAM position within the five-second period, the determination in step 222 is affirmative, whereupon CPU 100, in step 226, sets the PROFL operation flag, sets the PROGRAM LED 27, and sets the PRFLG operation flag. CPU 100 then proceeds, in step 232, to determine if MEMFLG has been set. If the determination in step 232 is affirmative, CPU 100, in step 234, proceeds to clear the output terminals in ports 106, 108, and 110A and 110B, to clear the event memory locations in the event memory, to load the fields within the DPLR register which are coupled to the display 28 with zeros (excepting the LOAD field in the DPLR register which is loaded with blank data), whereupon the LOAD character display in display 28 is blanked and the remaining character displays in display 28 each display "0," and to set the PRFLG and PWFLG operation flags. CPU 100 also sets TFAULT to one second, and sets the FAULT LED 44 and the tone from audible alarm 54 until the count within TFAULT is decremented to zero. The indication provided by the momentary lighting of the FAULT LED 44, and the concurrent production of a tone from audible alarm 54, signifies to the user that the event memory has been cleared and that a new schedule must be entered therein. From step 234, CPU 100 proceeds to its PROGRAM mode 242.

If the determination in step 232 is negative (e.g., there is no event memory malfunction and the user wishes to alter a previously-entered schedule), CPU 100 does not undertake the actions in step 234, but rather proceeds directly to its PROGRAM mode 242.

Within step 244 in the PROGRAM mode 242, the HOLI field in the DPLR register is cleared. As explained hereinafter, the HOLI field is set when the day in real-time corresponds to a day selected as a holiday. Also, the HOLY data byte in the scratch pad memory (FIG. 5) within RAM 104 includes seven HOLYB bits, one for each day of the week, with each HOLYB bit being set, during the time that the microprocessor is in its run/verify mode of operation, when the user selects the corresponding day as a holiday upon actuation of the HOLIDAY key in keyboard 38.

After clearing HOLI, CPU 100 calls a REAL-TIME CLOCK routine, a REAL-TIME SET routine, and a KEYBOARD routine in sequence, along with their associated routines and subroutines, as described in detail hereinafter. In summary, the actions undertaken by CPU 100 in step 244 allows: for the updating of the fields within the SDC register in accordance with real-time information obtained from the hardware clock; for setting of the time within the hardware clock to any desired time; and, for the servicing of a keyboard entry by the user through use of the keyboard 38. From step 244, CPU 100 proceeds, in step 246, to calculate and store MEMWD. From step 246, CPU 100 then exits from the PROGRAM mode 242 and returns to step 203. The determination in step 206 is now affirmative, as a result of which CPU 100 proceeds in step 210, to clear MEMFLG. Assuming that the mode switch 26 remains at the PROGRAM position, CPU 100 will again return to its PROGRAM mode 242. As an example, let it be assumed that TPROGRAM has decremented to zero. Accordingly, the determination in step 218 is affirmative. However, since PROFL has been set, the determination in step 220 is affirmative, whereupon CPU 100 proceeds through steps 222 and 226 to step 232. Since MEMFLG has been cleared, the determination in step 232 is negative, whereupon CPU 100 returns to the PROGRAM mode 242.

As can be appreciated, CPU 100 will continue to pass through the portion of the main program loop including the PROGRAM mode 242 for as long as the mode switch 26 is set to the PROGRAM position. Therefore, the user is permitted whatever time is required to enter a schedule into the microprocessor.

ENTERING OR ALTERATION OF TIME SCHEDULE

Figure 12:
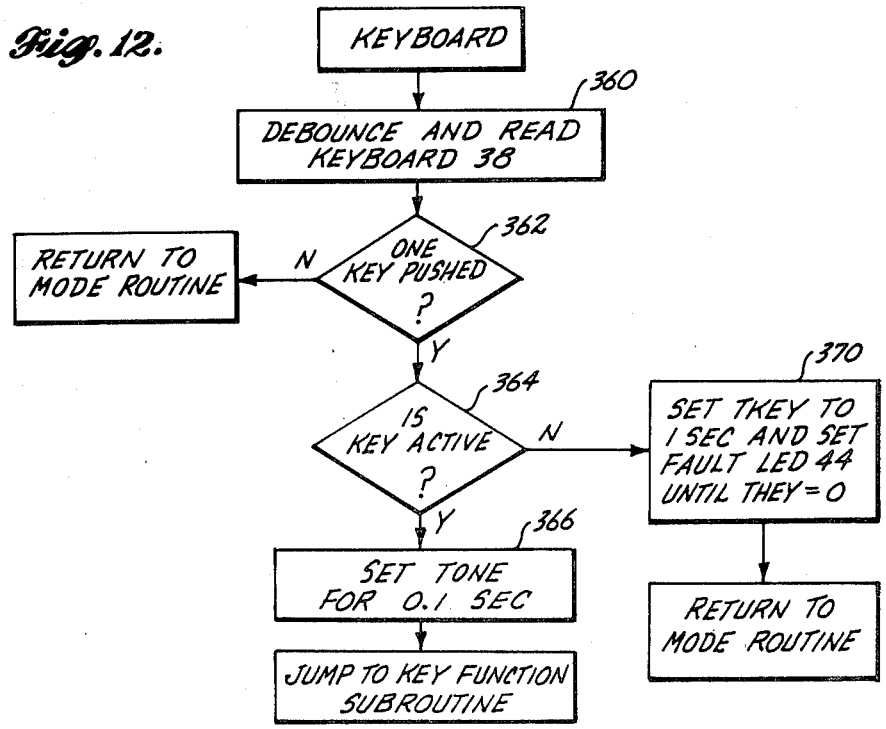
FIG. 12 is a flow chart of the program steps undertaken by the microprocessor in a KEYBOARD routine.
Figure 13:
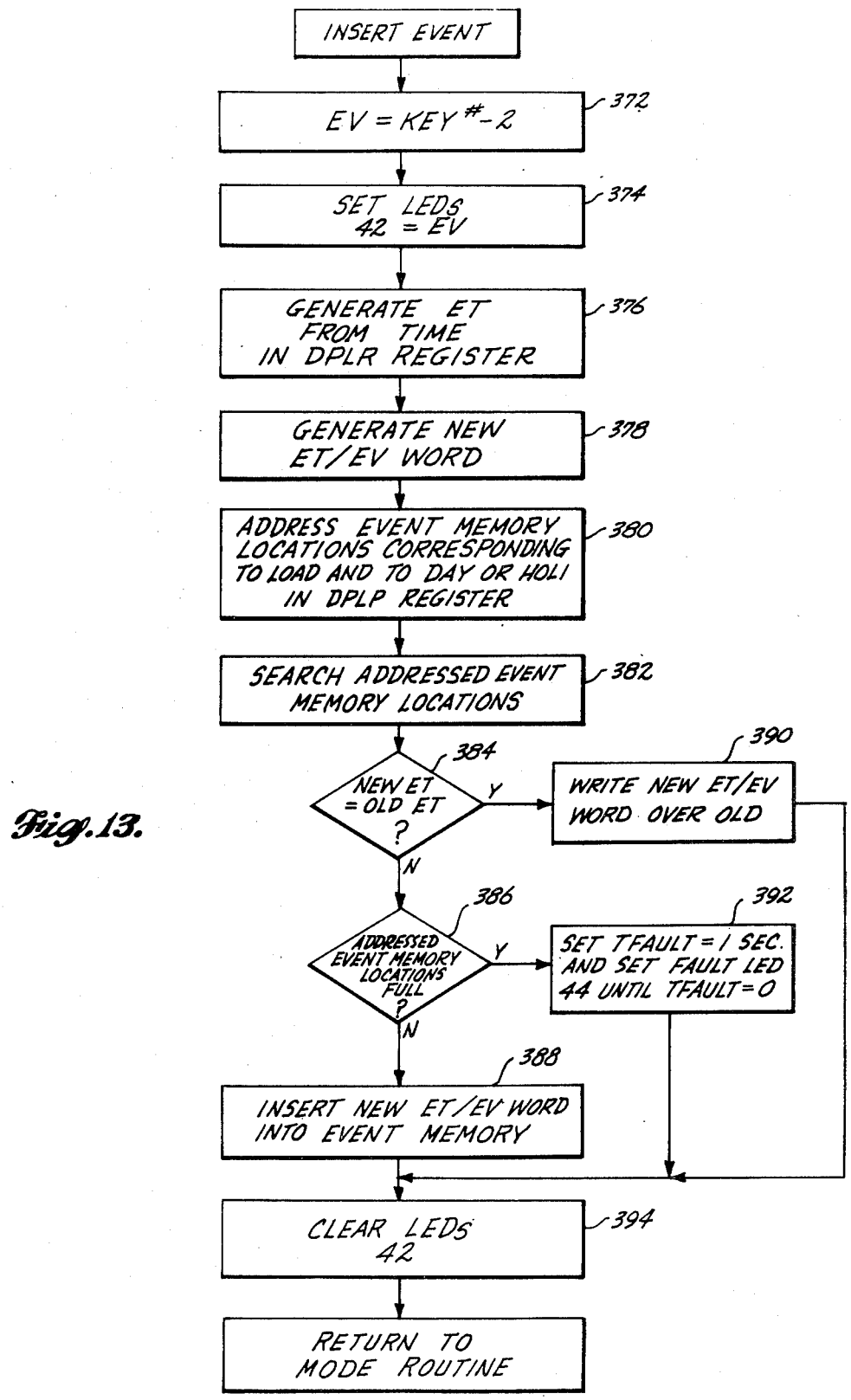
FIG. 13 is a flow chart of the program steps undertaken by the microprocessor in an INSERT EVENT subroutine.
Figure 14:
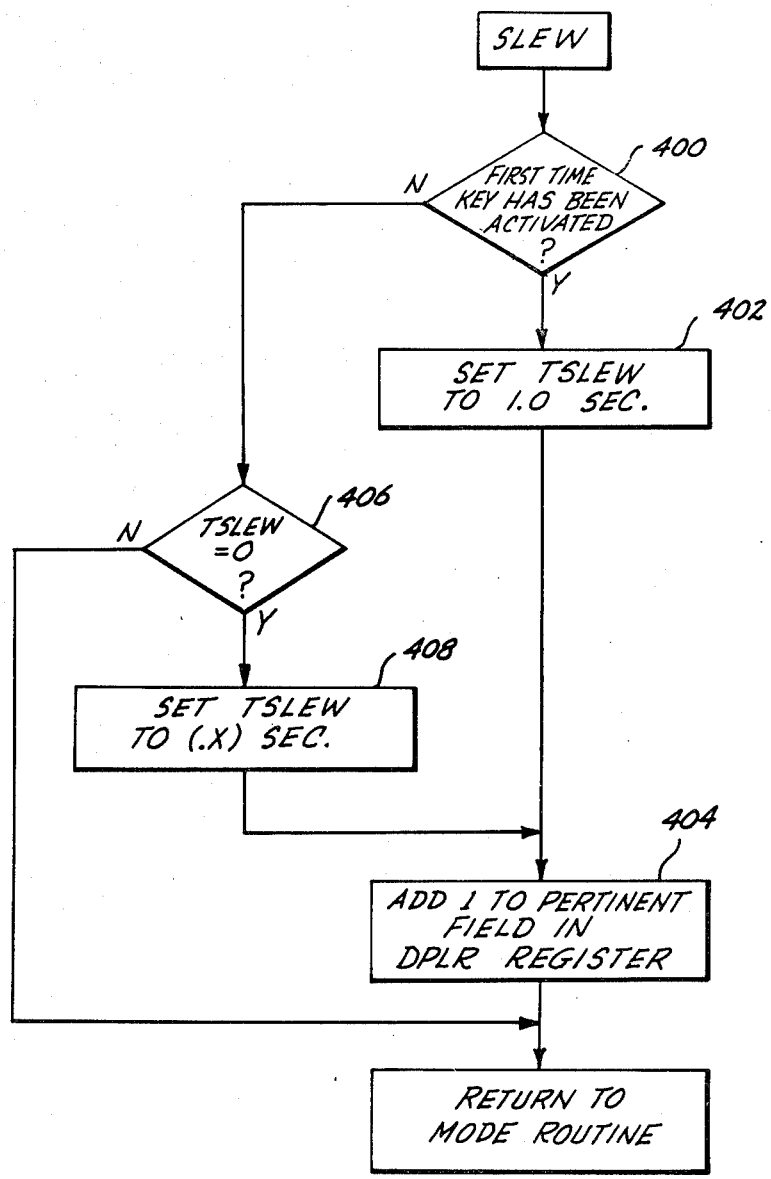
FIG. 14 is a flow chart of the program steps undertaken by the microprocessor in a SLEW subroutine.
Figure 15:
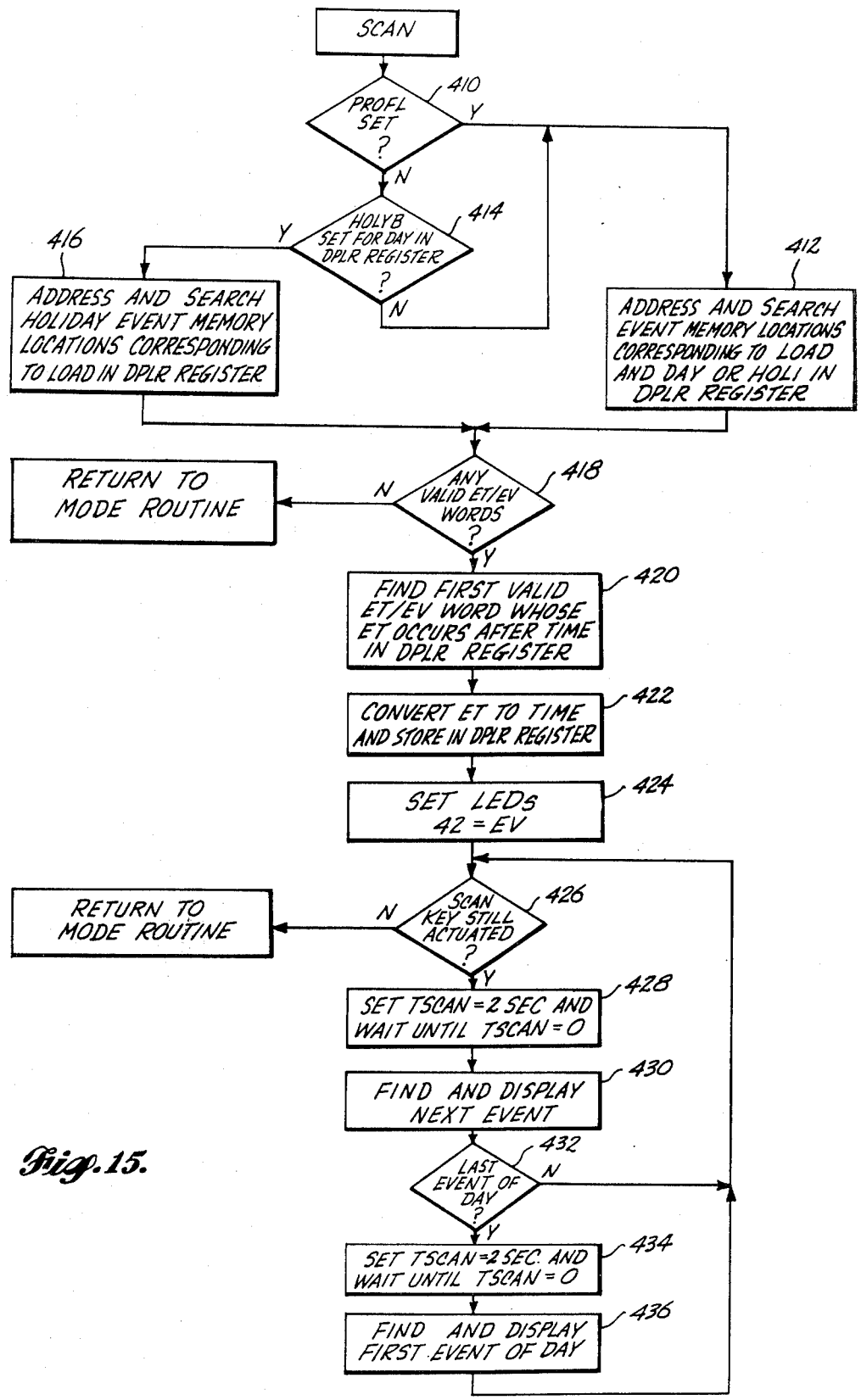
FIG. 15 is a flow chart of the program steps undertaken by the microprocessor in a SCAN subroutine.

Let it be assumed that CPU 100 has processed the REAL-TIME CLOCK and REAL-TIME SET routines within step 244 in the PROGRAM mode 242, and has proceeded to the KEYBOARD routine illustrated in FIG. 12. Initially, CPU 100, in step 360, debounces and reads the keyboard 38, and effects transfer of data from the input terminals of port 108 to internal registers within CPU 100. In step 362, CPU 100 then determines if one, and only one, key has been actuated. If the determination in step 362 is negative, i.e., the user has made an error in data entry by actuating more than one key, CPU 100 returns to the mode routine currently being processed (in the case being discussed, the PROGRAM mode 242). Whenever CPU 10 is stated, in the ensuing discussion, as "returning to the mode routine," it should be understood that CPU 100 jumps to the next routine, or branch routine, in the step then being executed, or to the next step in the mode routine then being executed. For example, if CPU 100 is in the PROGRAM mode 242, and if the determination in step 362 is negative, CPU 100 jumps to step 246.

If the determination in step 362 is affirmative, however, CPU 100 proceeds, in step 364, to determine if the key that has been actuated is an "active" key. In this regard, only certain of the keys in the keyboard 38 are active when the microprocessor is in its program mode of operation, and only certain of the keys in keyboard 38 are active when the microprocessor is in its run/verify mode of operation. CPU 100 makes the determination in step 364 by referring to a look-up table in PROM 102 which contains a listing of pertinent information relating to the keys in keyboard 38. Table II sets forth an example of such a listing.

TABLE II

| Key# | Key Label | Mode Run/Verify | Mode Program | Key Function Subroutine |
|---|---|---|---|---|
| 1 | REPEAT | E | A | REPEAT |
| 2 | (OFF) 0 | E | A | INSERT EVENT |
| 3 | 5 | E | A | INSERT EVENT |
| 4 | 10 | E | A | INSERT EVENT |
| 5 | 15 | E | A | INSERT EVENT |
| 6 | 20 | E | A | INSERT EVENT |
| 7 | 25 | E | A | INSERT EVENT |
| 8 | (ON) 30 | E | A | INSERT EVENT |
| 9 | CLEAR | E | A | CLEAR |
| 10 | HOLIDAY | A | E | HOLIDAY |
| 11 | TIME | A | A | TIME |
| 12 | SCAN | A | A | SCAN |
| 13 | MINUTE | A | A | SLEW |
| 14 | HOUR | A | A | SLEW |

TABLE II-continued

| Key# | Key Label | Mode Run/Verify | Mode Program | Key Function Subroutine |
|---|---|---|---|---|
| 15 | DAY | A | A | SLEW |
| 16 | LOAD | A | A | SLEW |

E—ERROR
A—ACTIVE

If the determination in step 364 is affirmative, CPU 100, in step 366, sets the audible alarm 54 for a period of 0.1 second, whereupon a momentary tone is sounded thereby to signify to the user that a proper data entry has been made, and then jumps to a key function subroutine for the particular key that has been pressed. Table II also contains a listing of the key function subroutines for each of the keys within keyboard 38.

If the determination in step 364 is negative, i.e., the actuated key is not active (reference again Table II), CPU 100 proceeds, in step 370, to set the TKEY timer to a count representing one second, and sets the FAULT LED 44 until the count within TKEY equals zero, thereby signifying to the user that an improper data entry has been attempted. From step 370, CPU 100 returns to the mode routine then being executed.

The user will have been instructed to enter the schedule for load control into the microprocessor by selecting each load and each day and by selecting each event time and corresponding control event for the thus-selected load and day. In order to select a load, the user actuates the LOAD key in keyboard 38, and in order to select the event time and day, the user actuates the MINUTE, HOUR and DAY keys in keyboard 38. The actuation of any of these keys causes CPU 100 to jump to the SLEW key function subroutine illustrated in FIG. 14. Initially, CPU 100, in step 400, determines if the key actuation is the first such actuation for the key in the processing of the mode routine then being executed. If the determination in step 40 is affirmative, CPU 100, in step 402, sets the TSLEW timer to a count representing one second, and then proceeds, in step 404, to add a decimal "1" to the pertinent field in the DPLR register. Let it be assumed that the LOAD key has been actuated and that the LOAD field in the DPLR register contains blank data (e.g., step 234, FIG. 7(b)). The LOAD field in the DPLR register will contain data, after step 404, representing "1" which will result in the numeral "1" being displayed by the LOAD character display in display 28. From step 404, CPU 100 returns to the mode routine.

If the key remains actuated, CPU 100 returns to the SLEW key function subroutine upon its next pass through the main program loop. At this time, the determination in step 400 is negative, whereupon CPU 100 proceeds, in step 406, to determine if the count in TSLEW is equal to zero. The initial determination in step 406 will be negative (since TSLEW has been set to a count representing one second), whereupon CPU 100 returns to the mode routine. CPU 100 continues to pass through the main program loop in this manner until TSLEW has been decremented to zero, whereupon the determination in step 406 is affirmative. Thereafter, CPU 100, in step 408, ets TSLEW to a count representing .x second (with x being dependent on the key that has been actuated), and then returns to step 404, wherein the pertinent field in the DPLR register is incremented so that the display afforded by the corresponding character display in display 28 is incremented by decimal "1". Accordingly, the user may select a desired load by actuating and holding the LOAD key until the desired load number appears in the display 28. Likewise, the user may select a desired event time and day by actuating and holding the MINUTE, HOUR, and DAY keys until the desired event time is displayed by display 28, LEDs 30, 32 and LEDs 40. Since it is desired to increment the display of minutes at a faster rate than the load number, hour and day displays, the factor x utilized in step 408 for the MINUTE key is preferably much less than that utilized for the LOAD, HOUR and DAY keys. At this point, it should be noted that when the DAY field in the DPLR register has been incremented to its full count (i.e., seven days), continued actuation of the DAY key will cause the DAY field ot overflow and the HOLI field to be set. Upon overflow of any field in the DPLR register, that field will be cleared so that the corresponding display can be continuously advanced for as long as the corresponding key is actuated.

With the load, day, and event time thus selected, the operator will have been instructed to select a control event by actuation of one of the event keys in the keyboard 38. Upon actuation of an event key, CPU 100 jumps to the INSERT EVENT key function subroutine illustrated in FIG. 13. Initially, CPU 100, in step 372, generates an EV number, representing the desired control function, as equal to the key number (reference Table II) minus 2. For convenience, the EV numbers are listed in Table III.

TABLE III

| EV | KEY | |
|---|---|---|
| 6 | 30(ON) | |
| 5 | 25 | |
| 4 | 20 | |
| 3 | 15 | DUTY-CYCLE CONTROL FUNCTION |
| 2 | 10 | |
| 1 | 5 | |
| 0 | 0(OFF) | |

In step 374, CPU 100 lights the corresponding LED 42. In step 376, CPU 100 generates an event time ET from the TIME fields within the DPLR register (which represent the selected event time). In step 378, CPU 100 then generates a new ET/EV data word from the EV number and event time ET generated in steps 372 and 376, with the format of the ET/EV data word corresponding to that illustrated in FIG. 6.

CPU 100 then proceeds, in step 380, to address the event memory locations corresponding to the LOAD field and to the DAY or HOLI fields in the DPLR register. In step 382, CPU 100 searches the addressed event memory locations. CPU 100 then determines, in step 384, if the ET in the new ET/EV data word corresponds to an ET in the addressed event memory locations, i.e., the selected event time corresponds to an event time of a previously entered control event. If the determination in step 384 is negative (e.g., the event memory has been cleared), CPU 100, in step 386, determines if the addressed event memory locations are full. If the determination in step 386 is negative, CPU 100 proceeds, in step 388, to insert or store the new ET/EV data word into an appropriate location in the event memory. CPU 100 then proceeds, in step 394, to clear the LED 42 which was lit in step 374, and thereafter returns to the mode routine.

Let it be assumed that the event memory already contains one or more ET/EV data words in the event memory locations addressed in step 382. If the ET in the new ET/EV data word corresponds to any ET in the addressed event memory locations, the determination in step 384 is affirmative so that CPU 100 proceeds, in step 390, to write the new ET/EV data word over the old ET/EV data word having the same ET, and then returns to step 394. Likewise, if the addressed event memory locations are full, e.g., they contain eight ET/EV data words, the determination in step 386 is affirmative, whereupon CPU 100, in step 392, sets TFAULT to a count representing one second, and sets the FAULT LED 44 until the count within TFAULT goes to zero, to thereby signify to the user that an improper data entry has been attempted. From step 392, CPU 100 proceeds to step 394.

In this manner, the schedule for load control for an entire week can be entered into the event memory. If the user wishes to copy the schedule for a selected load and for a selected day into the event memory locations for that load and for one or more, succeeding days, the user will actuate the REPEAT key in keyboard 38. Actuation of the REPEAT key causes CPU 100 to jump to the REPEAT key function subroutine illustrated in FIG. 16. Initially, CPU 100, in step 440, copies the ET/EV data words in the event memory locations corresponding to the selected day and load (represented by the DAY and LOAD fields in the DPLR register) into the event memory locations corresponding to the succeeding day and to the selected load. In step 442, CPU 100 then proceeds to increment the DAY field in the DPLR register by one, whereupon the LED 40 for the succeeding day is lit to accordingly signify to the user that the schedule has been copied, and then returns to the mode routine. If desired, the user may copy the schedule for additional succeeding days by subsequent actuations of the REPEAT key.

Likewise, the user may wish to erase the schedule for a selected day and load. Accordingly, the user, after selecting the day and load by actuation of the DAY and LOAD keys in the manner previously described, actuates the CLEAR key in keyboard 38, whereupon CPU 100 jumps to the CLEAR subroutine illustrated in FIG. 17. In step 450, the event memory locations corresponding to the thus-selected day and load (represented by the DAY and LOAD fields in the DPLR register) are filled with invalid data words, e.g., zeros. Thereafter, CPU 100 returns to the mode routine.

TRANSFER OF REAL-TIME INFORMATION FROM CLOCK

Figure 10:
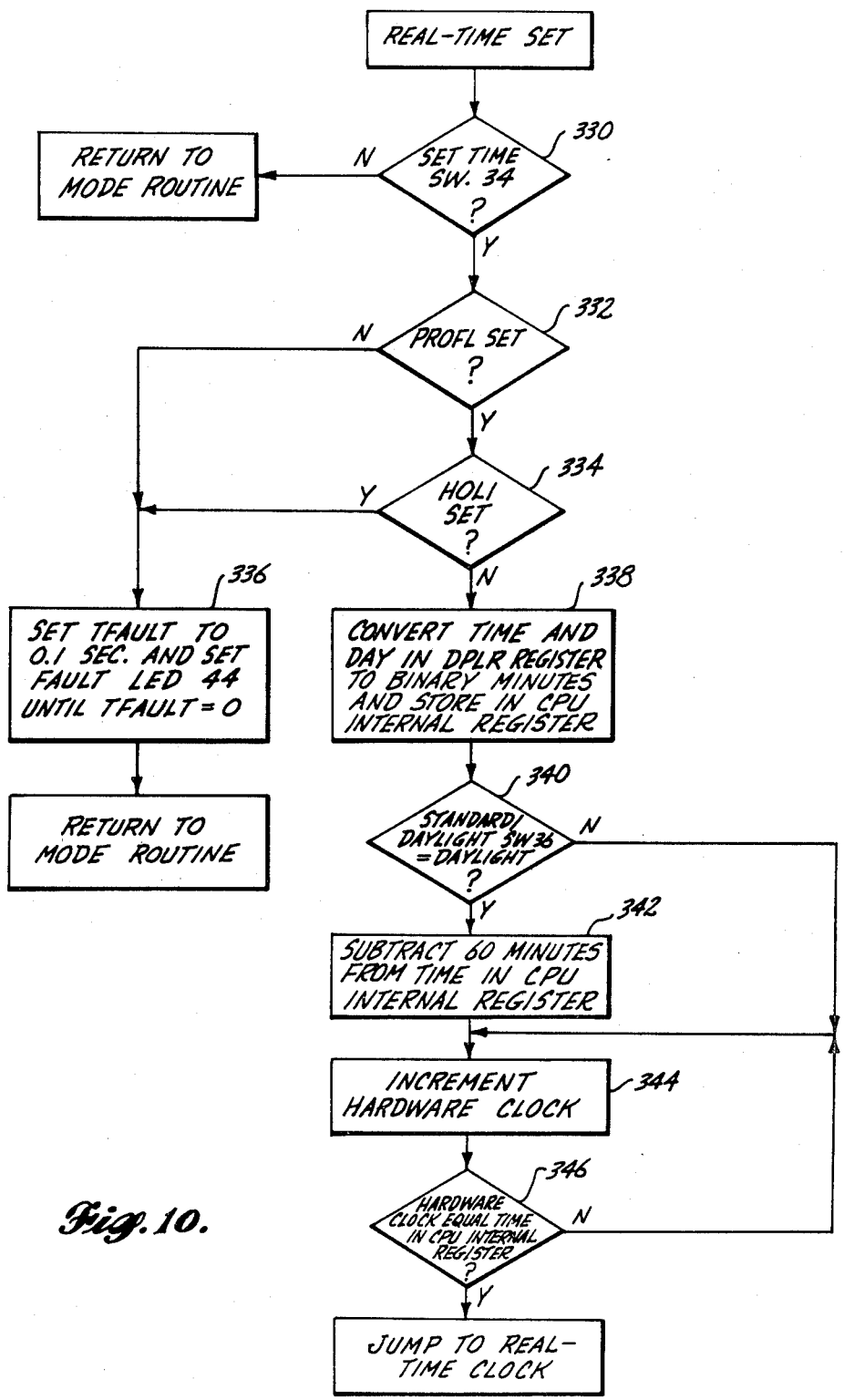
FIG. 10 is a flow chart of the program steps undertaken by the microprocessor in a REAL-TIME SET routine.

During each pass through step 244 in the PROGRAM mode 242, the CPU 100 calls the REAL-TIME CLOCK routine (FIG. 8) and the REAL-TIME SET routine (FIG. 10).

Figure 8:
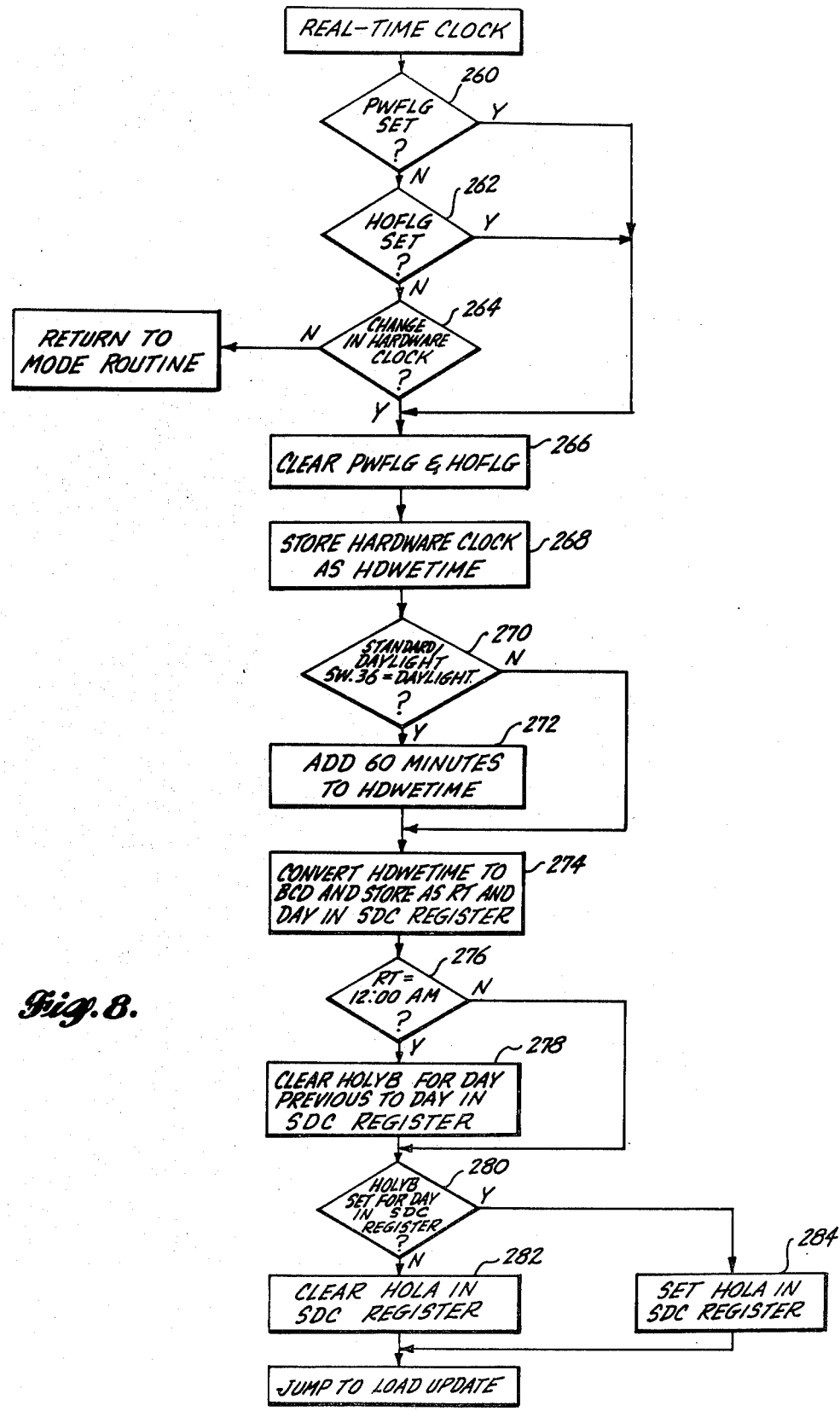
FIG. 8 is a flow chart of the program steps undertaken by the microprocessor in a REAL-TIME CLOCK routine.
Figure 9A:
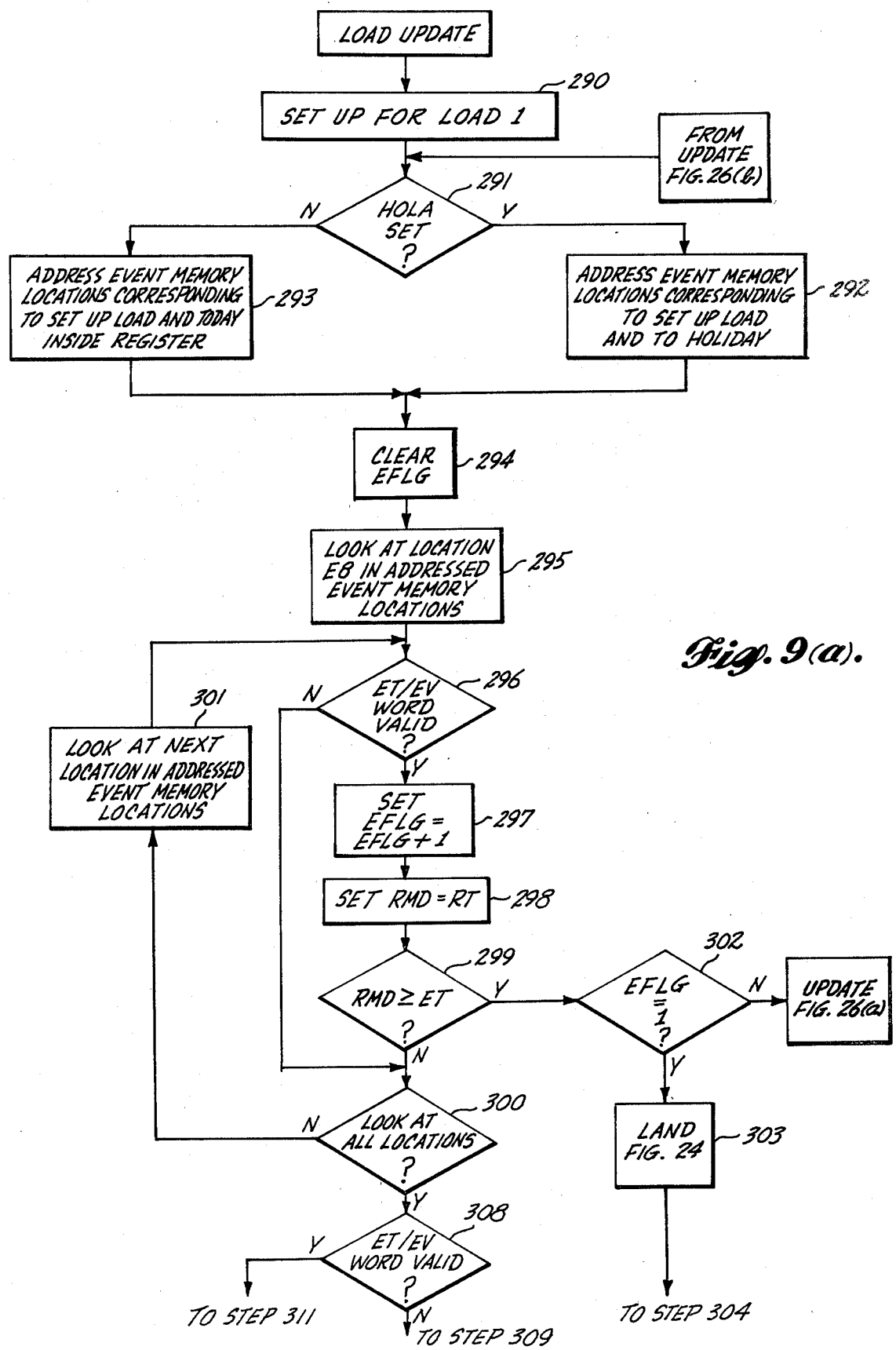
FIGS. 9(a) and 9(b) are a flow chart of the program steps undertaken by the microprocessor in a LOAD UPDATE routine.
Figure 9B:
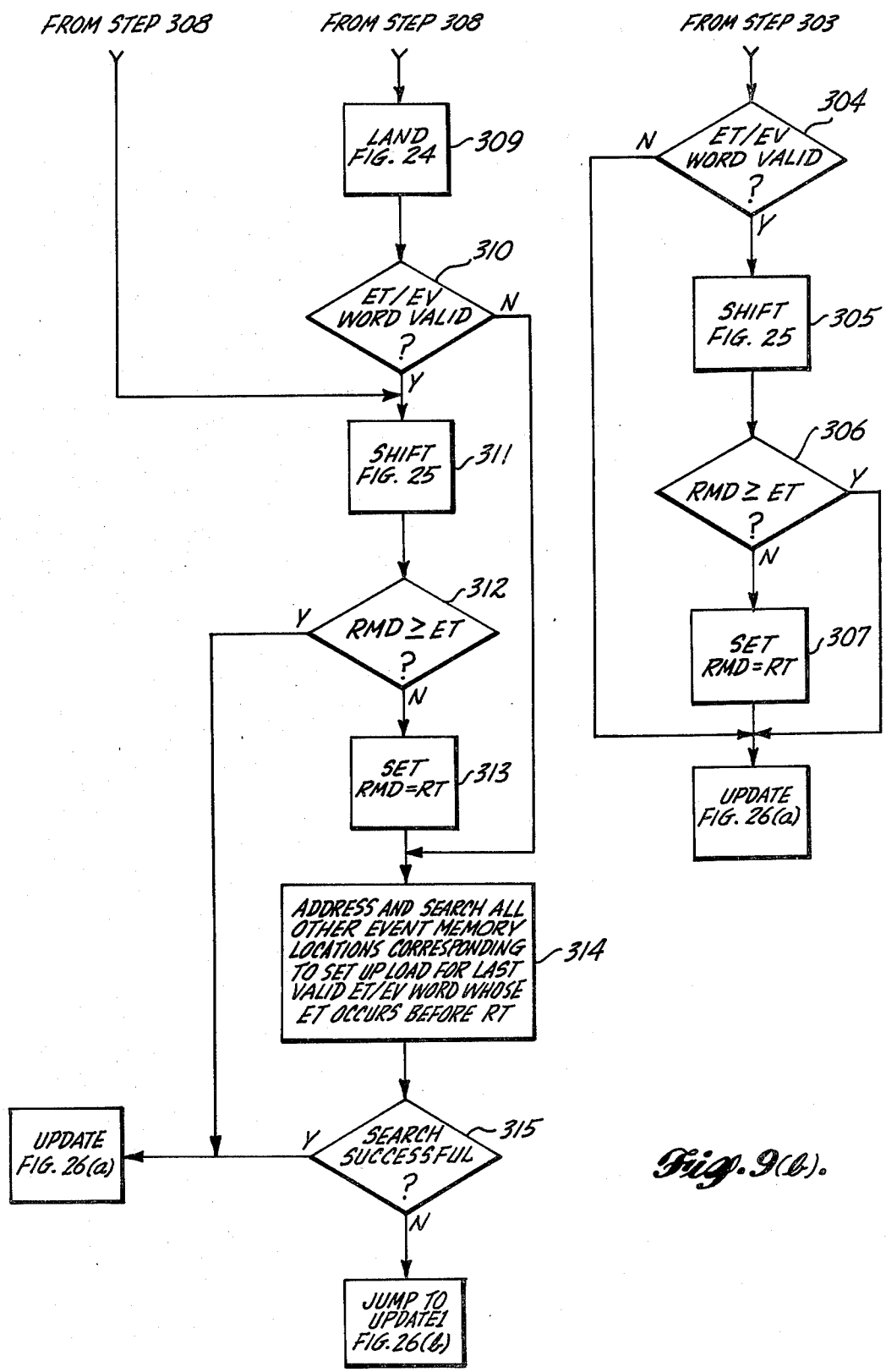

With reference now to FIG. 8, the REAL-TIME CLOCK routine permits the contents of the SDC register to be updated to correspond to the real-time information within the hardware clock. Also, the HOLA field within the SDC register is set, or cleared, depending upon whether the real-time day has been selected as a holiday. Further, by jumping to a LOAD UPDATE routine illustrated in FIG. 9, the desired status of each load is updated through comparison of the contents of the SDC register with the schedule contained in the event memory.

In the REAL-TIME CLOCK routine, CPU 100 proceeds to update the contents of the SDC register, but only upon the occurrence of any one of three conditions: a POWER UP condition or an event memory malfunction has occurred, e.g., PWFLG is set in step 202, see FIG. 7(a); the HOLIDAY key in keyboard 38 has been actuated when the microprocessor is in its run/verify mode of operation, e.g., the HOFLG operation flag has been set, as described hereinafter; or, the time within the hardware clock has changed since the previous pass of CPU 100 through the REAL-TIME CLOCK routine. CPU 100 accordingly determines if any of these conditions have been met in steps 260, 262 and 264. If none of the conditions have been met, CPU 100 returns to the mode routine. If any of the conditions have been met, CPU 100 proceeds, in step 266, to clear PWFLG and HOFLG. Thereafter, CPU 100, in step 268, stores the time within the hardware clock (which is a binary representation of the minutes that have transpired since the beginning of the week, as previously described) as the HDWETIME data byte in RAM 104. In step 270, CPU 100 determines if the STANDARD/DAYLIGHT switch 36 has been set to the DAYLIGHT position. If the determination in step 270 is affirmative, CPU 100 proceeds, in step 272, to add the binary representation of sixty minutes to HDWETIME, and then proceeds to step 274. If the determination in step 270 is negative, CPU 100 proceeds directly to step 274. At this point, it should be noted that the time within the hardware clock is always in standard time, and that the corresponding real-time information in the SDC register is advanced by sixty minutes from the time in the hardware clock only upon setting of the STANDARD/DAYLIGHT switch 36 to the DAYLIGHT position.

In step 274, HDWETIME (in binary minutes) is converted to corresponding day, am/pm, hour and minute information (in BCD form) and stored in the appropriate RT and DAY fields within the SDC register (FIG. 5).

In step 276, CPU 100 determines if the real-time information within the RT fields in the SDC register represents 12:00 am, i.e., a new day has begun. If the determination in step 276 is affirmative, CPU 100 proceeds, in step 278, to clear the HOLYB bit (in HOLY) for the day immediately previous to the day represented by the DAY field in the SDC register. HOLY includes a HOLYB bit for each day of the week, with the HOLYB bit being set as described hereinafter upon actuation of the HOLIDAY key in keyboard 38. By undertaking the actions in step 278, CPU 100 insures that the holiday schedule in the event memory will be followed only upon the first occurrence of the day selected as a holiday following actuation of the HOLIDAY key. From step 278, CPU 100 proceeds to step 280. Likewise, if the determination in step 276 is negative, CPU 100 proceeds directly to step 280.

In step 280, CPU 100 determines if the HOLYB bit (in HOLY) has been set for the day represented by the DAY field in the SDC register. If the determination in step 280 is affirmative, the HOLA field in the SDC register is set in step 284. If the determination in step 280 is negative, the HOLA field in the SDC register is cleared in step 282. From either step 282 or step 284, CPU 100 jumps to the LOAD UPDATE routine illustrated in FIG. 9.

UPDATING OF LOAD OUTPUT STATUS UNDER REAL-TIME CONTROL—IN GENERAL

Figure 24:
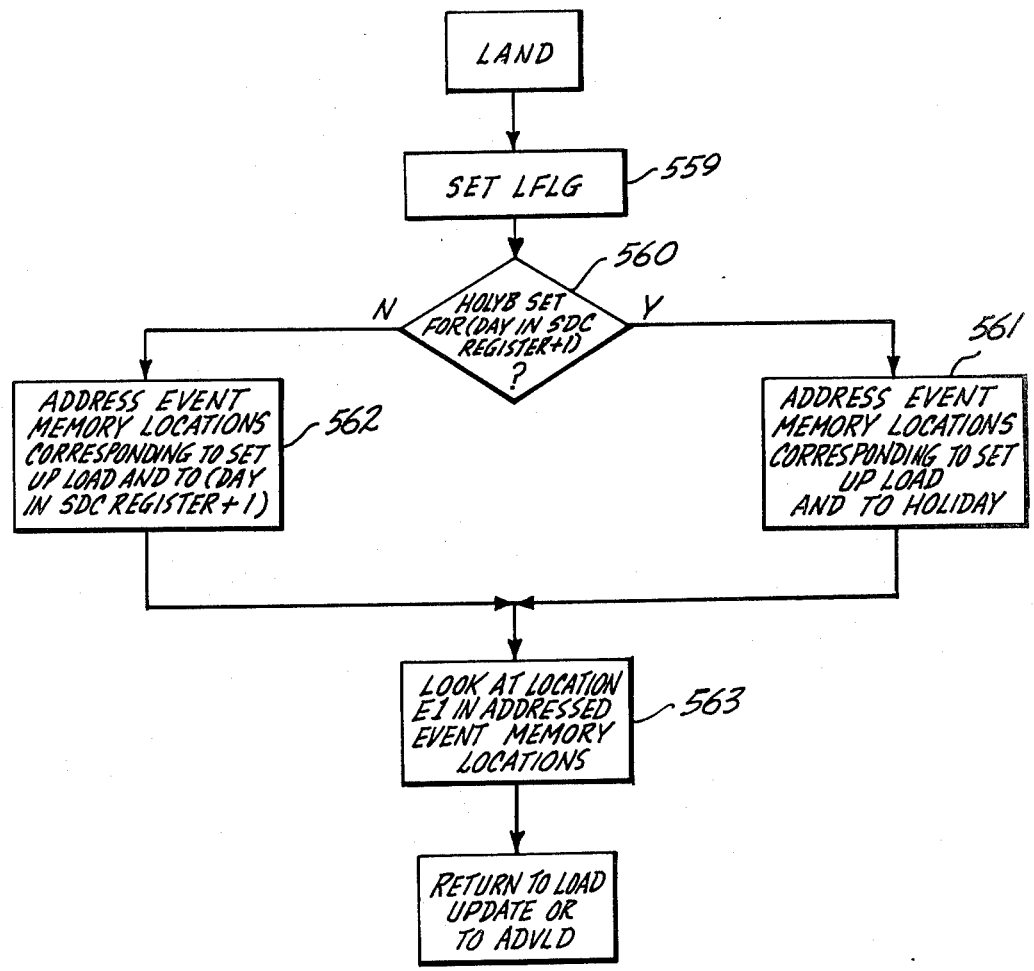
FIG. 24 is a flow chart of the program steps undertaken by the microprocessor in a LAND subroutine.

Within the LOAD UPDATE routine and its various subroutines (LAND, FIG. 24; SHIFT, FIG. 25; and, UPDATE, FIGS. 26(a), 26(b)), the status of each load is updated through a comparison of the real-time information within the SDC register with a schedule for that load contained in the event memory. If the advance start modification is being made to real-time control, the real-time information used for comparison comprises that within the SDC register plus an advance time that represents the amount of time, in advance of the event time of the next control event, that is predicted by the microprocessor that a selected heating or cooling load is to be turned on or duty-cycled in order to bring the temperature within the facility to a comfortable level during periods of occupancy. In making the aforementioned comparison, the microprocessor searches through its event memory for that control event associated with a given load whose event time is such that the control event is active in real-time, i.e., that control event whose event time immediately procedes real-time. If the advance start modification is being implemented, the control event selected by the microprocessor comprises that whose event time immediately precedes the summation of real-time and advance time. To give an example, let it be assumed that real-time is 2:00 am, that the event times for the first two control events of that day are respectively 1:00 am and 6:00 am, and that the advance time is five hours. If the advance start modification is not being implemented, the active control event at 2:00 am will be the first control event whose event time is 1:00 am. If the advance start modification is being implemented, then the active control event will be the second control event whose event time is 6:00 am.

Specifically, the aforementioned comparison is effected by application of the following mathematical relationship:

$$|ET-RT| \ MOD(EV_{max}*NUM) \geq (EV*NUM)$$

where $|ET-RT|$ = the absolute difference, in minutes, between the event time of the active control event and real-time (or real-time plus advance time if the advance start modification is being implemented);

NUM = the smallest number of minutes in any control interval for which a change in load status will be effected (in the embodiment being discussed, NUM=5);

$|ET-RT| \ MOD(EV_{max}*NUM)$ = the remainder after dividing $|ET-RT|$ by $(EV_{max}*NUM)$;

EV is an integer representing the active control event (see Table III), ranging from $EV_{min}=0$ for an off control function to $EV_{max}$ for an on control function, where $EV_{max}=6$; and, $(EV_{max}*NUM)$ is the number of minutes in a control interval.

If this relationship is satisfied for a given load, the load is to be off. If the relationship is not satisfied, the load is to be on.

To give an example, let it be assumed that real-time is 1:35 pm, the advance time is zero, the event time of the active control event is 8:40 am, and EV=3 (a duty-cycle control function).

Therefore:

$|ET - RT| = 295$ $(EV_{max} * NUM) = (6 * 5) = 30$ $(EV * NUM) = (3 * 5) = 15$

-continued $|ET - RT| \ MOD(EV_{max} * NUM)$ = remainder after 295/30

$= 25$

Since 25 is greater than [(EV * NUM)=15], the relationship is satisfied and the load is to be off.

Intuitively, it can be seen that the current control interval will have commenced at 1:10 pm. At 1:35 pm, twenty-five minutes have elapsed since the beginning of the control interval. Since the load is being controlled in accordance with a duty-cycle control function in which the load is on only for the first fifteen minutes of each control interval, the load is to be off.

As another example, let it be assumed that EV=6, with the same real-time and event time as in the previous example.

Therefore:

$|ET - RT| = 295$ $(EV_{max} * NUM) = 30$ $(EV * NUM) = (6 * 5) = 30$ $|Et - RT| \ MOD(EV_{max} * NUM)$ = remainder afer 295/30

$= 25$

Since 25 is less than [(EV * NUM)=30], the relationship is not satisfied. In fact, when EV=6, the remainder can never be greater than or equal to (EV * NUM), so that the load is always on.

Likewise, when EV=0, the remainder is always greater than or equal to (EV * NUM), so that the load is always off.

If the duty-cycle shift modification is being implemented, the value of EV used in the aforementioned relationship may be increased from that contained within the event memory for those loads whose active control event represents a duty-cycle control function, in response to the deviation of inside temperature at the facility from a predetermined reference temperature. Accordingly, the "on" time of a given load being currently controlled with a duty-cycle control function may be increased during each control interval as needed.

If the aforementioned relationship is satisfied, the microprocessor proceeds to clear a bit Bx, corresponding to load x, in the LBYTE data byte. If the relationship is not satisfied, the microprocessor proceeds to set the corresponding bit Bx in LBYTE. When a bit Bx is cleared in LBYTE, load x is to be off, and, when the corresponding bit Bx in LBYTE is set, load x is to be on. In addition, the microprocessor determines if the active control event represents either an on or an off control function, i.e., does EV equals 6 or 0 (reference Table III). If the determination is negative, i.e., the active control event represents a duty-cycle control function, the microprocessor proceeds to set a bit Bx, corresponding to load x, in the STBT data byte. If this determination is affirmative however, the microprocessor proceeds to clear the corresponding bit Bx in STBT.

As an example, let it be assumed that loads 1, 3, 4, 7 are to be on, and that loads 2, 4, 7 and 8 are being controlled with a duty-cycle control function.

Therefore:

|       |   | 8 | 7 | 6 | 5 | 4 | 3 | 2 | 1 |
|-------|---|---|---|---|---|---|---|---|---|
| LYBTE | = | 0 | 1 | 0 | 0 | 1 | 1 | 0 | 1 |
| STBT  | = | 1 | 1 | 0 | 0 | 1 | 0 | 1 | 0 |

(load number across columns 8–1; Bx)

The foregoing description should be sufficient to understand the overall operation of the microprocessor while proceeding through the LOAD UPDATE routine and various subroutines, and a detailed description will be deferred until after consideration of the apparatus in FIG. 22 and the routines and subroutines executed by the microprocessor in conjunction therewith.

At this point, it should be noted that the actual energization states of the load relays are not changed until the microprocessor enters either its run/verify mode or its run mode, as hereinafter described. When CPU 100 enters the PROGRAM mode 242 upon the occurrence of an event memory malfunction (i.e., MEMFLG is set), all loads are turned off (reference the clearing of the output terminals in port 110A in steps 230 or 234, FIG. 7(b)). In all other cases where CPU 100 enters the PROGRAM mode 242, the loads are maintained on or off in accordance with the then-existing energization states of the load relays. Change of the energization states of the load relays can be effected only in the OUTPUT & STAGE routine (FIG. 20) which is described hereinafter. From the LOAD UPDATE routine and its various subroutines, CPU 100 returns to the mode routine.

SETTING OF TIME INFORMATION IN CLOCK

While still in step 244 in the PROGRAM mode 242, CPU 100 will call the REAL-TIME SET routine illustrated in FIG. 10. The user will have been instructed to select a desired time by advancing the time displayed in display 28, LEDs 30, 32 and LEDs 40 through actuation of the DAY, HOUR, and MINUTE keys in the keyboard 38, and then to actuate the SET TIME switch 34. Initially, a determination is made, in step 330, as to whether the SET TIME switch 34 has been actuated. If the determination in step 330 is negative, CPU 100 returns to the mode routine. If the determination in step 330 is affirmative, e.g., the user wishes to change the time within the hardware clock, CPU 100 proceeds to effect such an adjustment only if CPU 100 is in the PROGRAM mode 242 and if the user has not caused the HOL LED 40 to be lit. Accordingly, a determination is made in step 332 as to whether PROFL has been set and a determination is made in step 334 as to whether the HOLI field in the DPLR register has been set. If the determination in step 332 is negative or if the determination in step 334 is affirmative, CPU 100 proceeds, in step 336, to set TFAULT to a count representing 0.1 second, and sets the FAULT LED 44 until the count in TFAULT is decremented to zero, thereby signifying to the user that the desired time adjustment cannot be made. From step 336, CPU 100 returns to the mode routine.

If the determination in step 332 is affirmative and the determination in step 334 is negative, however, CPU 100 proceeds, in step 338, to convert the information in the TIME and DAY fields in the DPLR register to binary minutes, and to store the same in an internal register within CPU 100. From step 338, CPU 100 proceeds, in step 340, to determine if the STANDARD/DAYLIGHT switch 36 has been set to the DAYLIGHT position. If the determination in step 340 is affirmative, CPU 100 proceeds, in step 342, to subtract the binary representation of sixty minutes from the time stored in its internal register (since the time in the hardware clock is always in standard time). From step 342, or, if the determination in step 340 is negative, CPU 100 proceeds, in step 344, to increment the time information within the hardware clock (by resetting counter 124 and by supplying a high frequency signal to counter 128 through gate 126, as previously described with reference to FIG. 2). Thereafter, CPU 100, in step 346, compares the time information within the hardware clock (which is in binary minutes) with the time in its internal register, and continues looping through step 344 and step 346 until the determination in step 346 is affirmative.

Since the time information in the hardware clock has been changed, CPU 100 jumps to the REAL-TIME CLOCK routine from step 346, whereupon the contents of the SDC register are updated, and then proceeds through the LOAD UPDATE routine and its various subroutines, whereupon the status of the loads is updated, as previously described. From the LOAD UPDATE routine and its various subroutines, CPU 100 returns to the mode routine (e.g., calls the KEYBOARD routine in step 244).

MAIN PROGRAM LOOP—RUN/VERIFY MODE

Let it be assumed that the user has completed entry of the schedule into the microprocessor, and desires the microprocessor to assume control of the loads in accordance with the thus-entered schedule. Accordingly, the user will place the mode switch 26 to either its RUN or its RUN/VERIFY positions. Let it also be assumed that no event memory malfunction or program timing error has transpired.

As a result, CPU 100, upon exiting from the PROGRAM mode 242, FIG. 7(b), passes through steps 203, 204, 206, 210, 211A, 211C, 211D, 212 and 218 to step 220, FIG. 7(a). Since PROFL was set when the microprocessor entered its program mode, the determination in step 220 is affirmative, whereupon CPU 100 proceeds to step 222. Since the mode switch 26 has been moved from its PROGRAM position, the determination in step 222 is negative, whereupon CPU 100, in step 224, clears PROFL and extinguishes the PROGRAM LED 27. From step 224, CPU 100 proceeds, through step 228, to step 236, in which a determination is made as to whether the mode switch 26 has been set to the RUN position. Let it be assumed that the user has selected the RUN/VERIFY position of mode switch 26, in which case the determination in step 236 is negative, so that CPU 100 proceeds to the RUN/VERIFY mode 240.

At this point, it should be noted that the microprocessor will also enter its run or run/verify modes of operation upon the determination of a POWER UP condition, provided that no event memory malfunction has occurred. For example, CPU 100 will proceed through steps 200, 202, 203, 204, 206, 210, 211A, 211C, 211D, 212, 218, 220, 224 and 228 to step 236. In this case, it should be remembered that PRFLG was set in step 202 and has not yet been cleared. Likewise, if the microprocessor proceeds to either the run or run/verify modes from the program mode, it should be remembered that PRFLG was set in steps 202, 226 or 234 and has not yet been cleared.

While in the RUN/VERIFY mode 240, CPU 100 clears the LEDs 42 and successively calls: the REAL-TIME CLOCK routine (and the LOAD UPDATE routine and its various subroutines) to permit updating of the contents of the SDC register and to permit updating of load status, as previously described; an XFER routine; the KEYBOARD routine (and its associated subroutines); and, the OUTPUT & STAGE routine.

DISPLAY OF REAL-TIME INFORMATION

Figure 11:
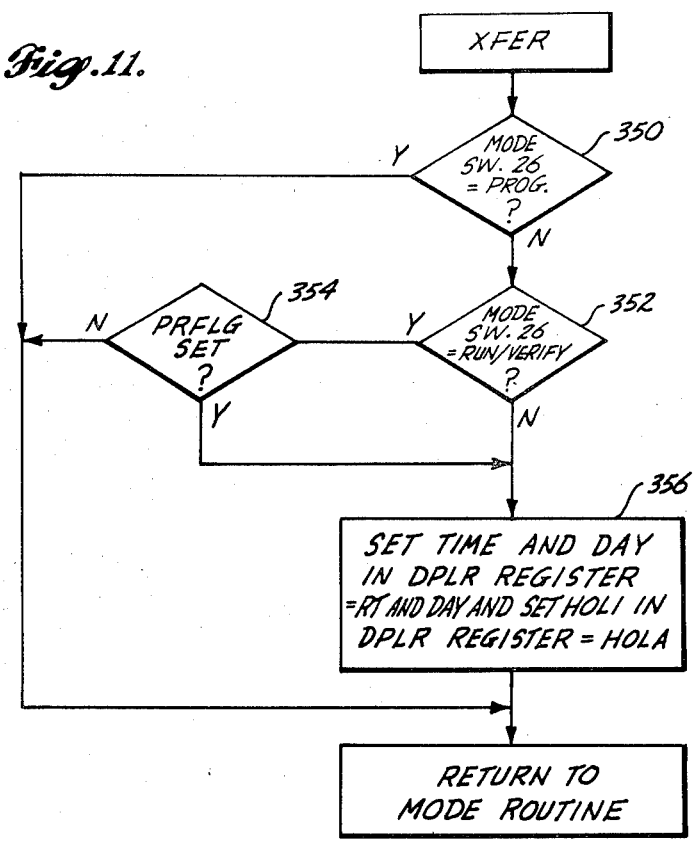
FIG. 11 is a flow chart of the program steps undertaken by the microprocessor in a XFER routine.

Referring now to the XFER routine illustrated in FIG. 11, CPU 100 initially determines, in step 350, if the mode switch 26 has been set to its PROGRAM position. If the determination in step 350 is affirmative, CPU 100 returns to the mode routine. If the determination in step 350 is negative, CPU 100 proceeds, in step 352, to determine if the mode switch 26 has been set to its RUN/VERIFY position. In the circumstance being discussed, the determination in step 352 is affirmative, whereupon CPU 100 proceeds, in step 354, to determine if PRFLG has been set. If the determination in step 354 is negative, CPU 100 returns to the mode routine. However, if the determination in step 352 is negative, or if the determination in step 354 is affirmative, CPU 100 proceeds, in step 356, to transfer the contents of the RT, LOAD and DAY fields within the SDC register to the LOAD, TIME and DAY fields in the DPLR register, and to set the HOLI field in the DPLR register equal to the HOLA field in the SDC register. Since the LOAD field in the SDC register contains invalid data, the LOAD character display in display 28 will be blanked. However, the remaining character displays in display 28, LEDs 30, 32 and LEDs 40 will display real-time information.

Now, PRFLG is cleared during the subsequent OUTPUT & STAGE routine. Therefore, CPU 100 proceeds to step 356, wherein real-time information is displayed to the user, only if the mode switch is in its RUN position, or upon the first pass of CPU 100 through the RUN/VERIFY mode 240 following a POWER UP condition or following the placing of the mode switch 26 from its PROGRAM position to its RUN/VERIFY position. From step 356, CPU 100 returns to the mode routine.

SELECTION OF HOLIDAY

While in the RUN/VERIFY mode 240, CPU 100 next calls the KEYBOARD routine. By reference to Table II, only the HOLIDAY, TIME, SCAN, MINUTE, HOUR, DAY, and LOAD keys in keyboard 38 are active during the RUN/VERIFY mode 240.

Upon actuation of either the MINUTE, HOUR, DAY or LOAD keys, the user may cause any desired time, day or load to be displayed as previously described.

Upon actuation of the HOLIDAY key, CPU 100 proceeds to the HOLIDAY key function subroutine illustrated in FIG. 18. The user will have been instructed to actuate the HOLIDAY key after advancing the day that is being displayed to the day selected as a holiday (through actuation of the DAY key). In step 460, CPU 100 sets the HOFLG operation flag, and sets the HOLYB bit (in HOLY) corresponding to the day represented by the DAY field in the DPLR register, and then returns to the mode routine.

When HOFLG has been set, CPU 100, upon its next pass through the REAL-TIME CLOCK routine (FIG. 8), updates the contents of the SDC register, irrespective of whether PWFLG has been set or whether there has been a change in the time within the hardware clock. As CPU 100 proceeds through the REAL-TIME CLOCK routine, it will be noted that the HOLYB bit for the day previous to that represented by the DAY field in the SDC register will be cleared to accordingly deflag that day as a holiday, and that the HOLA field in the SDC register will either be set or cleared, depending upon whether the HOLYB bit has been set for the day represented by the DAY field in the SDC register (reference steps 278, 280, 282 and 284). Accordingly, by causing CPU 100 to pass through the entire REAL-TIME CLOCK routine after the HOLIDAY key has been actuated, i.e., HOFLG has been set, load control may be immediately shifted to a holiday schedule (in the subsequent LOAD UPDATE routine) if the day in real-time has been selected as a holiday.

DISPLAY OF TIME SCHEDULE

The user may wish to obtain a readout of the schedule for a given load and for any day of the week or for the holiday. Accordingly, when CPU 100 is in the PROGRAM mode 242 or the RUN/VERIFY mode 240, actuation of the SCAN key causes CPU 100 to enter into the SCAN key function subroutine illustrated in FIG. 15. Initially, CPU 100, in step 410, determines if PROFL is set, i.e., if the microprocessor is in its program mode of operation. If the determination in step 410 is affirmative, CPU 100 proceeds, in step 412, to address and search the event memory locations corresponding to the day and load represented by the LOAD and DAY or HOLI fields in the DPLR register. When the microprocessor is in its run/verify mode of operation, the determination in step 410 will be negative, so that CPU 100 proceeds, in step 414, to determine if the HOLYB bit has been set for the day represented by the DAY field in the DPLR register. At this point, it should be noted that when the microprocessor is in its run/verify mode of operation, the HOLI field will not be set if the day in real-time is not a holiday. Accordingly, if the determination in step 414 is affirmative, CPU 100, in step 416, addresses and searches the holiday event memory locations corresponding to the load represented by the LOAD field in the DPLR register. If the determination in step 414 is negative, CPU 100 proceeds in step 412 to address and search the event memory locations corresponding to the load and day represented by the LOAD and DAY fields in the DPLR register.

After addressing and searching of the desired event memory locations in steps 412 or 416, CPU 100 proceeds, in step 418, to determine if the addressed event memory locations contain any valid ET/EV data words. If the determination in step 418 is negative, CPU 100 returns to the mode routine. If the determination in step 418 is affirmative, CPU 100 proceeds, in step 420, to find the first valid ET/EV data word in the addressed event memory locations whose event time ET occurs after the time represented by the TIME fields in the DPLR register. Accordingly, the user may instruct the microprocessor to display information relating to the first valid control event that occurs after any desired time.

From step 420, CPU 100 proceeds, in step 422, to convert the event time ET to BCD form, and to store the thus-coverted event time in the TIME fields in the DPLR register, whereupon the event time is displayed to the user. Thereafter, in step 424, CPU 100 lights the LED 42 corresponding to the control event (EV) of the selected ET/EV data word.

CPU 100 then proceeds, in step 426, to determine if the SCAN key is still being actuated. For example, the user may wish to obtain a display of more than one control event during the selected day. If the determination in step 426 is negative, i.e., the user has released the SCAN key, CPU 100 returns to the mode routine. If the determination in step 426 is affirmative, however, CPU 100 proceeds, in step 428, to set the TSCAN timer to a count representing two seconds, and waits until the count within TSCAN has decremented to zero. Thereafter, in step 430, CPU 100 proceeds to find and display the next control event (by undertaking steps similar to steps 420, 422 and 424). In step 432, CPU 100 determines if the control event displayed in step 430 is the last event of the day represented by the DAY field in the DPLR register, i.e., the control event having the last event time. If the determination in step 432 is negative, CPU 100 returns to step 426. If the determination in step 432 is affirmative, CPU 100, in step 434, sets TSCAN to two seconds and waits until TSCAN equals zero. CPU 100 then proceeds, in step 436, to find and display the first event of the day represented by the DAY field in the DPLR register, e.g., the control event having the earliest event time. From step 436, CPU 100 returns to step 426. As can be appreciated, CPU 100 will continue to progress through the loops defined by steps 426–436 until the user releases the SCAN key, at which time CPU 100 returns to the mode routine. To obtain a readout of the schedule for yet another load, the user will select the desired load and day, by actuation of the LOAD and DAY keys, and thereafter actuate the SCAN key.

ALTERNATE DISPLAY OF REAL-TIME INFORMATION

While CPU 100 is in either the PROGRAM mode 242 or the RUN/VERIFY mode 240, the user may wish to obtain a display of real-time information. Accordingly, actuation of the TIME key causes CPU 100 to enter into the TIME key function subroutine illustrated in FIG. 19. Specifically, CPU 100, in step 470, transfers the contents of the RT and DAY fields within the SDC register to the TIME and DAY fields in the DPLR register, whereupon real-time information is displayed to the user. From step 470, CPU 100 returns to the mode routine.

REAL-TIME CONTROL OF LOADS

Figure 20:
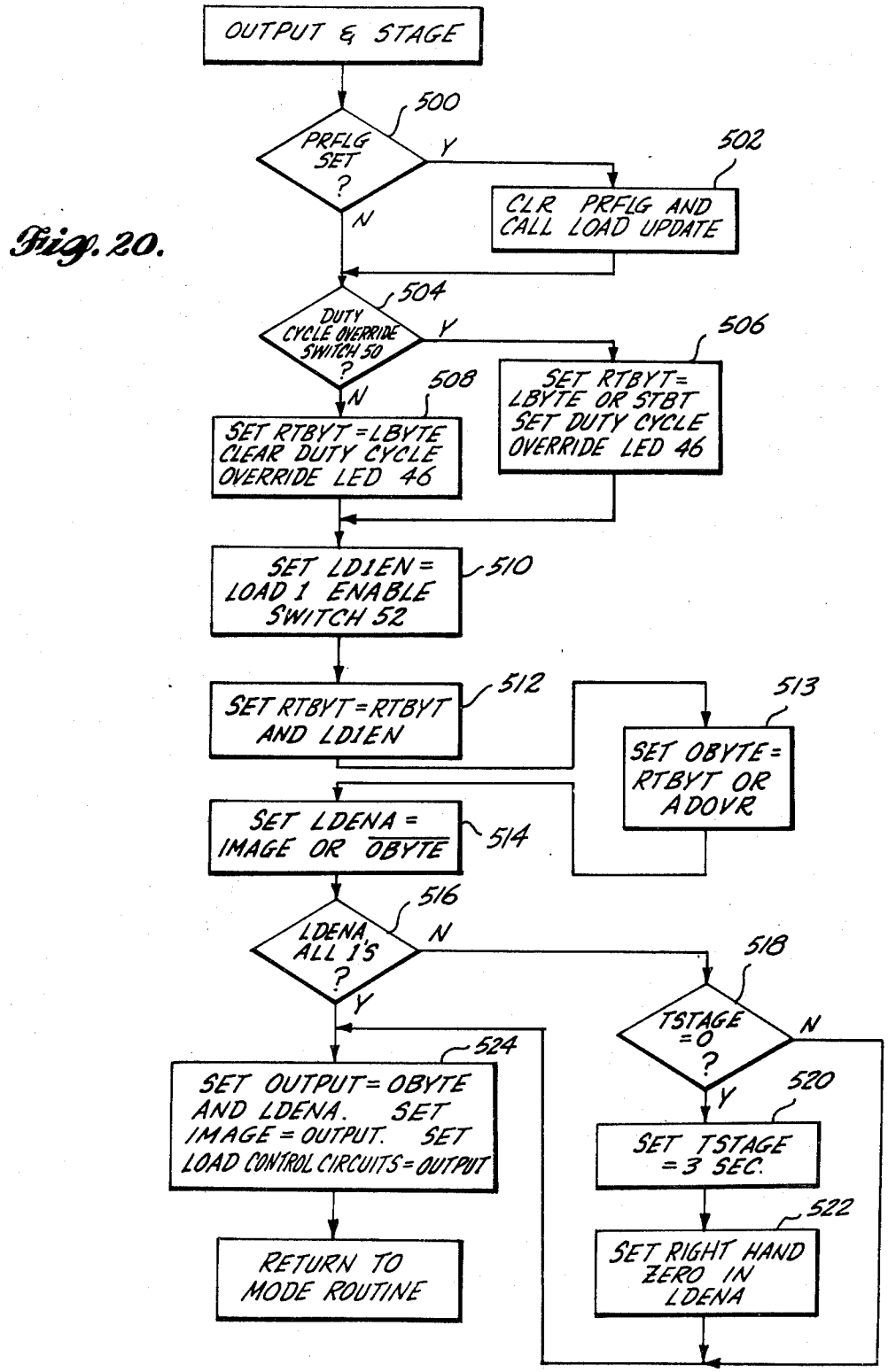
FIG. 20 is a flow chart of the program steps undertaken by the microprocessor in an OUTPUT & STAGE routine.

While still in step 252 within the RUN/VERIFY mode 240, CPU 100 next calls the OUTPUT & STAGE routine illustrated in FIG. 20. Initially, CPU 100, in step 500, determines if PRFLG has been set, i.e., a POWER UP condition has occurred, or an event memory malfunction has occurred, or the microprocessor has just exited from its program mode of operation. If the determination in step 500 is affirmative, CPU 100, in step 502, clears PRFLG and calls the LOAD UPDATE routine (FIG. 9(a)) to accordingly update the status of all loads. From either step 500 or step 502, CPU 100 proceeds, in step 504, to determine if the duty-cycle override switch 50 has been set, i.e., the set of external contacts represented by the duty-cycle override switch 50 have been closed to accordingly signify to the microprocessor that all loads which are currently being controlled with a duty-cycle control function are to be turned on. If the determination in step 504 is affirmative, CPU 100 proceeds, in step 506, to set RTBYT=LBYTE OR STBT, and, sets the DUTY-CYCLE OVERRIDE LED 46. If the determination in step 504 is negative, CPU 100 proceeds, in step 508, to set RTBYT=LBYTE, and to clear the DUTY-CYCLE OVERRIDE LED 46.

From either step 506 or 508, CPU 100, in step 510, sets LDIEN to correspond to the position of the load 1 enable switch 52. Specifically, LDIEN=1 when the load 1 enable switch 52 is closed (e.g., the control of load 1 by the microprocessor is to be enabled), and LDIEN=0 when the load 1 enable switch 52 is opened.

In step 512, CPU 100 sets RTBYT=RTBYT AND LDIEN and sets OBYTE=RTBYT OR ADOVR. As previously discussed, the ADOVR data byte comprises an output from the apparatus in FIG. 22 and all bits therein are cleared when no night setback modification of real-time control is to implemented (in step 211C, FIG. 7(a)). In this situation, OBYTE=RTBYT. From step 513, CPU 100 proceeds, in step 514, to set LDENA=IMAGE OR OBYTE, where the successive data bits of IMAGE represent the existing energization states of the load relays. CPU 100 then proceeds, in step 516, to determine if the successive data bits of LDENA are all ones, i.e., set. As will be apparent from the ensuing discussion, the determination in step 516 is negative if any load which has been previously off is to be turned on. If the determination in step 516 is negative, CPU 100 proceeds to stage or sequence the turning on of one or more loads previously off by proceeding, in step 518, to determine if the TSTAGE timer contains a count of zero. Upon the first pass through the OUTPUT & STAGE routine, the determination in step 518 will be affirmative, so that CPU 100 proceeds, in step 520, to set TSTAGE to a count representing three seconds. From step 520, CPU 100 proceeds, in step 522, to set the right hand "0" bit in LDENA to "1". As will be apparent from the ensuing discussion, the action undertaken in step 522 allows a single load that has been previously off to be turned on.

If the determination in step 516 is affirmative, or if the determination in step 518 is negative, or from step 522, CPU 100 proceeds, in step 524, to set OUTPUT=OBYTE AND LDENA, to set IMAGE=OUTPUT and to control the energization states of the load control circuits 145 in accordance with OUTPUT. From step 524, CPU 100 returns to the mode routine.

The operation of the OUTPUT & STAGE routine can best be understood by considering the logical operations that take place when (a) a plurality of loads are turned on after all loads have been previously turned off; (b) the duty-cycle override switch 50 is closed during the time that some of the loads are currently being controlled in accordance with a duty-cycle control function; and (c) the load 1 enable switch 52 is opened during the time that load 1 is turned on, as set forth hereinafter in Tables IV, V and VI, respectively.

TABLE IV

| Example (a): | | |
|---|---|---|
| (1) | all loads previously turned off | |
| (2) | loads 1, 3, 4, 7 to be turned on | |
| (3) | duty-cycle override switch 50 opened | |
| (4) | load 1 enable switch 52 closed | |
| (5) | adaptive option switch 53 opened | |
| | IMAGE | = 00000000 |
| | LBYTE | = 01001101 |
| | RTBYT | = LBYTE |
| | | = 01001101 |
| | LDIEN | = 1 |
| | RTBYT | = RTBYT AND LDIEN |

TABLE IV-continued

Example (a):

```
                    =  01001101
      ADOVR         =  00000000
      OBYTE         =  RTBYT OR ADOVR
                    =  01001101

OBYTE̅         =  10110010

LDENA         =  IMAGE OR OBYTE̅
                    =  10110010
Since LDENA not all 1's,
  set TSTAGE = 3 seconds
  set LDENA = 10110011
      OUTPUT        =  OBYTE AND LDENA
                    =  00000001
Since LDENA not all 1's, and when TSTAGE = 0,
  set TSTAGE = 3 seconds,
  set LDENA = 10110111
      OUTPUT        =  OBYTE AND LDENA
                    =  00000101
Since LDENA not all 1's, and when TSTAGE = 0,
  set TSTAGE = 3 seconds,
  set LDENA = 10111111
      OUTPUT        =  OBYTE AND LDENA
                    =  00001101
Since LDENA not all 1's, and when TSTAGE = 0,
  set TSTAGE = 3 seconds,
  set LDENA = 11111111
      OUTPUT        =  OBYTE AND LDENA
                    =  01001101
```

TABLE V

Example (b):

```
(1)  loads 1, 3, 4, 7 previously turned on
(2)  no change in real-time control output
(3)  loads 2, 4, 7, 8 are being controlled with a duty-cycle
     control function
(4)  duty-cycle override switch 50 closed
(5)  load 1 enable switch 52 closed
(6)  adaptive option switch 53 opened
      IMAGE         =  01001101
      LBYTE         =  01001101
      STBT          =  11001010
      RTBYT         =  LBYTE OR STBT
                    =  11001111
      LDIEN         =  1
      RTBYT         =  RTBYT AND LDIEN
                    =  11001111
      ADOVR         =  00000000
      OBYTE         =  RTBYT OR ADOVR
                    =  11001111

OBYTE̅         =  00110000

LDENA         =  IMAGE OR OBYTE̅
                    =  01111101
Since LDENA not all 1's,
  set TSTAGE = 3 seconds,
  set LDENA = 01111111
      OUTPUT        =  OBYTE AND LDENA
                    =  01001111
Since LDENA not all 1's, and when TSTAGE = 0,
  set TSTAGE = 3 seconds,
  set LDENA = 11111111
      OUTPUT        =  OBYTE AND LDENA
                    =  11001111
```

TABLE VI

Example (c):

```
(1)  loads 1, 3, 4 7 previously turned on
(2)  no change in real-time control output
(3)  duty-cycle override switch 50 opened
```

TABLE VI-continued

Example (c):

```
(4)  load 1 enable switch 52 opened
(5)  adaptive option switch 53 opened
      IMAGE         =  01001101
      LBYTE         =  01001101
      RTBYT         =  01001101
      LDIEN         =  0
      RTBYT         =  RTBYT AND LDIEN
                    =  01001100
      ADOVR         =  00000000
      OBYTE         =  RTBYT OR ADOVR
                    =  01001100

OBYTE̅         =  10110011

LDENA         =  IMAGE OR OBYTE
                    =  11111111
Since LDENA all 1's,
      OUTPUT        =  OBYTE AND LDENA
                    =  01001100
```

Therefore, when all loads have previously been turned off, as in Example (a), The OUTPUT & STAGE routine energizes the load control circuits 145 for loads 1, 3, 4 and 7 at three-second intervals, to prevent a potential large inrush of power at the facility that would occur if all loads were to be turned on at the same time. When the duty-cycle override switch 50 is closed, all loads that are currently being controlled with a duty-cycle control function and that are currently off, e.g., loads 2 and 8 in Example (b), are turned on at three-second intervals. As illustrated in Example (c), opening of the load 1 enable switch 52 results in de-energization of the load control circuit 145 for load 1, irrespective of the desired status for load 1 determined in accordance with the schedule for real-time control.

MAIN PROGRAM LOOP—RUN MODE

From step 524, CPU 100 returns to the mode routine. From the RUN/VERIFY mode 240, CPU 100, returns to step 203. For as long as the mode switch 26 is set to the RUN/VERIFY position CPU 100 will continue to loop back to and through the RUN/VERIFY mode 240. If the user should place the mode switch 26 to its RUN position, the determination in step 236 will be affirmative, so that CPU 100 proceeds to the RUN mode 238, wherein the LEDs 42 are cleared. Thereafter, CPU 100 calls the REAL-TIME CLOCK, XFER and OUTPUT & STAGE routines, and proceeds through those routines identically as previously described. No provision is made, however, in the RUN mode 238 for CPU 100 to call the KEYBOARD routine, so that the keyboard 38 is disabled.

MICROPROCESSOR—TIMING.

Figure 21:
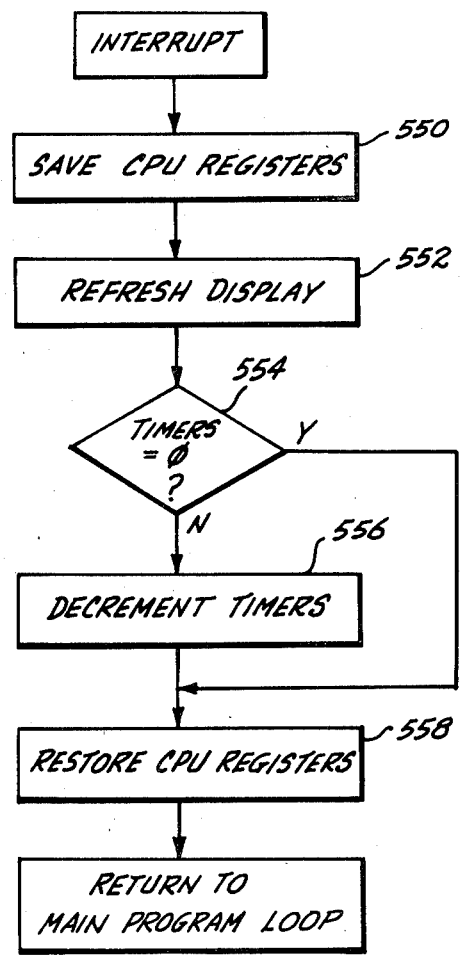
FIG. 21 is a flow chart of the program steps undertaken by the microprocessor in an INTERRUPT subroutine.

With reference now to FIG. 21, the third clock signal from the hardware clock, appearing on the RST 7.5 input of CPU 100, causes CPU 100 to enter the INTERRUPT routine once every cycle of the third clock signal (e.g., at a rate of 256 Hz). In step 550, the contents of various internal registers within CPU 100 are maintained, by transferring the contents thereof to the stack register previously described. Thereafter, CPU 100, in step 552, refreshes the displays 28 and 142 by transferring the contents of a selected register (such as the DPLR register) to ports 108 and 110B. In step 554, CPU 100 determines if any of the timers in RAM 104 contain a count of zero. If the determination in step 554 is negative for any timer, CPU 100 proceeds, in step 556, to decrement that timer by an amount related to the period of the signal from the hardware clock, and then proceeds to step 558. If the determination in step 554 is affirmative for any of the timers within RAM 104, i.e., the timer has a count of zero, CPU 100 proceeds directly to step 558. In step 558, CPU 100 restores its internal registers (by transferring the contents of the stack register thereto) and then returns to the main program loop to continue processing therein.

MICROPROCESSOR—ADDITIONAL COMPONENTS FOR ENVIRONMENTALLY-ADAPTIVE MODIFICATIONS

The additional components of the apparatus required for environmentally-adaptive modification of real-time control are illustrated in FIG. 22. As previously described, these additional components, and their interconnections, may be located on a printed circuit card that is adapted to be inserted into housing 20 and to be interconnected with the microprocessor therein through an appropriate connector.

The apparatus of FIG. 22 includes a latch 160 and a PROM 162, with the remaining components therein comprising an input/output port and associated input and output devices. The low address/data bus, comprising leads AD0–AD7, is connected to corresponding terminals of latch 160, PROM 162, and to the input/output port as described hereinafter. The lead ALE from CPU 100 is connected to a corresponding terminal of latch 160, and a plurality of leads A0'–A7' interconnect corresponding output terminals of latch 160 with corresponding terminals of PROM 162 and a decoder 164 forming part of the input/output port. Leads A8–A10 from CPU 100 are connected to corresponding terminals of Prom 162 and lead RD1 is connected to a corresponding terminal of PROM 162. Leads OPROM and PT4 from decoder 118 (FIG. 2) are connected, respectively, to corresponding terminals of PROM 162 and decoder 164.

PROM 162 comprises an additional program memory containing a set of program instructions for various routines and subroutines particularly used for the environmentally-adaptive modification of real-time control which are described hereinafter with reference to FIGS. 27–37. The scratch pad memory in RAM 104 (FIG. 2) is also used for storage of various information used in the environmentally-adaptive modification of real-time control, and is additionally organized as described hereinafter with reference to FIG. 23.

The set of program instructions in PROM 162 are addressed and executed by CPU 100 in a predetermined sequence, as established by a program counter within CPU 100. For each program instruction so addressed, CPU 100 undertakes an instruction cycle, with each instruction cycle including a plurality of machine cycles. The machine cycles permit CPU 100 to retrieve an instruction from PROM 162 and to execute the instruction by the addressing and transmission of data to and from CPU 100, RAM 104, the input/output port illustrated in FIG. 22, and ports 106, 108 and 110A, 110B (FIG. 2). Within each instruction cycle, addresses or data are transmitted on leads AD0–AD7. When an address is being transmitted by CPU 100 on leads AD0–AD7, a signal is provided on lead ALE therefrom which causes latch 160 to store therein the address, and to present the address thus stored on leads A0'–A7'. At all other times, leads AD0–AD7 are used for the transmission of data. The address on leads A0'–A7', together with further address information on leads A8–A10, is used to signify a memory location within PROM 162. The data is an addressed memory location within PROM 162 is not placed on leads AD0–AD7, however, until the concurrent provision of a signal on lead OPROM from decoder 118 (FIG. 2) and a signal on lead RD1 from CPU 100.

Decoder 164 has a plurality of output terminals that are respectively connected with corresponding terminals of a plurality of OR gates 166, OR gate 168, and a latch 170 all forming part of the input/output port. In response to a signal on lead PT4, decoder 164 is enabled to provide a selection signal on that one of its output terminals that corresponds to the address information on leads A0'–A7'. Each of the plurality of OR gates 166 is also connected with lead RD1 from CPU 100, and OR gate 168 and latch 170 are each interconnected with lead $\overline{\text{WR1}}$ from CPU 100. Upon the concurrent provision of a selection signal from decoder 164 and a signal on lead RD1 from CPU 100, each of the plurality of OR gates 166 provides an output signal which is used, as described hereinafter, to transmit data from an associated input device to leads AD0–AD7 (or a portion thereof). Upon the concurrent provision of a selection signal from decoder 164 and a signal on lead $\overline{\text{WR1}}$ from CPU 100, OR gate 168 provides an output signal which is used to transfer data on leads AD0–AD7 to an associated output device, and latch 170 is enabled to store therein data present on leads AD0–AD2 for transmission to its associated output device.

In order to provide for environmentally-adaptive modification of real-time control, CPU 100 must be provided with information relating to: the outdoor temperature at the facility; the indoor temperature at the facility, divided into first and second zones if desirable; which loads of the facility have been selected for the advance start modification; which loads of the facility have been selected for the night setback modification; which loads of the facility have been selected for the duty-cycle shift modification; the value of heating advance and cooling advance gains that are selectable by the user and utilized in the computation of advance time for heating loads and for cooling loads; the value of a user-selectable deadband, for first and second zones of the facility, that is used in the computation of the duty-cycle shift modification; and, whether the display of the microprocessor is to display information relating to real-time control, outdoor temperature information, indoor temperature information, or advance time information, as selected by the user. All of this information exchange is carried out through the input/output port in FIG. 22, as follows.

An advance start select switch SW1 includes a plurality of switches, one for each load, that are adapted to connect leads AD0–AD7 with a corresponding plurality of outputs from a bus driver 172 which in turn is provided with inputs from a source of supply potential $+V_s$ and with the output from an associated OR gate 166. In the absence of an output signal from its associated OR gate 166, bus driver 172 is tri-stated, that is, the output signal on each of its outputs is floating. When bus driver 172 has been selected by CPU 100 and an output signal is provided by its associated OR gate 166, the output signal on each of the outputs of bus driver 172 goes to a low logic level. If, at that time, the corresponding switch in advance start select switch SW1 has been closed by the user, this low-logic level signal is coupled to the corresponding one of leads AD0–AD7 to signify to CPU 100 that the associated load has been selected for the advance start modification.

In like manner, a night setback select switch SW2 and a duty-cycle shift select switch SW3 interconnect respective bus drivers 174 and 176 with leads AD0–AD7, with each of the bus drivers 174, 176 having as inputs the source of supply potential $+V_s$ and the output of an associated one of the plurality of OR gates 166. Each of the switches SW2, SW3 includes a plurality of user-actuable switches, one for each load, with the closure of each switch therein being used to signify to CPU 100 that the associated load has been selected for either the night setback modification or the duty-cycle shift modification.

As described hereinafter in conjunction with the duty-cycle shift modification, the user is permitted to select one of five deadbands for use therein. In addition, a deadband may be selected for first and second zones at the facility, with each zone including a predetermined group of the loads being controlled by the controller. Accordingly, a DBZ2 switch SW4 and a DBZ1 switch SW5 are provided for selection of the second zone and first zone deadbands. Each of the switches SW4, SW5 comprises a five-position switch, one of whose positions is always open. When each switch SW4, SW5 is actuated to one of its remaining four positions, it connects the output of an associated one of the plurality of OR gates 166 to one of the leads AD0–AD7. Specifically, switch SW4 is interconnected with leads AD0–AD3, and switch SW5 is interconnected with leads AD4–AD7. When switch SW4 or SW5 has been selected by CPU 100 and a corresponding output signal is provided by the associated one of the plurality of OR gates 166, either no output is provided to leads AD0–AD3 or leads AD4–AD7 (when the associated switch SW4 or SW5 has been set to its always-open position), thus signifying a first selected deadband, or, a low-logic level signal is provided on one of the leads AD0–AD3 or AD4–AD7, thus signifying another selected deadband.

A display select switch SW6 is provided which has five positions. The five positions represent, respectively, display of information related to real-time control (as previously described), indoor temperature of the first zone, indoor temperature of the second zone, outdoor temperature, and advance time. One of the switch positions is always open. When in one of the other four positions, display select switch SW6 connects the output from an associated one of the plurality of OR gates 166 to one of the leads AD0–AD3. Accordingly, when display select switch SW6 has been selected by CPU 100 and an output signal is being provided by the associated one of the plurality of OR gates 166, either no output is provided to any of the leads AD0–AD3 (if the switch is in its always-open position), or a low-logic level signal is provided to one of the leads AD0–AD3.

CPU 100 obtains information as to temperature and heating and cooling advance gains from analog data sources thereof by, first, selecting a particular analog data source and, second, performing analog/digital conversion thereon. Specifically, latch 170, when enabled by CPU 100 as previously described, stores the data present on leads AD0–AD2 and presents the thus-stored data to corresponding terminals of an analog multiplexer 180 and an analog multiplexer 182. Analog multiplexer 180 includes first and second input groups 180A, 180B. In response to the data from latch 170, analog multiplexer 180 is enabled to connect one input in each of groups 180A and 180B to, respectively, its outputs 180C and 180D.

Signals appearing on the inputs in the group 180A are obtained from a plurality of temperature sensors, each of which preferably comprises a temperature-sensitive resistor whose resistance varies in proportion to the temperature being sensed. A temperature sensor TSZ1 is located within the facility and so as to sense the indoor temperature in the first zone; a temperature sensor TSZ2 is also located within the facility so as to sense the indoor temperature in the second zone; and, a temperature sensor TSOD is located outside the facility so as to sense outdoor temperature. Temperature sensors TSZ1, TSZ2 and TSOD have one side each connected to ground potential, and have the other side connected to the common junctions, respectively, of resistors R10Z1–R12Z1, R10Z2 (through a jumper JP1)–R12Z2, and R10OD–R12OD. The other side of resistors R10Z1, R10Z2 and R10OD are each connected to the source of supply potential $+V_s$, and the other side of resistors R12Z1, R12Z2 and R12OD are connected, respectively, to first, second and third inputs in the group 180A of inputs of analog multiplexer 180. At this point, it should be noted that if first and second zone control is not required at the facility, temperature sensor TSZ2 may be eliminated and jumper JP1 may be placed in the nonmarked position in FIG. 22, whereby the signal provided to both the first and second inputs of the group 180A of inputs of analog multiplexer 180 is obtained from temperature sensor TSZ1.

First, second and third inputs in the group 180B of inputs of analog multiplexer 180 are connected to the sliders of respective calibration potentiometers CAL Z1, CAL Z2 and CAL OD which in turn are connected in parallel with each other between a resistor R14 and a resistor R16. The other side of resistor R14 is connected to the source of supply potential $+V_s$, and the other side of resistor R16 is coupled to ground potential.

The signal on output 180C of analog multiplexer 180 is coupled to the noninverting input of an amplifier 184, and the signal on output 180D of analog multiplexer 180 is connected to the inverting input of amplifier 184, with the output of amplifier 184 being connected to a first input of analog multiplexer 182.

In operation, analog multiplexer 180 responds to the data on the output of latch 170 by coupling signals on corresponding inputs in groups 180A, 180B to the noninverting and inverting inputs of amplifier 184. As an example, when the data on the output of latch 170 signifies that information relating to the indoor temperature for the first zone is to be obtained, signals appearing on the first inputs in groups 180A, 180B will be respectively coupled to the noninverting and inverting inputs of amplifier 184. The resultant circuit comprises a Wheatstone bridge, as more particularly shown in FIG. 22(a). The components of the Wheatstone bridge are chosen so that the bridge provides no output, i.e., the voltage across outputs 180C, 180D is zero, at a null temperature which is below the expected range of temperatures to be encountered and which is precisely established by the setting of the calibration potentiometer (e.g., CAL Z1). As the sensed temperature increases above the null temperature and the resistance of the temperature sensor varies, the bridge becomes unbalanced so as to produce a proportional voltage across outputs 180C, 180D. This proportional voltage is amplified in amplifier 184, so that the output voltage therefrom has a predetermined value (e.g., 3.4 volts) at a predetermined sensed temperature (e.g., 10° C.), and varies linearly with temperature (e.g., 0.036 volt/°C.). Those skilled in the art will recognize that the exact value of the output voltage from amplifier 184 at a particular sensed temperature may be varied through use of the calibration potentiometer, both to achieve a predetermined voltage at a predetermined temperature and also to offset that voltage if it is desired to slightly shift the reference and limit temperatures that are used for the environmentally-adaptive modifications, as described hereinafter. If desired, amplifier 184 may be provided with a trimming resistor so as to effect further calibration of the output voltage therefrom.

The second and third inputs of analog multiplexer 182 are respectively connected to the sliders of gain-setting potentiometers for heating and for cooling loads, respectively, HEAT ADV and COOL ADV, each of which are connected between the source of supply potential $+V_s$ and a resistor R18 which in turn is connected to ground potential. By appropriate adjustment of the gain-setting potentiometers, the voltage supplied to the second and third inputs of analog multiplexer 182 may be increased or decreased, in a range from zero (e.g., ground potential) up to the supply potential $+V_s$ so that the user may select the amount of heat advancement and cool advancement that is used by the microprocessor in its computation of advance time.

In response to the data from latch 170, analog multiplexer 182 functions to couple one of its first, second or third inputs to its output which in turn is connected to the inverting input of a comparator 186. Accordingly, the signal presented to the inverting input of comparator 186 will comprise an analog voltage and represent either the indoor temperature for the first zone, the indoor temperature for the second zone, the outdoor temperature, the heating advance gain, or the cooling advance gain. Each of these analog voltages must be converted into digital form in order to be usable by the microprocessor. For this purpose, a latch 188 receives a digital count from CPU 100 on leads AD0–AD7, and also receives an input from the output of OR gate 168. When latch 188 has been selected by CPU 100 and an output signal is provided by OR gate 168, the count present on leads AD0–AD7 is stored therein and presented to respective inputs of a resistive ladder network 190. An appropriate biasing potential is provided to resistive ladder network 190, by means not illustrated, so that resistive ladder network 190 functions to provide an analog voltage on its output which is proportional to the digital count stored in latch 188. The output of resistive ladder network 190 is connected to the noninverting input of comparator 186, and the output of comparator 186 is connected by a lead to the RST 5.5 terminal of CPU 100. As indicated by the graph in the center portion of FIG. 22, the analog voltage presented to the noninverting input of comparator 186 has a minimum value, e.g., 0.804 volts, when the count stored within latch 188 is zero, and has a maximum value, e.g., 5.36 volts, when the count within latch 188 is at a maximum, e.g., 255. Between these limits, the analog voltage provided by resistive ladder network 190 varies linearly with the count within latch 188. The output from comparator 186 is accordingly either at a high logic level or a low logic level, depending on whether the analog voltage on the output of resistive ladder network 190 is above or below the analog voltage appearing on the output of analog multiplexer 182. As described hereinafter, a change in the logic level in the output from comparator 186, which will occur when the voltage is presented to the inverting and noninverting inputs of comparator 186 are approximately equal, is used by CPU 100 to set a count corresponding to that stored within latch 188 into a corresponding data byte within RAM 104, one for each type of analog data.

PROM 162, bus drivers 172, 174 and 176, analog multiplexers 180 and 182, and ladder network 190 (as well as the remaining components of FIG. 22) may comprise commercially-available integrated circuit chips, of which the following are representative:

TABLE VII

| Component | Designation |
|---|---|
| PROM 162 | Intel 2716 16K (2K × 8) UV Erasable PROM |
| Bus drivers 172, 174, 176 | Texas Instruments 74LS240N Octal Buffer |
| Analog multiplexer 180 | RCA CD4052B Analog Multiplexer |
| Analog multiplexer 182 | RCA CD4051B Analog Multiplexer |
| Resistive ladder network 190 | Allen-Bradley 316L08 R2R Resistive Network |

MICROPROCESSOR - ADDITIONAL SCRATCH PAD MEMORY FOR MODIFICATIONS

With reference now to FIG. 23, the program instructions within PROM 162 are adapted to further organize the scratch pad memory within RAM 104 (FIG. 2) into a plurality of operation flags, a plurality of timers, a plurality of data bytes, an ATABLE register, a BTABLE register, a WTABLE register, and a OPDPL register, with each operation flag, timer, data byte, and each field within the registers having a unique memory location within RAM 104. In FIG. 23, each of the operation flags (excepting the EFLG operation flag) comprises a single data bit which is set or cleared by CPU 100 upon execution of certain program instructions in the routines and subroutines to be described hereinafter. The EFLG operation flag comprises a counter which is cleared and incremented as described hereinafter. Each of the timers comprises a data byte which is set to a predetermined count as described hereinafter, and decremented in response to signals from the hardware clock during the INTERRUPT subroutine, in order to provide timing for various operations utilized in the routines and subroutines. Specifically, the MONTZ1 and MONTZ2 timers comprise minimum on timers for the first and second zones, respectively, and the MOFTZ1 and MOFTZ2 timers comprise minimum off timers for the first and second zones, respectively.

The STKBF and ADOVR data bytes each comprise an 8-bit data byte, with each bit therein being associated with one of the controlled loads. The relationship between the load number of each controlled load and its associated bit Bx in STKBF and in ADOVR is the same as that previously described for the LBYTE and STBT data bytes. The TZ1, TZ2, TOD, HEATG and COOLG data bytes each contain a count representing, respectively, indoor temperature for the first zone, indoor temperature for the second zone, outdoor temperature, the heating advance gain, and the cooling advance gain. The CHPTR data byte contains a number representing the analog data source whose analog voltage is being converted into a corresponding digital count.

The OPDPL register is organized in a manner identical to the DPLR register and accordingly has a plurality of fields in which are stored certain information for display. As described hereinafter in conjunction with FIG. 38, the REFRESH DISPLAY subroutine causes CPU 100 to transfer the contents of either the DPLR register or the OPDPL register to the display 28, to LEDs 30, 32 and to LEDs 40 during the INTERRUPT subroutine. The ATABLE, BTABLE and WTABLE registers include a plurality of fields or locations, one for each load, in which are stored, respectively, the actual advance time used for each load (AT1-AT8), the computed duty-cycle shift for each load (BDCS1-BDCS8) and the actual duty-cycle shift used for each load (WDCS1-WDCS8). The contents of the ATABLE and the WTABLE register are used in the LOAD UPDATE routine and its various subroutines to implement the advance start and duty-cycle shift modifications of real-time control. As previously described, the ADOVR data byte is used in the OUTPUT & STAGE routine to implement night setback modification of real-time control.

Upon the occurrence of a POWER-UP condition, all of the contents of RAM 104 (except CHPTR) illustrated in FIG. 23 are cleared, and initialization, if necessary, takes place during the various routines and subroutines to be described hereinafter. Upon a POWER-UP condition, the number "1" is stored in CHPTR.

Before proceeding to a detailed description of the various routines and subroutines contained in PROM 162, it is desirable to outline the specific environmentally-adaptive modifications that are made to real-time control, and the parameters utilized therein.

ADVANCE START MODIFICATION-IN GENERAL

As previously described, the advance start modification computes an advance time as a function of the deviation of outdoor temperature from a predetermined reference temperature. The advance time thus computed is then summed with real-time and the resultant sum is then used for real-time control for each load that has been selected for the advance start modification. The selection of any load in the group of controlled loads is made, as previously described, by the user through the advance start select switch SW1.

Figure 39:
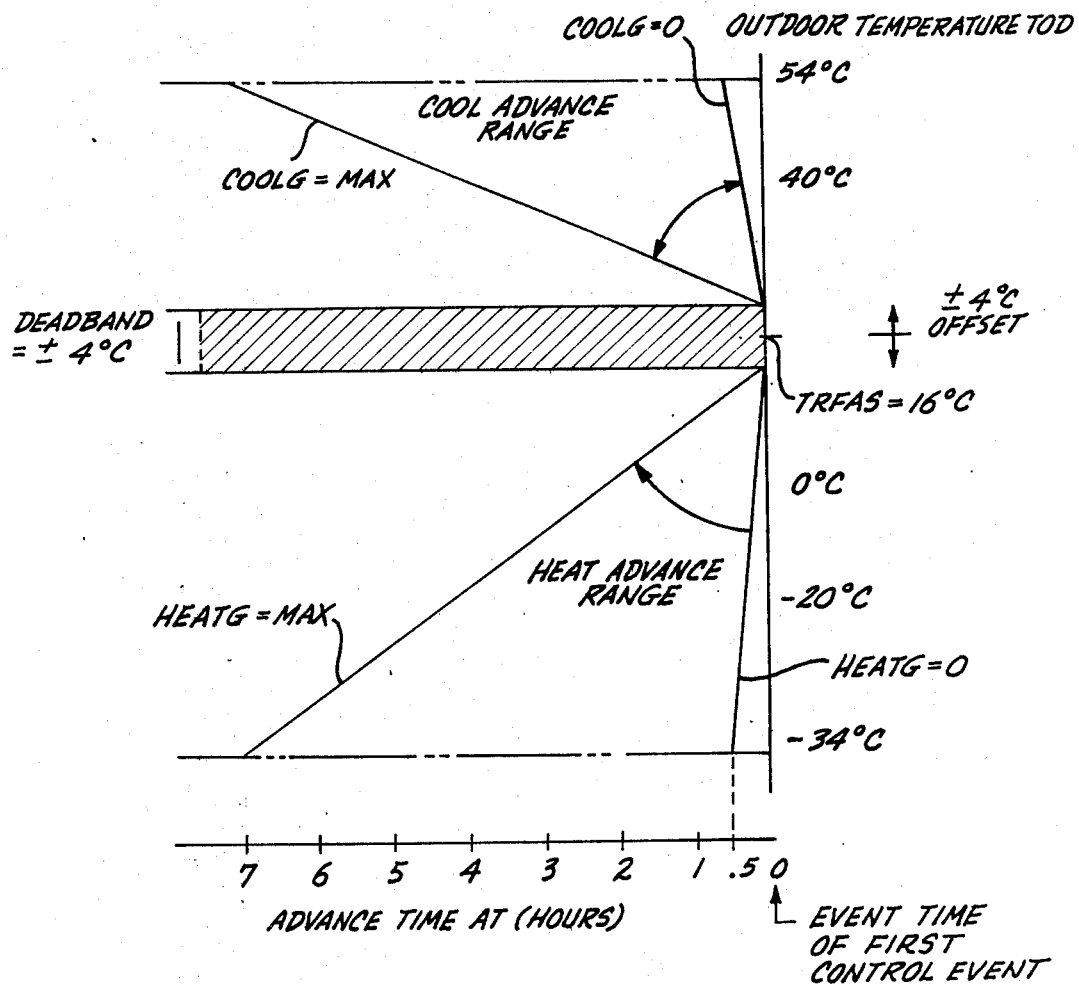
FIG. 39 is a graph illustrating the relationship between advance time computed by the microprocessor and outdoor temperature; and, FIG. 40 is a graph illustrating the relationship between duty-cycle shift computed by the microprocessor and indoor temperature.

With reference now to FIG. 39, advance time is computed by the use of the relationship $$AT = \frac{|TOD - TRFAS| * \left(\frac{G}{4} + C\right)}{K}$$

If $|TOD-TRFAS| \geq$ Deadband
Where,
AT = advance time, in hours
TOD = outdoor temperature, in °C. (represented by the TOD data byte, FIG. 23)
TRFAS = the reference temperature for the advance start modification, in °C. (see Table VIII)
$|TOD-TRFAS|$ = the absolute value of deviation of the outdoor temperature from the reference temperature
G = a heating advance gain or a cooling advance gain, in arbitrary units (represented by either the HEATG or COOLG data bytes, FIG. 23)

C = a heat constant or a cool constant, in arbitrary units (see Table VIII)
K = a second heat constant or a second cool constant, in arbitrary units (see Table VIII)
Deadband = a predetermined deadband centered about the reference temperature, in °C. (see Table VIII).

The foregoing relationship results in the set of straight-line functions illustrated in FIG. 39, respectively denominated Cool Advance Range and Heat Advance Range. Assuming that the deviation of outdoor temperature from the reference temperature is outside the deadband, the advance time is seen to vary linearly with such deviation, ranging from a minimum-slope function when the heating advance gain or the cooling advance gain (HEATG, COOLG) is zero to a maximum-slope function when the heating advance gain or the cooling advance gain have maximum values. Accordingly, the user, by adjustment of the gain advance potentiometers HEAT ADV and COOL ADV, can select the amount of advance time that is obtained for any deviation of outdoor temperature from the reference temperature.

With the values for the various constants and the deadband set forth in Table VIII, wherein the reference temperature is 16° C., it can be seen that when the cooling advance gain is zero, the advance time varies from zero when the outdoor temperature is 20° C. to 0.5 hour when the outdoor temperature is 54° C. Likewise, when the heating advance gain is zero, the advance time varies from zero when the outdoor temperature is 12° C. to 0.5 hour when the outdoor temperature is −34° C. When the cooling advance gain is at a maximum, the advance time varies from zero when the outdoor temperature is 20° C. to 7.0 hours when the outdoor temperature is 54° C. When the heating advance gain is at a maximum, the advance time AT varies from zero when the outdoor temperature is 12° C. to 7.0 hours when the outdoor temperature is −34° C. Between the limits of the heating advance and cooling advance gains, the advance time varies with the deviation between outdoor temperature and the reference temperature in a similar, linear manner. As also indicated in FIG. 39, the reference temperature may be offset from that established by TRFAS, through adjustment of the calibration potentiometer CAL OD.

As previously described, the summation of advance time with real-time serves to activate a control event for a load selected for the advance start modification in advance of the event time associated with that control event. Accordingly, a heating or a cooling load may be energized in advance of the time otherwise set forth in the predetermined time schedule, so that the heating or cooling load is capable of bringing the temperature within the facility to a comfortable level during periods of occupancy.

DUTY-CYCLE SHIFT MODIFICATION - IN GENERAL

The duty-cycle shift modification is operative only upon those loads that are selected therefor (by the user through the use of the duty-cycle shift select switch SW3) and which are currently being controlled in real-time with a duty-cycle control function. In effect, the on-time of each load currently being controlled with a duty-cycle control function is increased during each control interval in relation to the deviation of indoor temperature from a predetermined reference temperature.

Figure 40:
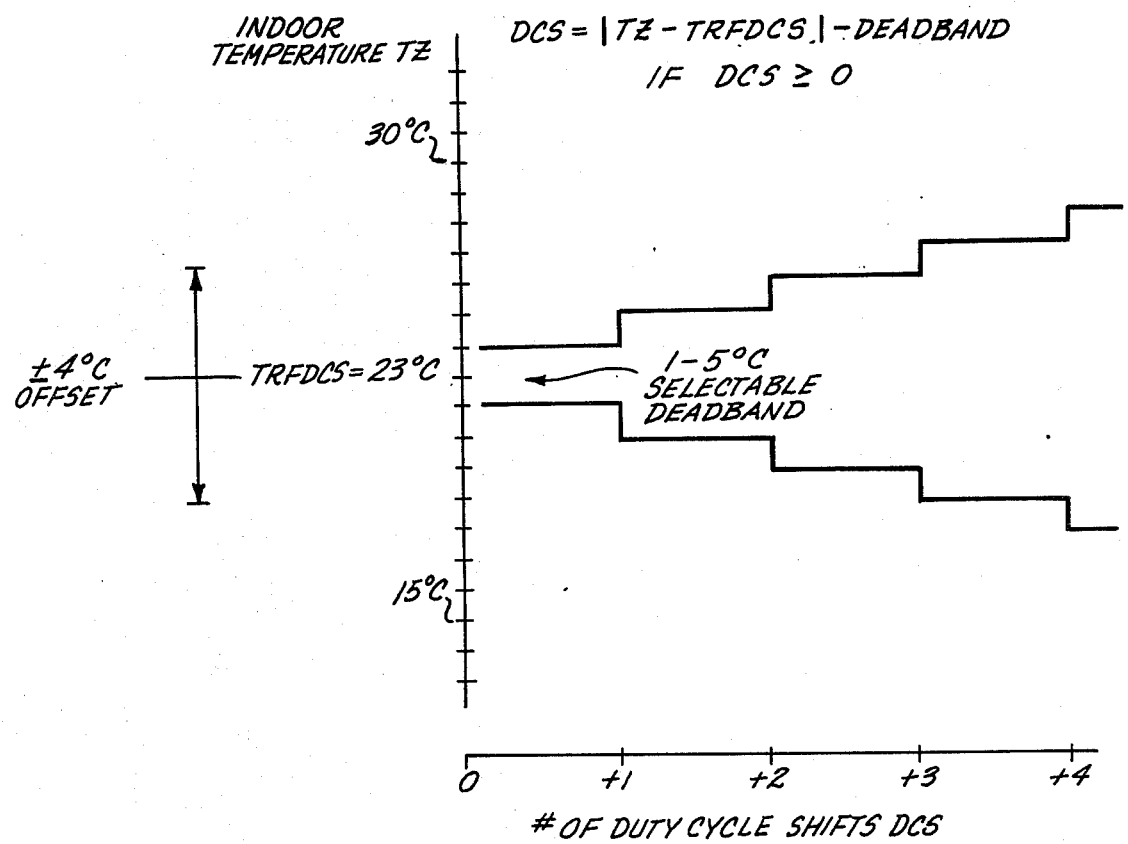

With reference now to FIG. 40, the duty-cycle shift modification is effected by computing a duty-cycle shift using the relationship $$DCS = |TZ - TRFDCS| - \text{Deadband if } DCS \geq 0$$

where,

DCS = the amount of the duty-cycle shift, in arbitrary units

TZ = the indoor temperature, in °C. (represented by the TZ1 or TZ2 data bytes, FIG. 23)

TRFDCS = the predetermined reference temperature for the duty-cycle shift modification, in °C. (see Table VIII)

Deadband = a user-selectable deadband centered about the reference temperature, in °C. (see Table VIII).

The actual duty-cycle shift modification is effected by summing DCS with the EV number stored in the event memory of the currently-active control event for the selected load and day (or holiday). As an example, if the stored EV = 3, representing a duty-cycle control function in which the load is turned on for fifteen minutes out of each thirty minute control interval, and if DCS = 1, then the actual EV used for load control will be (3+1) = 4, wherein the load is turned on for twenty minutes out of each thirty-minute control interval.

In the duty-cycle shift modification, an arbitrary grouping of the loads is made into first and second zones (e.g., the first zone includes loads 1-4 and the second zone includes loads 5-8). If a load in a particular zone has been selected for duty-cycle shift modification, then the duty-cycle shift DCS will be computed using the indoor temperature for that zone (TZ1 or TZ2) and the deadband that has been selected for that zone. As previously described, the deadband for each zone is selected through use of the DBZ1 switch SW5 and the DBZ2 switch SW4. Through operation of the switches, any one of five different deadbands can be selected for each zone, with the deadbands being represented by DCS DB1, DCS DB2, DCS DB3, DCS DB4, and DCS DB5 set forth in Table VIII.

From FIG. 40, it will be seen that when the deviation of the indoor zone temperature from the reference temperature has exceeded the selected deadband, the duty-cycle shift DCS will increase by one for each additional increment (in °C.) of the indoor zone temperature. In the example set forth in FIG. 40, the deadband has been selected to be 1° C. Accordingly, when the indoor zone temperature is 23° C., the duty-cycle shift DCS is 0, and when the indoor zone temperature is 24° C., the duty-cycle shift DCS is 1. Likewise, when the indoor zone temperature is 22° C., the duty-cycle shift DCS is 1. As with the advance start modification, the reference temperature TRFDCS about which the deadband is centered may be offset through adjustment of either the calibration potentiometer CAL Z1 or the calibration potentiometer CAL Z2.

Depending on the deviation of the indoor zone temperature from the reference temperature, the duty-cycle shift modification may increase the "on-time" of the selected load up to a point where the load is turned on for the entirety of each control interval.

NIGHT SETBACK MODIFICATION - IN GENERAL

The night setback modification is, like the duty-cycle shift modification, applicable to the loads in groups according to zone (e.g., the first zone includes loads 1-4 and the second zone includes loads 5-8). The night setback modification operates to turn on a load that has been selected for the night setback modification (through use of the night setback select switch SW2), if that load is not already on, when the indoor zone temperature exceeds a high limit temperature TH or falls below a low limit temperature TL (see Table VIII). Once the load has been turned on under night setback modification, it is maintained on until the indoor zone temperature decreases by a predetermined amount or increases by that predetermined amount respectively below or above the temperatures TH, TL. Provision is also made to avoid short-cycling of a load under the night setback modification. Specifically, when a load is turned on under night setback modification, it is maintained on for a predetermined interval (e.g., three minutes). Further, when a load is turned off under night setback modification, that load cannot be turned on again under night setback modification (although the load can be turned on under real-time control) for a predetermined interval (again, three minutes). It will be remembered that, in the duty-cycle shift modification, adjustment of the calibration potentiometers CAL Z1 and CAL Z2 will effect a corresponding adjustment in the reference temperature. Likewise, in the night setback modification, adjustment of the calibration potentiometers will effect a corresponding adjustment in the high limit and low limit temperatures.

The various constants and other data used in the advance start, duty-cycle shift and night setback modifications are stored within PROM 162, and the following are representative:

TABLE VIII

| | |
|---|---|
| HEATC (first heat constant) | 5 |
| COOLC (first cool constant) | 5 |
| HEATK (second heat constant) | 7 |
| COOLK (second cool constant) | 5 |
| TRFAS (reference temperature) | count representing 16° C. |
| TRFDCS (reference temperature) | count representing 23° C. |
| ATDB (advance time deadband) | count representing 4° C. |
| DCS DB1 | count representing 1° C. |
| DCS DB2 | count representing 2° C. |
| DCS DB3 } duty-cycle shift | count representing 3° C. |
| DCS DB4 } deadbands | count representing 4° C. |
| DCS DB5 | count representing 5° C. |
| TH (high limit temperature) | count representing 27° C. |
| (low limit temperature) | count representing 13° C. |

MAIN PROGRAM LOOP UNDER ENVIRONMENTALLY-ADAPTIVE MODIFICATION

With reference now back to FIG. 7(a) let it be assumed that environmentally-adaptive modification of real-time control is to be implemented, and that the adaptive option switch 53 accordingly has been actuated. As a result, CPU 100, upon each pass through the routine illustrated in FIGS. 7(a) and 7(b), passes through step 211A to step 211B, and then to the ADAP routine illustrated in FIG. 27. During each pass through the ADAP routine, CPU 100 functions to either compute the information needed for the advance start, duty-cycle shift and night setback modifications (in the RMODE routine, FIG. 30, and its various subroutines), to compute and display advance time (in the ADISPL subroutine, FIG. 28, and its various subroutines), or, to compute and display either outdoor temperature, indoor temperature for the first zone, or indoor temperature for the second zone (in the TDISPL subroutine, FIG. 29, and its various subroutines). The ADAP routine therefore acts as a supervisory routine for the environmentally-adaptive modifications to real-time control.

DISPLAY SELECT

Within the ADAP routine, the various program steps executed during each pass therethrough are determined by the setting of the display switch SW6, of which the following are illustrative:

TABLE IX

| Display Switch SW6 Position | Desired Display |
| --- | --- |
| 0 | Real-time control |
| 1 | Indoor temperature, first zone |
| 2 | Indoor temperature, second zone |
| 3 | Outdoor temperature |
| 4 | Advance time |

Accordingly, CPU 100 initially determines, in step 600, if the display switch SW6 has been set to its "0" position. If the determination in step 600 is affirmative, CPU 100 proceeds, in step 602, to the RMODE subroutine. If the determination in step 600 is negative, CPU 100 next determines, in step 604, if the display switch SW6 has been set to its "4" position. If the determination in step 604 is affirmative, CPU 100 proceeds, in step 606, to the ADISPL subroutine. If the determination in step 604 is negative, CPU 100 proceeds, in step 608, to the TDISPL subroutine. From either step 602, 606 or 608, CPU 100 returns to step 211D in FIG. 7(a).

COMPUTATION AND DISPLAY OF ADVANCE TIME

Figure 28:
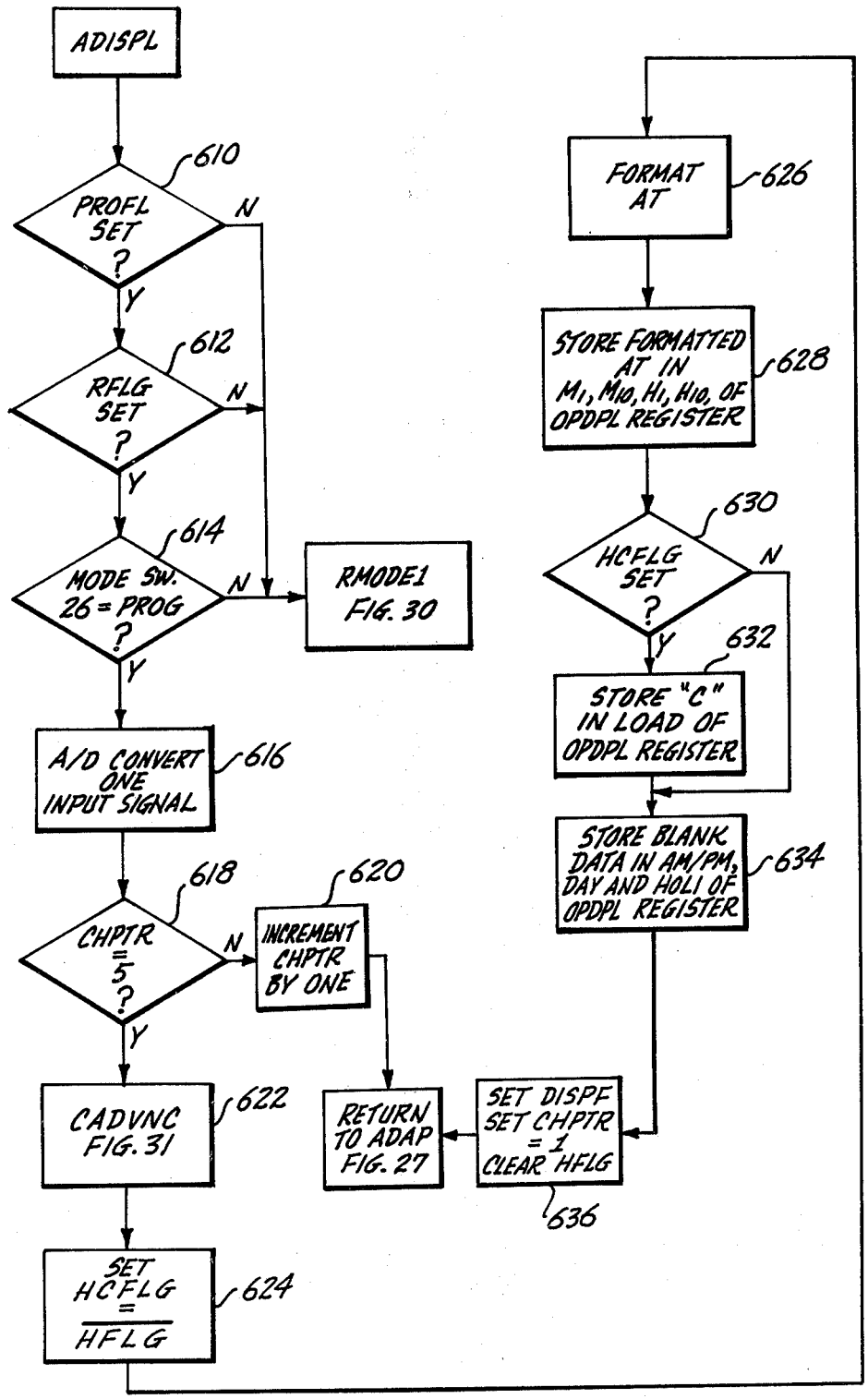
FIG. 28 is a flow chart of the program steps undertaken by the microprocessor in a ADISPL subroutine.
Figure 29:
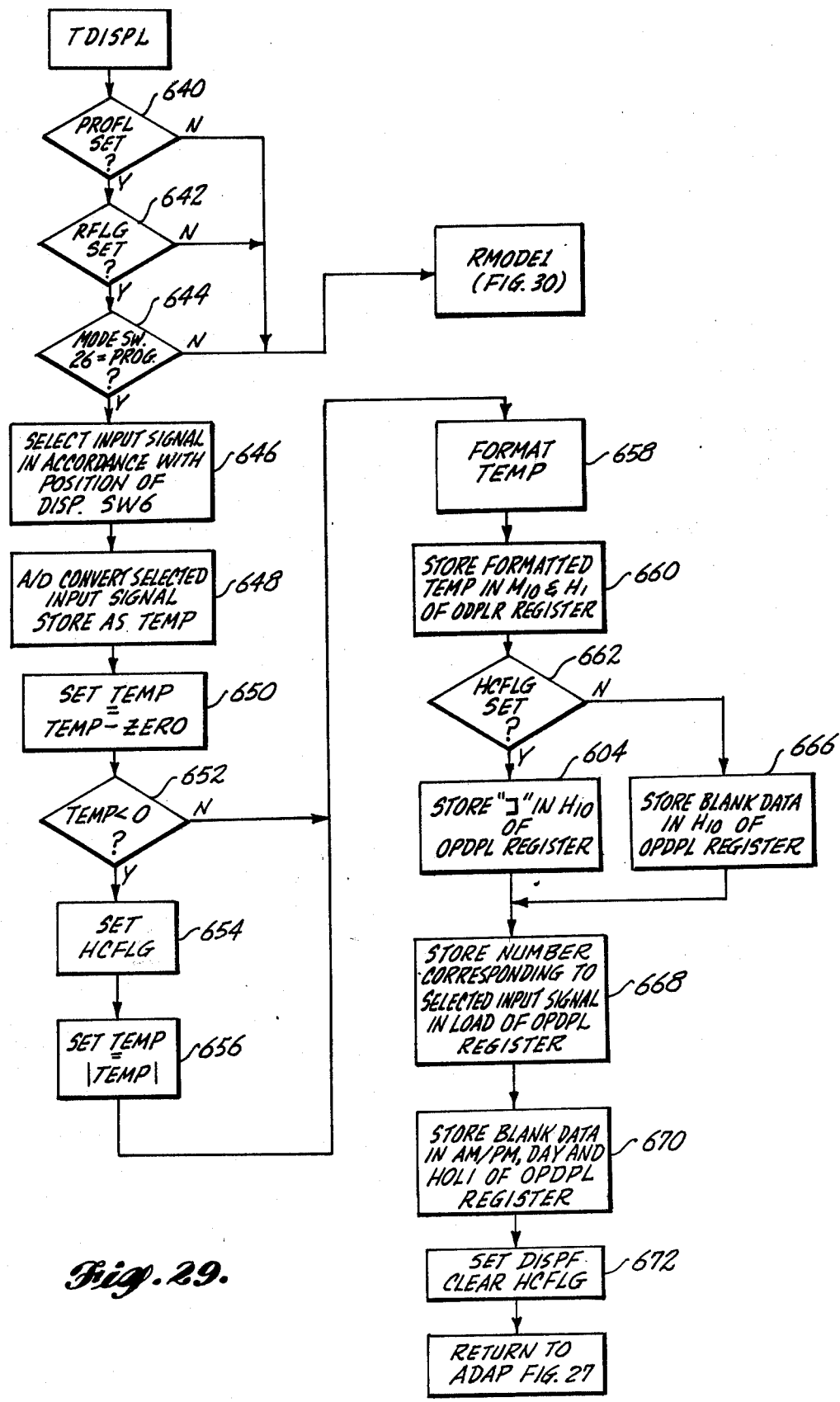
FIG. 29 is a flow chart of the program steps undertaken by the microprocessor in a TDISPL subroutine.

Let it be assumed that the user has set the display switch SW6 to position "4", and accordingly desires a display of advance time, whereupon CPU 100 enters the ADISPL subroutine illustrated in FIG. 28.

It is desirable that the user be able to obtain a display of advance time only if the microprocessor is in its program mode of operation. Further, it is desirable that the computations related to the various environmentally-adaptive modifications be made before any display is effected.

Accordingly, CPU 100 determines, in respective steps 610, 612 and 614, if the PROFL operation flag has been set, if the RFLG operation flag has been set, and if the mode switch 26 has been set to its PROGRAM position. If the determination in any of steps 610, 612 or 614 is negative, CPU 100 proceeds directly to the RMODE subroutine through a point therein identified as RMODE1. As will be described hereinafter, the RFLAG operation flag is set upon each passage of CPU 100 through the RMODE subroutine. Accordingly, if RFLAG has not been set, CPU 100 has not yet passed through that subroutine. Likewise, the user may have actuated the mode switch 26 to either its RUN or RUN/VERIFY positions, so that the determination in step 614 is accordingly negative. It is also possible that although the load switch 26 has been set to its PROGRAM position, the user may not have done so within the required five-second period following the actuation of the program enable switch 48 (reference the previous discussion concerning steps 212, 214, 216, 218 and 220, FIG. 7(a)), whereupon the PROFL operation flag has been cleared in step 224 (FIG. 7(a)). As a result, the determination in step 610 is negative.

However, if the determinations in steps 610, 612 and 614 are each affirmative, CPU 100 proceeds, in step 616, to effect A/D conversion of the input signal from one analog data source. In effecting this A/D conversion, CPU 100 looks at the count contained within the CHPTR data byte, and selects one such input signal for conversion. Within step 616, CPU 100: selects the data byte corresponding to the selected input signal (e.g., TZ1); supplies data to latch 170 (FIG. 22) representing the selected input signal and concurrently enables latch 170, whereupon the selected input signal appears on the output of analog multiplexer 182 as previously described; supplies the count within the selected data byte to latch 188, whereupon resistive ladder network 190 provides an analog voltage related thereto; and, utilizes a successive-bit approximation subroutine (not illustrated) to vary the count within the selected data byte and monitor changes in logic level on the output of comparator 186 through the RST 5.5 input of CPU 100. Upon completion of the successive-bit approximation subroutine, the selected data byte has stored therein a count representing the magnitude of the input signal.

From step 616, CPU 100 proceeds, in step 618, to determine if the CHPTR data byte contains the number "5" (there being five analog data sources). Upon a POWER-UP condition, the CHPTR data byte set to the number "1", so that upon the first pass of CPU 100 through the ADISPL subroutine, the determination in step 618 is negative. Thereupon CPU 100 proceeds, in step 620, to increase the number within the CHPTR data byte by one, and then returns to the ADAP routine. When CPU 100 returns to the ADISPL subroutine upon its next pass through the ADAP routine, CPU 100 then proceeds to effect analog/digital conversion for another input signal. It will be appreciated that CPU 100 continues to loop through the thus-described portion of the ADISPL subroutine until all input signals have been converted to digital form. At this time, the determination in step 618 is affirmative, whereupon CPU 100 proceeds, in step 622, to the CADVNC subroutine in FIG. 31.

In the CADVNC subroutine, the actual computation of advance time in made, using the relationship previously described.

Specifically, CPU 100 determines, in step 720, a temperature deviation by setting $\Delta T = TOD - TRFAS$, and maintains $\Delta T$ in an internal register of CPU 100. In step 722, CPU 100 determines if $\Delta T$ is less than or equal to zero, that is, if the outdoor temperature TOD is less than or equal to the reference temperature TRFAS. If the determination in step 722 is affirmative, CPU 100, in step 724, proceeds to make $\Delta T$ a positive number, and thereafter, in step 726, sets the HFLG operation flag. If outdoor temperature is below the reference temperature and the determination in step 722 is affirmative, the setting of the HFLG operation flag in step 726 selects a function in the heat advance range (FIG. 39). If outdoor temperature is above the reference temperature and the determination in step 722 is negative, CPU 100 proceeds to clear the HFLG operation flag in step 725 to accordingly select a function in the cool advance range (FIG. 39).

From either step 725 or step 726, CPU 100 proceeds, in step 728, to determine if $\Delta T$ is less than or equal to the advance time deadband ATDB. From Table VIII, it will be appreciated that the determination in step 728 is affirmative only if the outdoor temperature is above or below the reference temperature (16° C.) by more than 4° C. If the determination in step 728 is affirmative, that is, the outdoor temperature is inside the deadband, CPU 100 proceeds, in step 730, to set ΔT=0. From either step 730, or from step 728 if the determination therein is negative, CPU 100 proceeds, in step 732, to determine if the HFLG cooperation flag has been set (reference step 726). If the determination in step 732 is affirmative, CPU 100 proceeds, in step 734, to select the HEATC and HEATG data bytes (by transferring the contents of those data bytes from RAM 104 to an internal register of CPU 100). If the determination in step 732 is negative, CPU 100 proceeds, in step 736, to select the COOLC and COOLG data bytes.

From either step 734 or step 736, CPU 100 proceeds, in step 738, to compute the advance time by dividing the selected HEATG or COOLG by four (since the resolution provided by the A/D conversion thereof is not required), sums that result with the selected first constant C (HEATC or COOLC), multiplies the resultant sum by ΔT, and sets the advance time AT equal to the resultant product, which advance time AT is maintained in an internal register in CPU 100.

From step 738, CPU 100 proceeds, in step 740, to again determine if the HFLG operation flag has been set (reference step 726). If the determination in step 740 is affirmative, CPU 100 proceeds, in step 742, to select the HEATK data byte. If the determination in step 740 is negative, CPU 100 proceeds, in step 744, to select the COOLK data byte. From either step 742 or step 744, CPU 100 proceeds, in step 746, to divide the advance time AT by the selected constant K (HEATK or COOLK).

Upon executing step 746, CPU 100 accordingly has stored in an internal register thereof the advance time AT. From step 746, CPU 100 returns to the ADISPL subroutine and specifically to step 624 therein. At this point, it should be noted that the computation of advance time made as CPU 100 proceeds through the ADISPL subroutine is not used for the advance start modification, but only for display purposes. When CPU 100 proceeds through the RMODE subroutine, the CADVNC subroutine is again called and the advance time AT again recomputed.

While in step 624, CPU 100 sets the HCFLG operation flag equal to the logical complement of the HFLG operation flag. Therefore, if the HFLG operation flag is set, the HCFLG operation flag is cleared and vice-versa. From steps 624, CPU 100 proceeds, in step 626, to format the advance time AT contained in its internal register. In step 626, AT is converted to corresponding hour and minute information (in BCD form). From step 626, CPU 100 proceeds, in step 628, to store the formatted AT in the M1, M10, H1 and H10 fields of the OPDPL register. Therefore, the noted fields of the OPDPL register contain the BCD equivalent of the advance time. From step 628, CPU 100 proceeds, in step 630, to determine if the HCFLG operation flag has been set. If the determination in step 630 is affirmative, e.g., the advance time is obtained from a function in the cool advance range, CPU 100 proceeds, in step 632, to store information representing the digit "C" in the LOAD field of the OPDPL register. From step 632, or from step 630 if the determination therein is negative, CPU 100 proceeds, in step 634, to store blank data in the AM/PM, DAY and HOLI fields of the OPDPL register. From step 634, CPU 100 proceeds, in step 636, to set the DISPF operation flag, to set CHPTR=1, and to clear the HFLG operation flag. From step 636, CPU 100 returns to the ADAP routine.

From the ADAP routine, CPU 100 returns, as previously described, to step 211D in FIG. 7(a). Since the DISPF operation flag has been set, the determination in step 211D is positive. CPU 100 thereafter jumps to step 203 and continues to loop through steps 203, 204, 206, 208 or 210, 211A, 211B and 211D until the DISPF operation flag has been cleared. While in this loop operation, the DISPF operation flag can be cleared only if the user returns the microprocessor to either its run/-verify or run mode of operation, e.g., the user moves the mode switch 26 to its RUN/VERIFY or RUN position and the determination in either step 610 or step 614 (FIG. 28) is negative, or, if the user moves the display switch SW6 to its "0" position and CPU 100 proceeds to the RMODE subroutine (reference steps 600, 602, FIG. 27) as hereinafter described. Therefore, if the user has elected to display the advance time while the microprocessor is in its program mode, the user first must cause the microprocessor to leave the program mode, or must move the display switch SW6 to its "0" position before obtaining a display of any information relating to real-time control. Also, the user cannot alter the predetermined time schedule in the event memory since CPU 100 cannot proceed to its PROGRAM mode 242 (FIG. 7(b)) and to the KEYBOARD routine therein.

Figure 38:
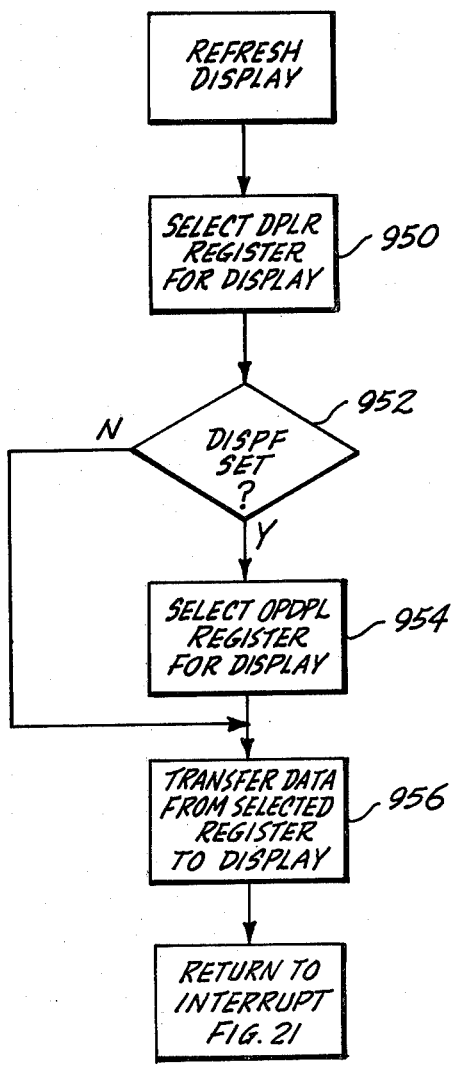
FIG. 38 is a flow chart of the program steps undertaken by the microprocessor in a REFRESH DISPLAY subroutine.

It will be remembered that CPU 100, durings its passage through the INTERRUPT subroutine, refreshes the displays 28 and 142 in step 552. With reference now to FIG. 38, the REFRESH DISPLAY subroutine (step 552 in FIG. 21) includes an initial step 950 in which CPU 100 selects the DPLR register for display. From step 950, CPU 100 proceeds, in step 952, to determine if the DISPF operation flag has been set. If the determination in step 952 is affirmative, CPU 100 proceeds, in step 954, to select the OPDPL register for display. From step 954, or from step 952 if the determination therein is negative, CPU 100 proceeds, in step 956, to transfer data from the selected register to the displays 28 and 142. Assuming that the DISPF operation flag has not been set, CPU 100 accordingly transfers the contents of the TIME, DAY and HOLI fields in the DPLR register to ports 108 and 110B. However, if the DISPF operation flag has been set, CPU 100 instead transfers the contents of the fields within the OPDPL register to ports 108 and 110B. In the situation being discussed, this transfer results in the display of advance time by the HR and MIN character displays (FIG. 1). In addition, if the advance time has been computed using a function in the cool advance range, the character "C" is displayed by the LOAD character display (FIG. 1). By so displaying the advance time, the user may adjust the advance time to be obtained under the existing environmental conditions by varying the HEAT ADV or the COOL ADV potentiometers. At this point, it should be noted that the DISPF operation flag is also set when CPU 100 is proceeding through the TDISPL subroutine, whereupon relevant temperature information is displayed.

DISPLAY OF SENSED TEMPERATURES

Returning now to the ADAP routine (FIG. 27) let it be assumed that the user has set the display switch SW6 to either its "1", "2", or "3" positions. As a result, the determinations in steps 600 and 604 are negative, and CPU 100 proceeds, in step 608, to the TDISPL subroutine in FIG. 29.

In steps 640, 642 and 644, determinations identical to those made in steps 610, 612 and 614 in the ADISPL subroutine (FIG. 28) are made. Therefore, if the microprocessor is not currently in its program mode of operation, or, if CPU 100 has not already passed through the RMODE subroutine, one of the determinations in steps 640, 642 or 644 is negative, whereupon CPU 100 enters the RMODE subroutine through RMODE1. If the determinations in steps 640, 642 and 644 are each affirmative, however, CPU 100 proceeds, in step 646, to select one of the input signals in accordance with the position of display switch SW6, and, in step 648 performs an A/D conversion on the selected input signal (in a manner similar to that previously described in conjunction with the ADISPL subroutine). However, at this time, the count represented by the selected input signal is stored in an internal register in CPU 100 (rather than in RAM 104) and is denominated TEMP. Accordingly, TEMP will comprise either the indoor temperature for the first zone, the indoor temperature for the second zone, or the outdoor temperature.

In step 650, CPU 100 converts the thus-selected temperature from absolute units to relative units, by setting TEMP=TEMP-ZERO, where ZERO is a count representing that obtained at a temperature of 0° C. In step 652, CPU 100 determines if TEMP is a negative number. If the determination in step 652 is affirmative, the selected temperature is below freezing and CPU 100, in step 654, sets the HCFLG operation flag and thereafter, in step 656 converts TEMP to a positive number.

From step 656, or from step 652 if the determination therein is negative, CPU 100 proceeds, in step 658, to format TEMP by converting TEMP into an equivalent BCD form. In step 660, CPU 100 stores the formatted TEMP in the M10 and H1 fields of the OPDPL register. From step 660, CPU 100 proceeds to determine, in step 662, if the HCFLG operation flag has been set (reference step 654). If the determination in step 662 is affirmative, i.e., the selected temperature is below freezing, CPU 100 proceeds, in step 664, to store a "]" character in the H10 field of the OPDPL register. If the determination in step 662 is negative, CPU 100 proceeds, in step 666, to store blank data in the H10 field of the OPDPL register. From either step 664 or step 666, CPU 100 proceeds, in step 668, to store a number corresponding to the selected input signal in the LOAD field of the OPDPL register. The number thus stored corresponds to the position to which display switch SW6 has been set, e.g., 1, 2, 3 for positions "1", "2" and "3". CPU 100 then, in steps 670, stores blank data in the AM/PM, DAY and HOLI fields of the OPDPL register, sets the DISPF operation flag and clears the HCFLG operation flag in step 672, and then returns to the ADAP routine.

Since the DISPF operation flag has now been set, the contents of the OPDPL register are transferred to the displays 28 and 142 as previously described.

Accordingly, the user may obtain a display of the indoor temperature for the first zone, the indoor temperature for the second zone, or the outdoor temperature. Each temperature will be displayed in terms of a corresponding decimal number, with the units thereof appearing in one of the MIN character display units and with the tens thereof appearing in one of the HR character display units (FIG. 1). If the selected temperature is below freezing, a ] will appear in the LOAD character display unit. Using the display, the user may effect temperature calibration for each temperature sensor TSZ1, TSZ2, and TSOD by adjustment of the corresponding calibration potentiometer CAL Z1, CAL Z2, and CAL OD.

COMPUTATION OF VARIOUS MODIFICATIONS

Returning now to the ADAP routine (FIG. 27) let it be assumed that the user has set the display switch SW6 to its "0" position. As a result, the determination in step 600 is affirmative, whereupon CPU 100, in step 602, enters the RMODE routine in FIG. 30.

It will be remembered that CPU 100 can enter the RMODE routine either directly from the ADAP routine, as just described, or from either the ADISPL or TDISPL subroutines, as previously described. In the latter case, a determination has necessarily been made that the microprocessor is not in its program mode of operation or that the microprocessor, even while in its program mode of operation, has not yet passed thrugh the RMODE routine at least once. In the former case, CPU 100 sets the RFLG operation flag in step 680. In the latter case, while entering through RMODE 1, CPU 100 clears the RFLG operation flag in step 682. If the microprocessor is not in its program mode of operation, the action undertaken in step 682 insures that CPU 100 will not function to display any advance time or temperature information (i.e., the display switch SW6 position has no affect on the information displayed), inasmuch as CPU 100 jumps immediately to the RMODE routine through RMODE 1 upon each pass through the ADISPL or the TDISPL subroutines. If the microprocessor is in its program mode of operation but has not yet passed through the RMODE subroutine, the action undertaken in step 682 insures that CPU 100 will not function to display any advance time or temperature information until after the user moves display switch SW6 to its "0" position, thereby permitting CPU 100 to pass through RMODE wherein RFLG is set in step 680, and then returns display switch SW6 to its "1", "2", "3" or "4" positions.

From either step 680 or step 682, CPU 100 proceeds, in step 684, to clear the DISPF operation flag. As a result, the displays are enabled to display only information relating to real-time control (see the REFRESH DISPLAY subroutine, FIG. 38) and the user is permitted to undertake all actions permitted while the microprocessor is in its program mode of operation, since CPU 100 may now proceed to its PROGRAM mode 242 without looping back through the ADAP routine (see FIGS. 7(a) and 7(b)).

In step 686, CPU 100 proceeds to effect A/D conversion of one input signal, in the manner previously described. It will be recognized that the CHPTR data byte will have been set to "1" at the time that CPU 100 first enters the RMODE subroutine (either following a POWER-UP condition in step 200, FIG. 7(a), or upon proceeding to the RMODE subroutine after completion of the ADISPL subroutine, see step 636, FIG. 28). Accordingly, a predetermined input signal is converted in step 686, and stored as a corresponding count in one of the data bytes in RAM 104 (e.g., TZ1).

From step 686, CPU 100 proceeds, in step 688 to determine the CHPTR operation flag contains the number "5" (there being five analog data sources). Upon the initial pass of CPU 100 through the RMODE subroutine, the determination in step 688 is negative, whereupon CPU 100 proceeds, in step 690, to increase CHPTR by one, and then returns to the ADAP routine.

Upon the next pass of CPU 100 through the RMODE subroutine, a second input signal is converted to digital form in step 686. Since the determination in step 688 is still negative, the CHPTR data byte is incremented in step 690, and CPU 100 again returns to the ADAP routine. This looping operation continues until all input signals have been converted to digital form and the determination in step 688 is affirmative. At this time, CPU 100 proceeds, in step 692, to compute information used for the night setback modification, by calling the SETBK subroutine; in step 694, to compute information used for the duty-cycle shift modification, by calling the DCSHIFT subroutine; and, in successive steps 696 and 698, to compute information used for the advance start modification, by calling the CADVNC and ADVLD subroutines. Thereafter, CPU 100, in step 700, clears the CHPTR data byte, and then returns to the ADAP routine.

COMPUTATION OF NIGHT SETBACK MODIFICATION

Figure 32:
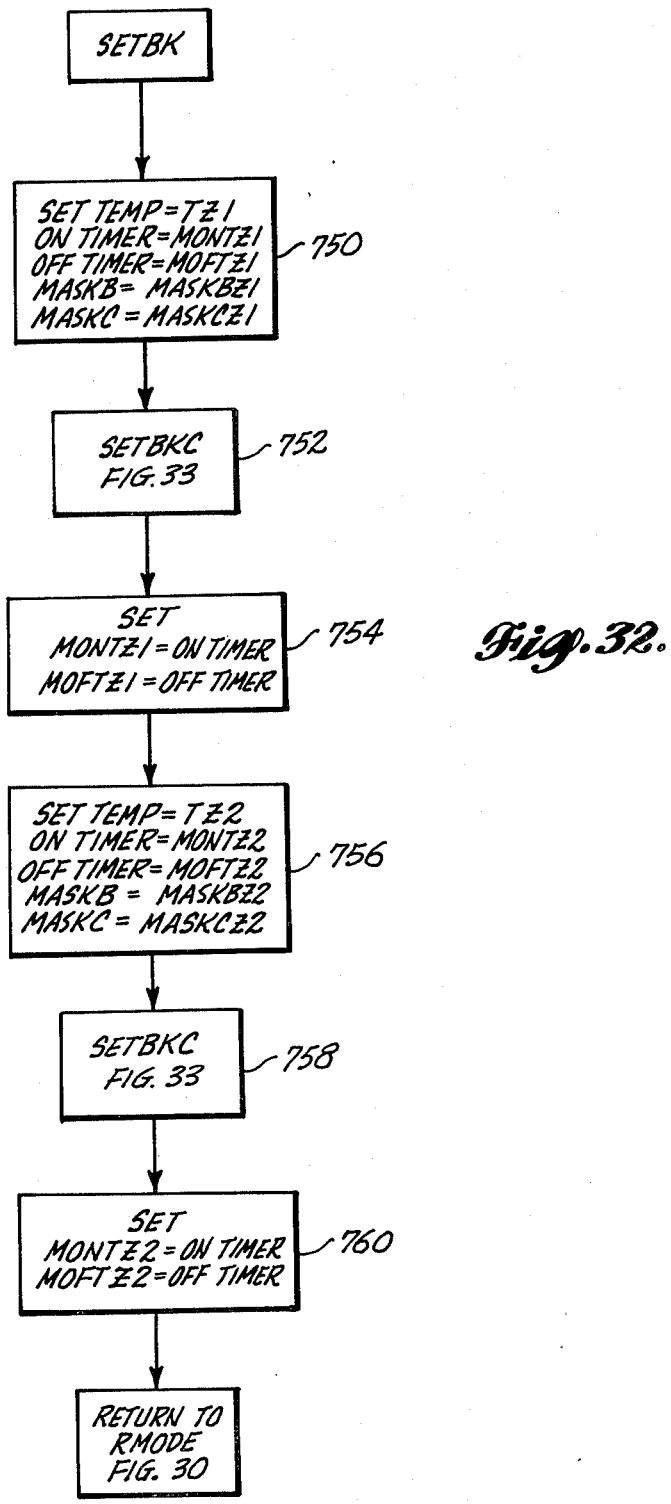
FIG. 32 is a flow chart of the program steps undertaken by the microprocessor in a SETBK subroutine.

With reference now to the SETBK subroutine in FIG. 32, CPU 100, in step 750, transfers various data stored in RAM 104 and PROM 162 to certain internal registers of CPU 100. Specifically, CPU 100 sets TEMP=TZ1 (indoor temperature for the first zone); ON TIMER=MONTZ1 (the minimum on timer for the first zone); OFF TIMER=MOFTZ1 (the minimum off timer for the first zone); MASK B=MASKBZ1 (a first masking byte for the first zone, 11110000); and, MASK C=MASKCZ1 (a second masking byte for the first zone, 00001111). As previously described, loads 1-4 are in the first zone, and loads 5-8 are in the second zone.

Figure 33:
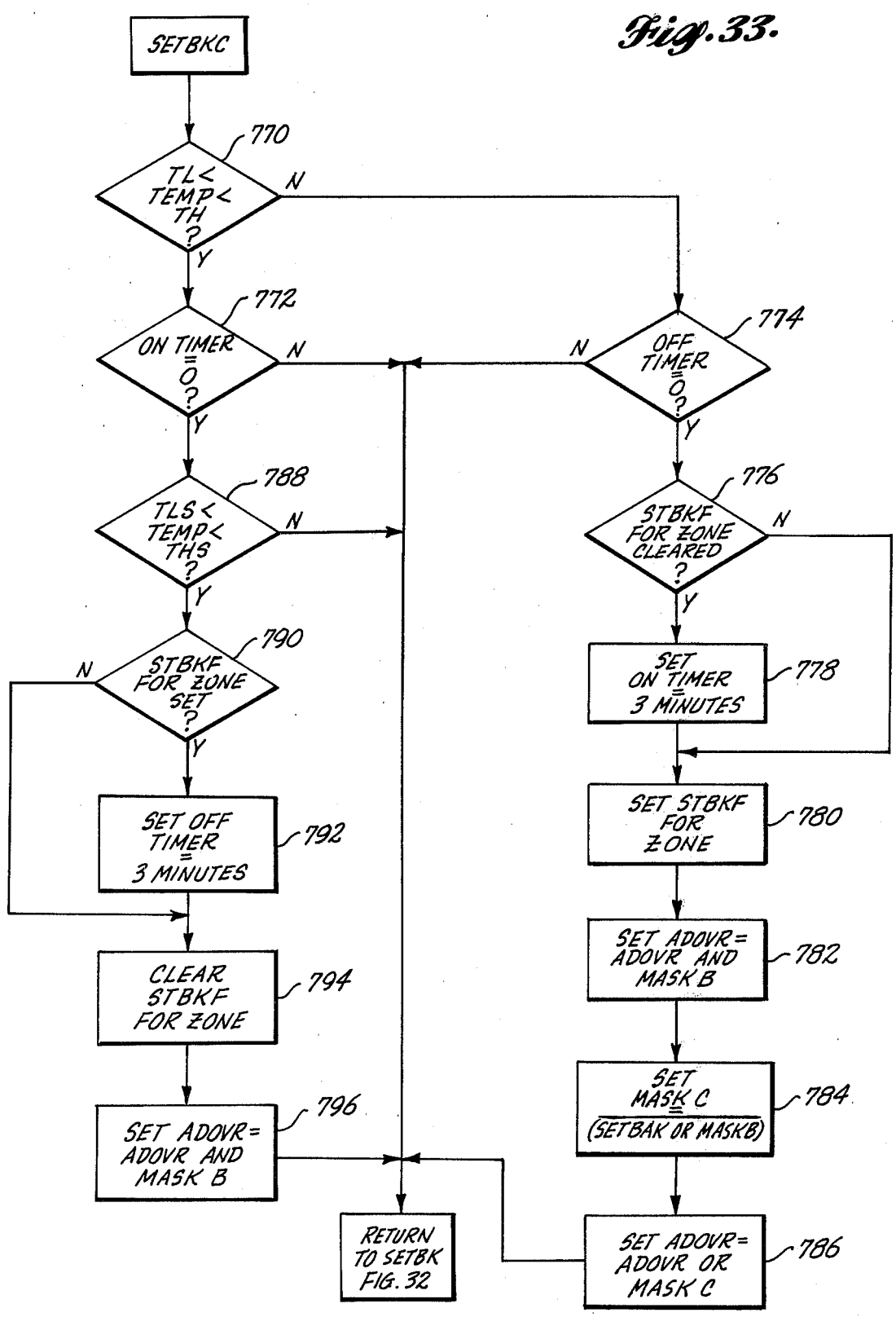
FIG. 33 is a flow chart of the program steps undertaken by the microprocessor in a SETBKC subroutine.
Figure 37A:
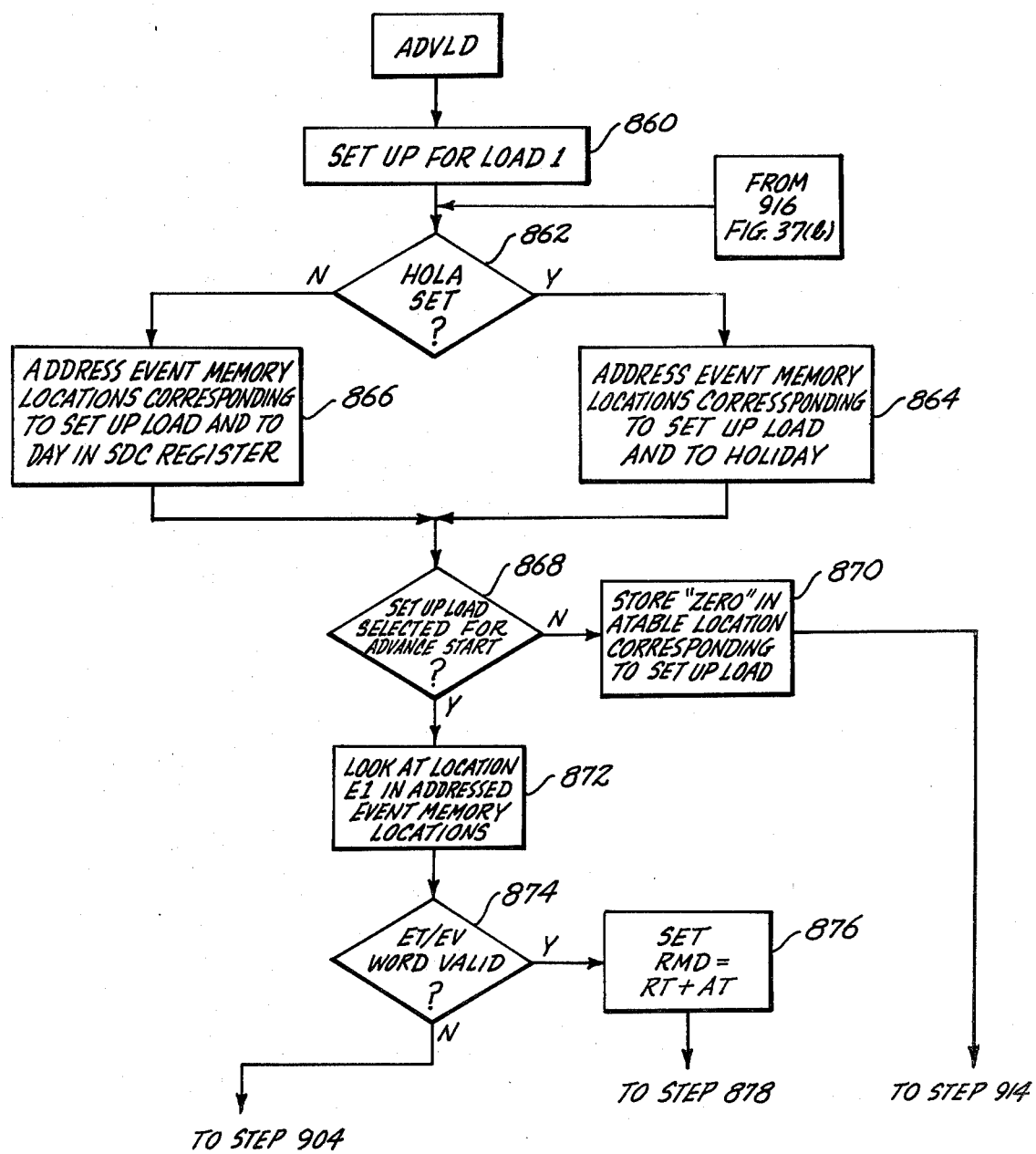
FIGS. 37(a) and 37(b) are a flow chart of the program steps undertaken by the microprocessor in a ADVLD subroutine.
Figure 37B:
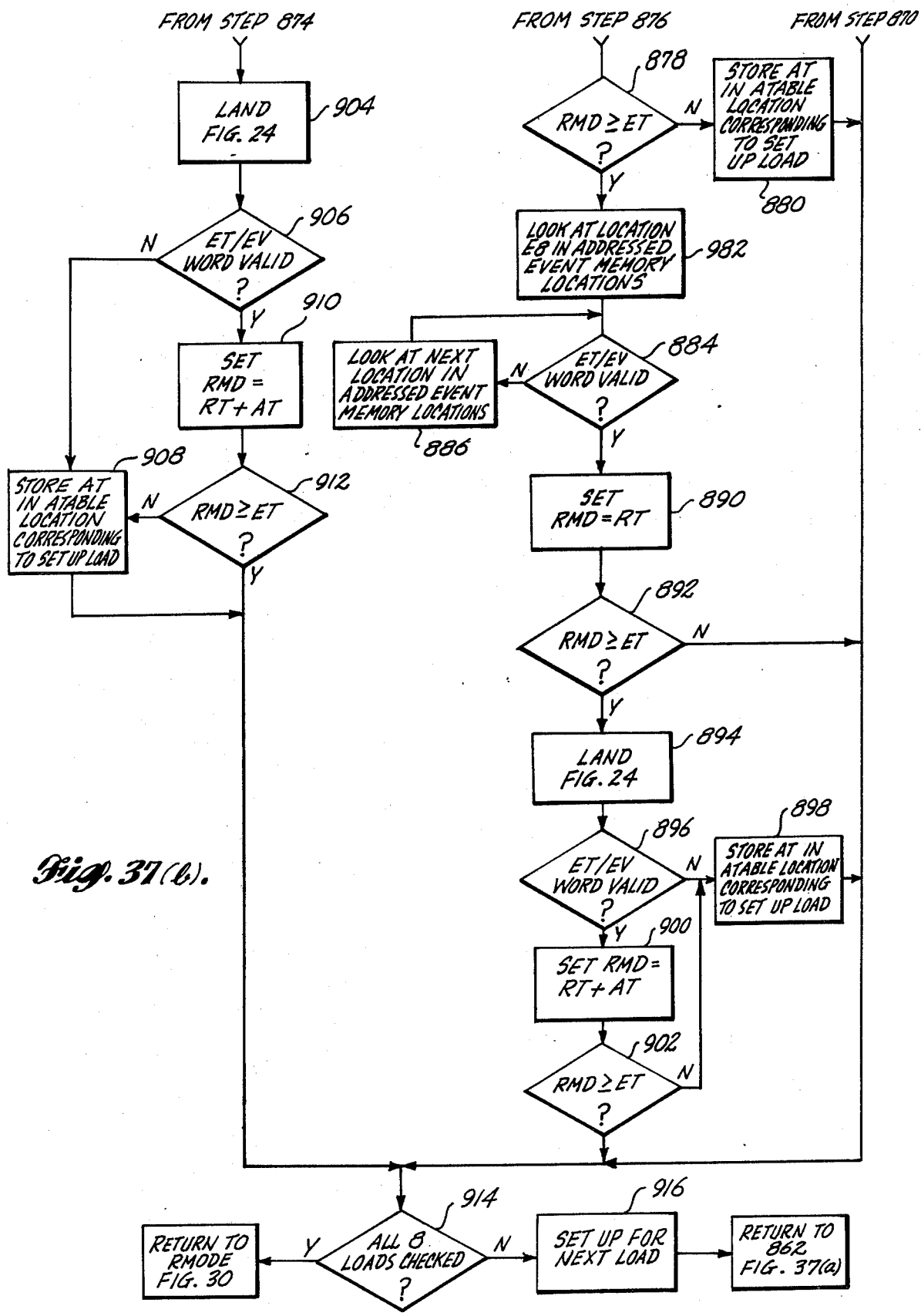

Thereafter, CPU 100, in step 752, calls the SETBKC subroutine in FIG. 33. Initially, CPU 100 determines if the indoor zone temperature (e.g., the indoor temperature for the first zone) is within the high and low limits used for the night setback modification. Specifically CPU 100 determines if TL<TEMP<TH. If the determination in step 770 is affirmative, i.e., the sensed temperature is inside the limits, CPU 100 next determines, in step 772, if the minimum on timer is running for the selected zone (e.g., the first zone). Specifically, CPU 100 determines if ON TIMER=0. If the determination in step 772 is negative (as would be the case where CPU 100 enters the SETBKC subroutine immediately following a POWER-UP condition), CPU 100 returns to the SETBK subroutine.

However, let it be assumed that the sensed temperature is outside the limits, and that the determination in step 770 is accordingly negative. As a result, CPU 100 proceeds, in step 774, to determine if the minimum off timer for the selected zone is running. Specifically, CPU 100 determines if OFF TIMER=0. If the determination in step 774 is negative, CPU 100 again returns to the SETBK subroutine. Upon a POWER-UP condition, however, the determination in step 774 will be affirmative, whereupon CPU 100 proceeds, in step 776, to determine if the STBKF data byte for the selected zone has been cleared. The STBKF data byte comprises an 8-bit data byte, one for each load (organized in a manner identical to that of LBYTE). If any bit Bx therein associated with the selected zone is set, the STBKF data byte for the selected zone is considered to be set. Otherwise, the STBKF data byte for the selected zone is considered to be cleared. Accordingly, if any of the bits B1-B4 in STBKF are set, then STBKF is considered to be set for the first zone. Upon a POWER-UP condition, however, all bits in STBKF have been cleared. Accordingly, the determination in step 776 is affirmative, whereupon CPU 100 proceeds, in step 778, to set ON TIMER equal to a count representing three minutes.

From step 778, or from step 776 if the determination therein is negative, CPU 100 proceeds, in step 780, to set the STBKF data byte for the selected zone. The setting of the STBKF data byte for the selected zone in step 780 inhibits CPU 100 from again restarting the minimum on timer for the selected zone until a time subsequent to the time that the minimum off timer for the selected zone has been started. Accordingly, for the first zone, bits B1-B4 of STBKF are set in step 780. Thereafter, CPU 100 in step 782, sets ADOVR=ADOVR AND MASK B; in step 784, sets MASK C=(SETBAK OR MASK B); and, in step 786, sets ADOVR=ADOVR OR MASK C. SETBAK comprises an 8-bit byte entered into an internal register of CPU 100 (by means not illustrated), with each bit therein being associated with a load and being set when the load has been selected for the night setback modification (through night setback switch SW2, FIG. 22).

The actions that are taken in steps 782, 784 and 786 effect the setting of those bits Bx in ADOVR for those selected loads x for which the night setback modification is to be implemented.

As an example, consider the situation set forth in the following table:

TABLE X

| | | |
|---|---|---|
| (1) | SETBKC being used to complete night setback modification for first zone, so | |
| | MASK B = MASKBZ1 = 11110000 | |
| | MASK C = MASKCZ1 = 00001111 | |
| (2) | first pass of CPU 100 through SETBKC following power-up condition, so | |
| | ADOVR | = 00000000 |
| (3) | loads 1, 3, 5, 7 selected for night setback modification (through night setback select switch SW2), so | |
| | SETBAK | = 10101010 |
| | ADOVR | = ADOVR and MASK B |
| | | = 00000000 |
| | SETBAK OR MASK B | = 10101010 OR 11110000 |
| | | = 11111010 |
| | MASK C | = $\overline{\text{SETBAK OR MASK B}}$ |
| | | = 00000101 |
| | ADOVR | = ADOVR OR MASK C |
| | | = 00000101 |

From the foregoing Table, it will be seen that bits B1 and B3 in the ADOVR data byte will be set, since loads 1 and 3 have been selected for the night setback modification. Further, it will be seen that the remaining bits in ADOVR associated with the first zone (e.g., bits B2 and B4), and all bits in ADOVR associated with the second zone (e.g., bits B5-B8) are cleared. As discussed hereinafter in conjunction with the OUTPUT & STAGE routine (FIG. 20), the setting of a bit in ADOVR forces the corresponding load to be turned on, if that load is not already on under real-time control.

From step 786 (FIG. 33), CPU 100 returns to the SETBK subroutine in FIG. 33, and proceeds, in step 754, to set MONTZ1=ON TIMER and MOFTZ1=OFF TIMER. After CPU 100 computes the information necessary for night setback modification for the loads in the first zone, it proceeds to compute corresponding information for the loads in the second zone by proceeding through subsequent steps 756, 758 and 760. At this time, the data used by CPU 100 in proceeding through the SETBKC subroutine (step 758) is that related to the second zone, and is transferred to the internal registers of CPU 100 in step 756. Likewise, the minimum on and minimum off timers for the second zone (MONTZ2 and MOFTZ2) are updated in step 760. From step 760, CPU 100 returns to the RMODE subroutine in FIG. 30.

When a load in a selected zone has been turned on under night setback modification, the load thereafter cannot be turned off under night setback modification until a period of three minutes has elapsed from the time that the load was first turned on under night setback modification. As an example, the count within ON TIMER is transferred to MONTZ1 in step 754 (FIG. 32), and is transferred back to ON TIMER upon a subsequent pass of CPU 100 through the SETBK subroutine (reference step 750, FIG. 32). Upon entering the SETBKC subroutine in step 752, it will be noted that if the indoor zone temperature is now inside the high and low temperature limits, the determination in step 770 is affirmative. Thereafter, CPU 100, in step 772, determines if the minimum on timer for the selected zone is still running. In the situation just described, the determination in step 772 is negative, whereupon CPU 100 returns to the SETBK routine without effecting any change in the ADOVR data byte. It will be appreciated that the determination in step 772 will remain negative until a time that the minimum on timer for the selected zone has decremented to zero, so that any loads within the selected zone that have been turned on are maintained on until that time.

When the determination in step 772 is negative, CPU 100 proceeds, in step 788, to determine if the indoor zone temperature is inside secondary high and low temperature limits, that is, CPU 100 determines if TLS>TEMP>THS. As an example, TLS=TL+4° C., and THS=TH−4° C. If the indoor zone temperature is not inside the secondary limits, the determination in step 788 is negative, whereupon CPU 100 returns to the SETBK subroutine without effecting any change in ADOVR.

When the indoor zone temperature is inside the secondary limits and the determination in step 788 is affirmative, CPU 100 proceeds, in step 790, to determine if the STBKF data byte for the selected zone has been set. In the situation being discussed, the STBKF data byte for the selected zone will have been set during a previous pass of CPU 100 through the SETBKC subroutine (reference step 780), reflecting the fact that the selected loads in the selected zone have been turned on under night setback modification. Accordingly, the determination in step 790 is affirmative, whereupon CPU 100 proceeds, in step 792, to start the minimum off timer for the selected zone by setting OFF TIMER equal to a count representing three minutes. From step 792, or from step 790 if the determination therein is negative, CPU 100 proceeds, in step 794, to clear the STBKF data byte for the selected zone. The clearing of the STBKF data byte for the selected zone in step 794 inhibits CPU 100 from again restarting the minimum off timer for the selected zone until a time subsequent to the time that the minimum on timer for the selected zone has been started. From step 794, CPU 100 proceeds, in step 796, to set ADOVR=ADOVR AND MASK B.

In the situation set forth in Table X, loads 1 and 3 have been selected for the night setback modification and were turned on when the indoor temperature for the first zone exceeded either the high limit or the low limit, so that ADOVR=00000101. Since MASK B=MASK BZ1=11110000 (reference step 750, FIG. 32), the actions undertaken in step 396 clear all bits of ADOVR associated with the loads in the first zone, e.g., bits B1 and B3 for loads 1 and 3.

Let it now be assumed that the indoor zone temperature again goes outside the high and low limits. Upon a subsequent pass of CPU 100 though the SETBKC subroutine, the determination in step 770 is negative, whereupon CPU 100 proceeds, in step 774, to determine if the minimum off timer for the selected zone is running. If the determination in step 774 is negative, CPU 100 returns to the SETBK subroutine without effecting any change in ADOVR. Accordingly, when a load in the selected zone has been turned off under night setback modification, the load thereafter cannot be turned on under night setback modification until a period of three minutes has elapsed from the time that the load was turned off under night setback modification.

When the minimum off timer for the selected zone has decremented to zero, the determination in step 774 is affirmative, whereupon CPU 100, in step 776, determines if the STBKF data byte for the selected zone has been cleared. When the minimum off timer for the selected zone was started, the STBKF data byte for the selected zone was cleared (reference steps 792, 794), so the determination in step 776 is affirmative. As a result, CPU 100 proceeds to start the minimum on timer for the selected zone (in step 778), to set the STBKF data byte for the selected zone (in step 780) and to set the bits in ADOVR corresponding to the selected loads in the selected zone. Upon the next pass of CPU 100 through the SETBKC subroutine, the determination in step 776 is negative, whereupon CPU 100 proceeds directly to step 780 without changing the count within the minimum on timer for the selected zone.

Let it now be assumed that the indoor zone temperature, subsequent to the time that the minimum off timer for the selected zone was started, comes inside the secondary limits. Accordingly, the determinations in steps 770, 772 and 788 are each affirmative. Since the STBKF data byte for the selected zone was cleared at the time that the minimum off timer for the selected zone was started (upon a previous pass of CPU 100 through the SETBKC subroutine), the determination in step 790 is negative, so that the minimum off timer for this selected zone is not restarted, and no change is made to STBKF or to ADOVR (e.g., STBKF remains cleared and the bits in ADOVR corresponding to the loads in the selected zone remain cleared).

At this point, it should be noted that if jumper JP1 is installed in the position illustrated in FIG. 22, the night setback modifications for the loads in the first and second zones will be dependent, respectively, on the indoor zone temperatures sensed by temperature sensors TSZ1 and TSZ2. If, however, jumper JP1 is installed in the non-marked position in FIG. 22, the night setback modification will be the same for each zone and will be dependent on the indoor temperature sensed by temperature sensor TSZ1.

IMPLEMENTATION OF NIGHT SETBACK MODIFICATION

With reference now to the OUTPUT & STAGE routine FIG. 20, it will be remembered that CPU 100, in step 513, sets OBYTE=RTBYT OR ADOVR. Accordingly, if a load is currently being maintained off under real-time control and its corresponding bit in RTBYT is cleared, the setting of the corresponding bit in ADOVR causes the corresponding bit in OBYTE to also be set, thereby turning that load on under night setback modification. Likewise, if the bit for a load in RTBYT remains cleared at the time that the corresponding bit in ADOVR is cleared, that load will be turned off under night setback modification. If the load is currently being maintained on under real-time control and the corresponding bit in RTBYT is set, the setting or clearing of the corresponding bit in ADOVR will have no effect upon the energization state of that load.

COMPUTATION OF DUTY-CYCLE SHIFT MODIFICATION

While in the RMODE subroutine, CPU 100 next proceeds, in step 694, to call the DCSHIFT subroutine in FIG. 34.

The computations in the DCSHIFT subroutine (and in the associated CBUMP and BLOAD subroutines) are made using internal registers of CPU 100. Initially, CPU 100, in step 800, transfers the indoor temperature for the first zone into an internal register thereof, by setting TEMP=TZ1, and then proceeds, in step 802, to the CBUMP subroutine in FIG. 35. While the CBUMP subroutine, CPU 100, in step 820, determines the deviation of the indoor zone temperature from the reference temperature, by setting $\Delta$=TEMP-TRFDCS. Thereafter, CPU 100, in step 822, determines if the temperature deviation is a negative number. If the determination in step 822 is affirmative, i.e., the indoor zone temperature is below the reference temperature, CPU 100, in step 824, converts the indoor zone temperature into a positive number. From step 824, or from step 822 if the determination therein is negative, CPU 100, in step 826, determines the duty-cycle shift deadband that has been selected by the user by determining the position of the duty-cycle shift select switch SW3, and by transferring the corresponding duty-cycle shift deadband DCSDBy (DCS DB1-DCS DB5) from PROM 162 to an internal register of CPU 100. In step 828, CPU 100 makes an initial determination of the value of the duty-cycle shift DCS by setting DCS=$\Delta$T-DCSDBy. Thereafter, in step 830, CPU 100 determines if the thus-computed duty-cycle shift DCS is less than zero. If the determination in step 830 is affirmative, the indoor zone temperature is within the selected duty-cycle shift deadband and CPU 100, in step 832, sets DCS=0. If the determination in step 830 is negative, the indoor zone temperature may be either at the deadband or outside the deadband.

From step 832, or from step 830 if the determination therein is negative, CPU 100 proceeds, in step 834, to round-off DCS to the nearest integer. As an example, let it be assumed that DCS=0 (having been set thereto either in step 828 or in step 832). As a result, the actions that are taken by CPU 100 in step 834 effect no change in the duty-cycle shift DCS, which remains at zero. If the duty-cycle shift computed in step 838 equals 0.5, e.g., the indoor zone temperature is 0.5° C. above or below the deadband, then the actions that are taken by CPU 100 in step 834 result in DCS=1(0.5 rounded off to the nearest integer). It will therefore be appreciated that the duty-cycle shift DCS is set to 1 when the indoor zone temperature is substantially at the upper limit or the lower limit defined by the selected deadband, and that the duty-cycle shift DCS varies by 1 for every 1° C. of temperature variation thereafter until the indoor zone temperature comes inside the selected deadband.

In step 836, CPU 100 stores DCS as either DCSZ1 (the duty-cycle shift for the first zone) or as DCSZ2 (the duty-cycle shift for the second zone). Then, CPU 100 returns to the DC SHIFT subroutine, and proceeds, in steps 804 and 806 to compute the duty-cycle shift DCS for the second zone (using temperature TZ2) and stores the thus-computed duty-cycle shift DCS as DCSZ2.

At this point, it should be noted that if the jumper JP1 is installed in the position illustrated in FIG. 22, the vaues of DCSZ1 and DCSZ2 will be dependent, respectively, on the indoor zone temperatures sensed by temperature sensors TSZ1 and TSZ2. If, however, jumper JP1 is installed in the nonmarked position in FIG. 22, the values of DCSZ1 and DCSZ2 will be the same and will both be dependent on the indoor temperature sensed by temperature sensor TSZ1.

From step 806 (FIG.34), CPU 100 proceeds, in step 810, to the BLOAD subroutine in FIG. 36.

Initially, CPU 100, in step 840, sets up for load 1, e.g., sets an internal pointer to load 1. From step 840, CPU 100, in step 842, determines if the set-up load (e.g., load 1) has been selected for the duty-cycle shift modification. In implementing step 842, CPU 100 looks at the position of the duty-cycle shift select switch SW3. If the set-up load has not been selected for the duty-cycle shift modification and the determination in step 842 is negative, CPU 100 proceeds, in step 844, to store a "0" into the location in the BTABLE register corresponding to the set-up load. In the situation where the set-up load comprises load 1, a "0" is accordingly stored in location BDCS1 in the BTABLE register (reference FIG. 23).

Figure 30:
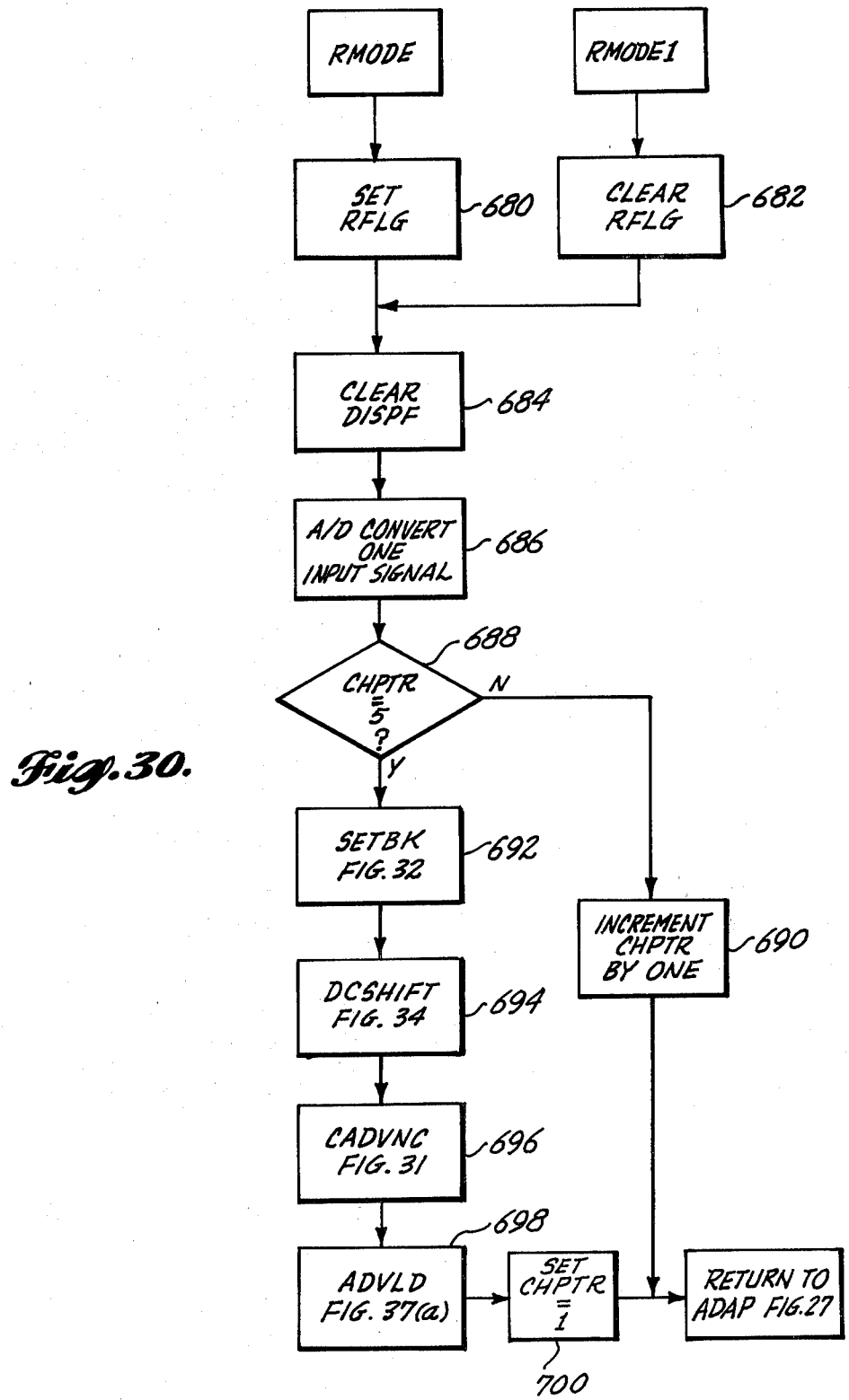
FIG. 30 is a flow chart of the program steps undertaken by the microprocessor in a RMODE subroutine.

If the set-up load has been selected for the duty-cycle shift modification and the determination in step 842 is affirmative, CPU 100 then determines, in step 846, if the load number of the set-up load is greater than four. If the determination in step 846 is negative, the set-up load is in the first zone, so that CPU 100, in step 848, stores DCSZ1 (the duty-cycle shift for the first zone) into the location in the BTABLE register corresponding to the set-up load. If the determination in step 846 is affirmative, CPU 100 proceeds, in step 850, to store DCSZ2 (the duty-cycle shift for the second zone) into the location in the BTABLE register corresponding to the set-up load. From either step 844, 848 or 850, CPU 100 proceeds, in step 852, to set up for the next load, and then, in step 854, to determine if all eight loads have been checked. Upon the initial pass of CPU 100 through the BLOAD subroutine, the determination in step 854 is negative, whereupon CPU 100 returns to step 842 and then proceeds to store corresponding data in the next location (e.g., BDCS2) in the BTABLE register. The process thus described is continued until data has been stored in all locations BDCS1-BDCS8 of the BTABLE register. Accordingly, when the determination in step 854 is affirmative, locations BDCS1-BDCS4 will contain either DCSZ1 or "0", depending on whether the corresponding load has been selected for the night setback modification, and locations BDCS5-BDCS8 will contain either DCSZ2 or "0", depending on whether the corresponding load has been selected for the duty-cycle shift modification. From step 854, CPU 100 returns to the DCSHIFT subroutine (FIG. 34) and thence to the RMODE subroutine (FIG. 30). At this point, it should be noted that passage of CPU 100 through the DCSHIFT subroutine, and its various subroutines, effects only computation and storage of the duty-cycle shift that will be used. The actual duty-cycle shift modification, however, is implemented in the LOAD UPDATE routine and its various subroutines, as described hereinafter.

COMPUTATION OF ADVANCE START MODIFICATION

Figure 31:
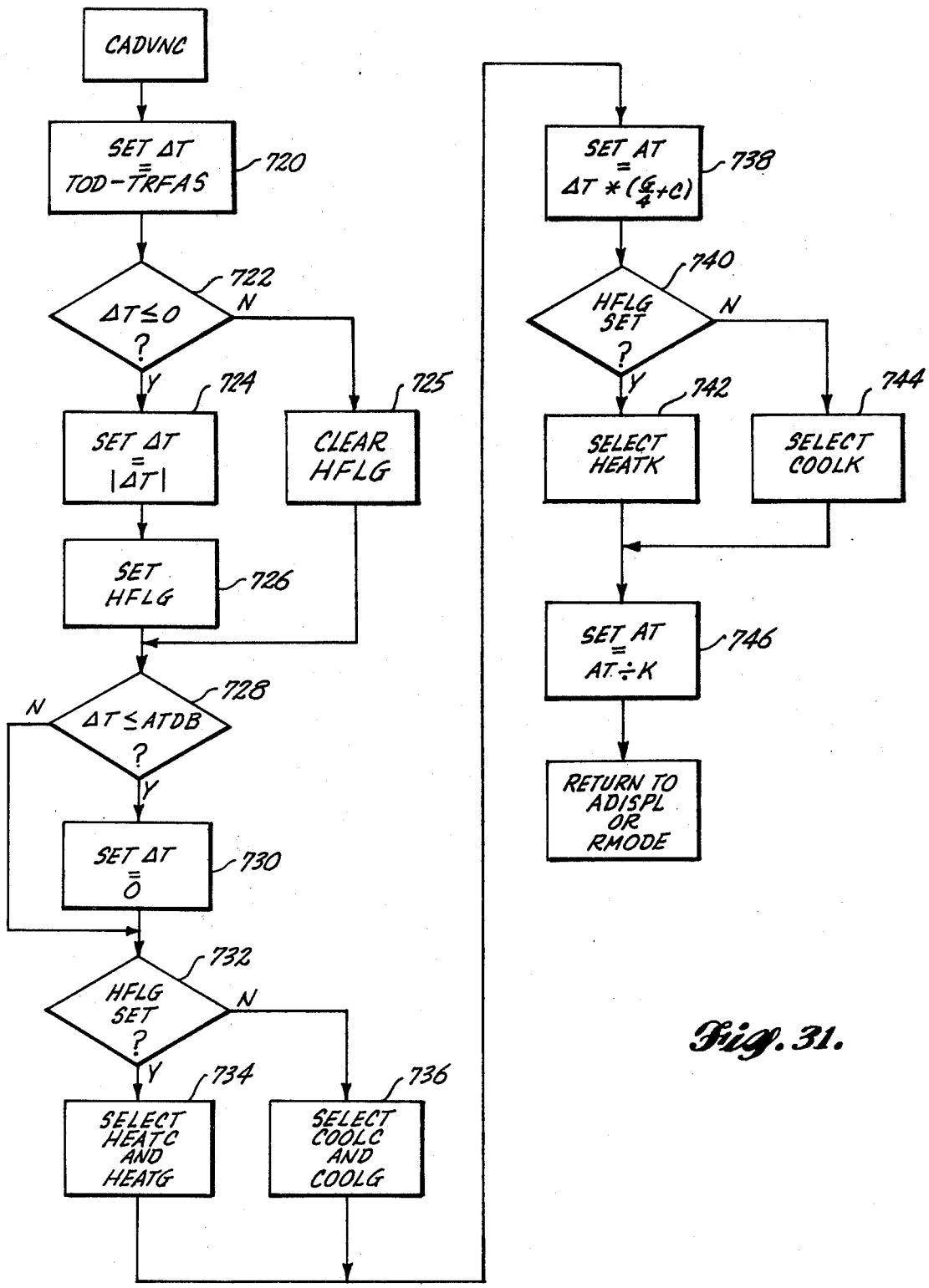
FIG. 31 is a flow chart of the program steps undertaken by the microprocessor in a CADVNC subroutine.

While in the RMODE subroutine, CPU 100 next proceeds, in step 696, to cal the CADVNC subroutine in FIG. 31. As previously described in conjunction with the ADISPL subroutine, the actions that are taken in the CADVNC subroutine result in the storage, in an internal register of CPU 100, of the advance time AT. From step 696, CPU 100 proceeds, in step 698, to the ADVLD subroutine in FIGS. 37(a) and 37(b).

Initially, CPU 100, in step 860, is conditioned or set up for load 1, i.e., is enabled to address those event memory locations corresponding to load 1 (FIG. 6). In step 862, CPU 100 determines if the HOLA field within the SDC register has been set (reference steps 282, 284 in the REAL-TIME CLOCK routine in FIG. 8). If the determination in step 862 is affirmative, i.e., the real-time day has been selected as a holiday, CPU 100 proceeds, in step 864, to address the event memory locations corresponding to the set-up load and to the holiday schedule therefor. If the determination in step 862 is negative, i.e., the real-time day is not a holiday, CPU 100 proceeds, in step 866, to address the memory locations corresponding to the set-up load and to the day represented by the DAY field in the SDC register.

Under the advance start modification, the sum of real-time and advance time can be used to activate only the first control event, i.e., that having the earliest event time in a day or holiday for a load, and only if that load has been selected for the advance start modification. In the subsequent steps of the ADVLD subroutine, CPU 100 therefore implements the following set of logic conditions:

if a load has not been selected for the advance start modification, a "0" is stored into a location in the ATABLE register corresponding to that load;
if a load has been seleced for the advance start modification, and:
  if the sum of real-time and advance time is before the event time of the first control event of the real-time day (or holiday); or,
  if real-time is at or after the event time of the last control event of the real-time day (or holiday) and the sum of real-time and advance time is before the event time of the next subsequent control event, e.g., the first control event of the next day (or holiday); or,
  if there is no control event for the load for the real-time day (or holiday) and if the sum of real-time and advance time is before the event time of the next subsequent control event;
  the advance time is stored into a location in the ATABLE register corresponding to the load;
  otherwise, no change is made in the location in the ATABLE register corresponding to the load.

To implement this set of logic conditions, CPU 100 proceeds from either step 864 or step 866 to step 868, wherein CPU 100 determines if the set-up load has been selected for the advance start modification. Specifically, CPU 100 determines if the corresponding switch in the advance start select switch SW1 has been actuated. If the set-up load has not been selected for the advance start modification and the determination in step 868 is negative, CPU 100 proceeds, in step 870, to store a "0" in a location in the ATABLE register corresponding to the set-up load. As an example, AT1=0 (see FIG. 23) when load 1 has not been selected for the advance start modification. From step 870, CPU 100 proceeds to determine, in step 914, if all eight loads have been checked. Assuming that only load 1 has been checked, the determination in step 914 is negative, whereupon CPU 100 proceeds, in step 916, to set up for the next load, and then returns to step 862 whereupon the event memory locations corresponding to the next load (in order of ascending load number) for the real-time day (or holiday) are addressed.

Assuming now that the set-up load has been selected for the advance start modification and the determination in step 868 is affirmative, CPU 100 proceeds, in step 872, to look at location E1 in the addressed event memory locations (reference FIG. 6). It should be noted that the ET/EV words in the event memory are stored in order of increasing event time within each day (or holiday) and load grouping, so that location E1 will always contain the ET/EV word, if any, having the earliest event time. From step 872, CPU 100 proceeds, in step 874, to determine if a valid ET/EV word is contained in the addressed event memory location E1. If there is a first control event for the real-time day (or holiday) and the determination in step 874 is affirmative, CPU 100 proceeds, in step 876, to sum real-time RT (obtained from the SDC register) with advance time AT (stored in an internal register of CPU 100) and to store the resultant sum as RMD in an internal register of CPU 100. In step 878, CPU 100 determines if RMD is greater than or equal to the event time ET of the first control event. As an example, real-time may be 12:30 am, advance time may be three hours, and the event time of the first control event may be 6:00 am. In this example, the sum of real-time and advance time is 3:30 am, which is before the event time of the first control event and the determination in step 878 is negative. Accordingly, the first control event of the day (or holiday) will be activated, at a time subsequent to real-time, under the advance start modification. As a result, CPU 100, in step 880, proceeds to store the advance time AT in a location in the ATABLE register corresponding to the set-up load, (e.g., AT1=AT where the set-up load comprises load 1). From step 880, CPU 100 proceeds to step 914 and thence to the next load if necessary.

If the sum of real-time and advance time is at or after the event time of the first control event of the day (or holiday) and the determination in step 878 is affirmative, CPU 100 next looks, in step 882, at location E8 in the addressed event memory location. From step 882, CPU 100 proceeds, in step 884, to determine if location E8 contains a valid ET/EV word. If the determination in step 884 is negative, CPU 100 proceeds, in step 886, to look at the next location in the addressed event memory locations, e.g., location E7, and then returns to step 884. It will be appreciated that CPU 100 will continue to search through the addressed event memory locations until a valid ET/EV word is found (this ET/EV word may represent the first control event of the day or holiday, but, more typically, represents a control event whose event time is subsequent to that of the first control event. When the determination in step 884 is affirmative, CPU 100 proceeds, in step 890, to set RMD=RT and then proceeds, in step 892, to determine if real-time is at or subsequent to the event time of the control event found in steps 884 and 886. As an example, let it be assumed that real-time is 12:30 am and that the only control event in the addressed event memory locations is the first control event having an event time of 6:00 am. As another example, let it be assumed that there is a last control event in the addressed event memory locations, and that it has an event time of 8:00 pm. In either example, the determination in step 892 is negative, whereupon CPU 100 proceeds directly to step 914 without effecting any change in the location in the ATABLE register corresponding to the set-up load.

Let it now be assumed that real-time is 9:00 pm, and that the last control event in the addressed event memory locations has an event time of 8:00 pm. In this case, the determination in step 892 is affirmative, whereupon CPU 100 proceeds to determine if the sum of real-time and advance time will be before the event time of the next control event for the set-up load in the event memory (e.g, the first control event of the day subsequent to the real-time day).

Specifically, CPU 100 proceeds, in step 894, to call the LAND subroutine (FIG. 24). As described hereinafter, the actions that are taken by CPU 100 in the LAND subroutine cause CPU 100 to look at location E1 in the event memory locations corresponding to the set-up load and to the next day subsequent to the day in the SDC register (or corresponding to the holiday if the next day has been selected as a holiday). From step 894, CPU 100 proceeds, in step 896, to determine if a valid ET/EV word is stored in that event memory location. If there is no first control event, the determination in step 896 is negative, whereupon CPU 100 proceeds, in step 898, to store the advance time AT in the location in the ATABLE register corresponding to the set-up load. When CPU 100 proceeds from step 896 to step 898, the resultant storage of advance time is done for recordkeeping purposes only, inasmuch as there is no control event in the subsequent day to be activated under the advance start modification. If the determination in step 896 is affirmative, CPU 100 then proceeds to again sum real-time with advance time, and then determines, in step 902, if the resultant sum is at or after the event time of the first control event. If the determination in step 902 is affirmative, CPU 100 proceeds directly to step 914 without effecting any change in the corresponding location in the ATABLE register. If the determination in step 902 is negative, the first control event of the next day (or holiday) will be activated under the advance start modification so that CPU 100 proceeds to step 898 and therein stores the advance time AT as previously described.

Let it now be assumed that there is no valid ET/EV word in location E1 in the addressed event memory locations for the real-time day or holiday and that the determination in step 874 is accordingly negative. There still is a possibility, however, that the sum of real-time and advance time may be before the first event of the next day (or holiday). Accordingly, CPU 100, in steps 904, 906, 908, 910 and 912, undertakes actions identical to those previously described with respect to steps 894, 896, 898, 900 and 902. As a result, if the sum of real-time and advance time is before the first event of the next day (or holiday), or, there is no control event for the next day (or holiday), the advance time AT is stored in the location in the ATABLE register corresponding to the set-up load. If the sum of real-time and advance time is at or after the event time of the first control event of the next day (or holiday), no change is made to the corresponding location in the ATABLE register.

Figure 27:
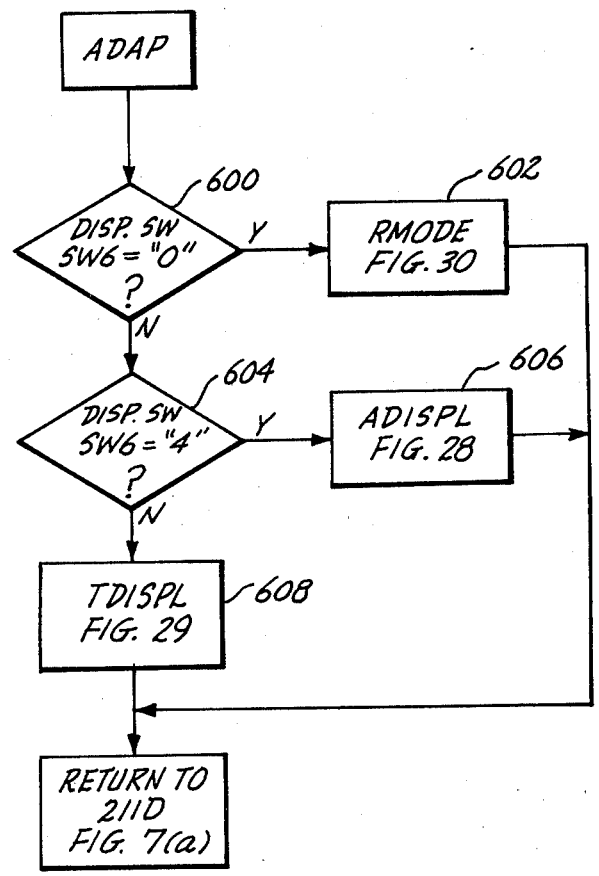
FIG. 27 is a flow chart of the program steps undertaken by the microprocessor in an ADAP routine.

After all eight loads have been checked and the corresponding locations in the ATABLE register have been updated, as described, the determination in step 914 is affirmative, whereupon CPU 100 returns to the RMODE subroutine (FIG. 30). Thereafter, CPU 100, in step 700, clears the CHPTR data byte (in order to condition CPU 100 for a subsequent pass through the RMODE subroutine) and then returns to the ADAP routine (FIG. 27). Since all actions undertaken by CPU 100 in the ADAP routine have been completed, CPU 100 thereafter returns to the main program loop in FIGS. 7(*a*) and 7(*b*). As previously described, the night setback modification is actually implemented in the OUTPUT & STAGE routine (FIG. 20). Likewise, the advance start and duty-cycle shift modifications are actually implemented in the LOAD UPDATE routine and in its various subroutines.

UPDATING OF LOAD OUTPUT STATUS, IN DETAIL, AND IMPLEMENTATION OF ADVANCE START AND DUTY-CYCLE SHIFT MODIFICATIONS

The actions that are taken by CPU 100 in the LOAD UPDATE routine, and in the LAND, SHIFT and UPDATE subroutines called thereby, allow CPU 100 to update the status of each load in accordance with that control event in the event memory for the load (the "active" control event) whose event time immediately precedes real-time or the sum of real-time and advance time (the "active" time). Since the advance start modification is used only to activate the first control event in a day (or holiday), the sum of real-time and advance time is used to update load status only from a time when the sum is equal to the event time of the first control to a time when real-time is equal to the event time of the first control event.

With reference now to FIG. 9(*a*), CPU 100 initially, in step 290, is conditioned or set up for load 1, i.e., is enabled to address those event memory locations corresponding to load 1 (FIG. 6). In step 291, CPU 100 determines if the HOLA field within the SDC register has been set (reference step 282, 284 in the REAL-TIME CLOCK routine in FIG. 8). If the determination in step 291 is affirmative, i.e., the real-tine day has been selected as a holiday, CPU 100 proceeds, in step 294, to address the event memory locations corresponding to the set-up load and to the holiday schedule therefor. If the determination in step 291 is negative, i.e., the real-time day is not a holiday, CPU 100 proceeds, in step 293, to address the event memory locations corresponding to the set-up load and to the day represented by the DAY field in the SDC register.

From either step 292 or step 293, CPU 100 proceeds, in step 294, to clear the EFLG operation flag. As will be apparent from the ensuring discussion, the EFLG operation flag is used to keep track of the specific location in the addressed event memory locations being looked at by CPU 100. Thereafter, in step 295, CPU 100 looks at location E8 in the addressed event memory locations and then, in step 296, determines if a valid ET/EV word is stored therein. As previously discussed, the control events are stored within each day (or holiday) group in order of increasing event times. Accordingly, if the day (or holiday) group contains eight control events, the last control event therefore will be stored in location E8. If there are less than eight control events in the day (or holiday) group, the determination in step 296 is negative, whereupon CPU 100 proceeds directly to step 300 and determines if all locations in the day (or holiday) group have been looked at. Under the circumstance just discussed, the determination in step 300 is negative, whereupon CPU 100 proceeds, in step 301, to look at the next location in the addressed event memory locations, e.g., location E7 in the day (or holiday) group. The process of searching through the event memory locations in the day (or holiday) group continues until a valid ET/EV word is found and the determination in step 296 in affirmative. As a result, CPU 100, in step 297, increments the EFLG operation flag by 1, and, in step 298, sets RMD=RT.

In step 299, CPU 100 determines if real-time is at or after the event time of the control event currently being looked at. Upon the initial pass of CPU 100 through step 299, that control event will be the last control event of the day (or holiday). If real-time is at or after that event time and the determination in step 299 is affirmative, CPU 100 next determines, in step 302, if the EFLG operation flag is set to "1". Under the circumstance just discussed, the determination in step 302 is affirmative, whereupon CPU 100 must determine if real-time (or the sum of real-time and advance time) is at or after the next subsequent event time in the event memory, and proceeds, in step 303, to the LAND subroutine in FIG. 24. If real-time is before the last event of the day (or holiday), the determination in step 299 is negative, so that CPU 100 proceeds as previously described to look at the next-earlier control event in the day (or holiday) group. If a control event is found in the day (or holiday) group whose event time precedes real-time, the determination in step 299 is affirmative. In this situation, the determination in step 302 will be negative, since the control event does not represent the last control event of the day (or holiday). Accordingly, the control event that has been found is the active control event and real-time is the active time, so that CPU 100 proceeds directly to the UPDATE subroutine in FIG. 26(a) and thereafter as described hereinafter.

Let it now be assumed that real-time is at or after the event time of the last control event of the day (or holiday), and that CPU 100 has proceeded, in step 303, to the LAND subroutine. With reference now to FIG. 24, CPU 100 initially sets the LFLG operation flag, in step 559. As will be apparent from the ensuing discussion, the setting of the LFLG operation flag is used by CPU 100 to indicate that the LAND subroutine has been called. Thereafter, in step 560, CPU 100 determines if the HOLYB bit (in HOLY) corresponding to the set-up load has been set for the day subsequent to the day in the SDC register. If the determination in step 560 is affirmative, i.e., the next day has been selected as a holiday, CPU 100 proceeds, in step 561, to address the event memory locations correspondiong to the set-up load and to the holiday schedule therefor. If the determination in step 560 is negative, i.e., the next day is not a holiday, CPU 100 proceeds, in step 562, to address the event memory locations corresponding to the set-up load and to the day subsequent to the real-time day (that in the DAY field in the SDC register). From either step 561 or step 562, CPU 100 proceeds, in step 563, to look at location E1 in the addressed event memory locations, e.g., that which will contain the ET/EV word for the first control event of the next day (or holiday), and then returns to the LOAD UPDATE routine and specifically to step 304 therein (FIG. 9(b)). In step 304, CPU 100 determines if a valid ET/EV word is stored in location E1. If the determination in step 304 is negative, e.g., there are no valid control events for the next day (or holiday), then the last event of the real-time day is the active control event and real-time is the active time so that CPU 100 proceeds directly to the UPDATE routine in FIG. 26(a). If the determination in step 304 is affirmative, e.g., there is a first control event for the next day (or holiday), CPU 100 proceeds, in step 305, to the SHIFT subroutine.

Figure 25:
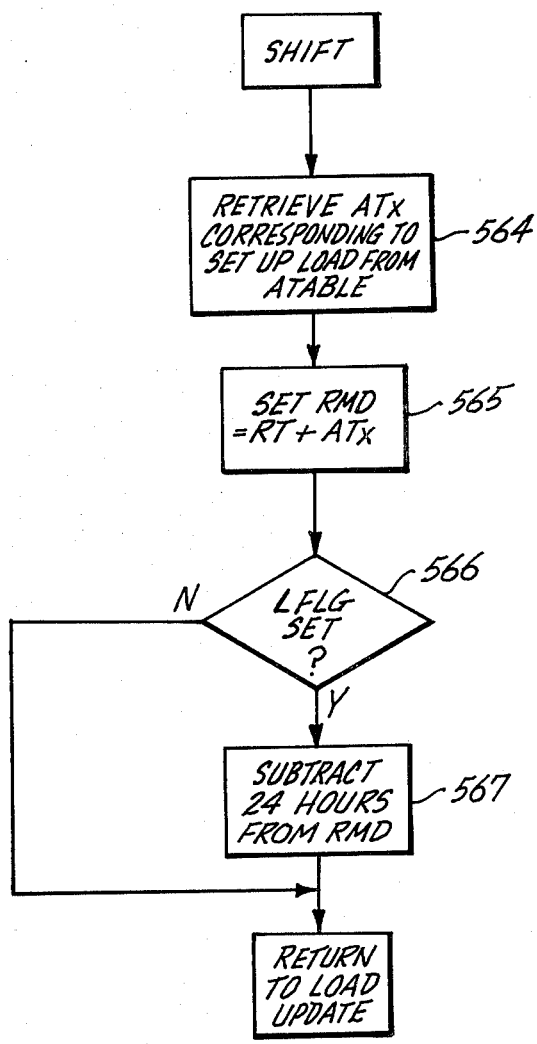
FIG. 25 is a flow chart of the program steps undertaken by the microprocessor in a SHIFT routine.

With reference now to FIG. 25, CPU 100, in step 564, retrieves advance time from the field ATx in the ATABLE register corresponding to the set-up load x (e.g., retrieves AT1 where the set-up comprises load 1). Thereafter, in step 565, CPU 100 sums real-time with the advance time thus retrieved, i.e., sets RMD=RT+ATx. In step 566, CPU 100 determines if the LFLG operation flag has been set (see step 559 in the LAND subroutine). At this point, it should be noted that the event times contained within each event memory location are stated in terms of time from the beginning of each day (or holiday). If the LFLG operation flag has been set, the sum computed in step 565 is necessarily greater than 24 hours, so that CPU 100 proceeds, in step 567, to subtract 24 hours from RMD in order to relate the sum to the same starting time period (i.e., the beginning of the next day or holiday) to which the event time for the next day (or holiday) is also referenced. From step 567, or from step 566 if the determination therein is negative, CPU 100 returns to the LOAD UPDATE routine, and specifically to step 306 therein. At this point, a determination is made if the sum of real-time and advance time is at or after the event time of the first control event of the next day (or holiday). If the determination in step 306 is affirmative, the first control event for the next day (or holiday) is the active control event and the sum of real-time and advance time is the active time, so that CPU 100 proceeds to the UPDATE subroutine. If the determination in step 306 is negative, the last control event of the real-time day (or holiday) is the active control event, whereupon CPU 100, in step 307, sets RMD=RT and then proceeds to the UPDATE subroutine.

Let it now be assumed that CPU 100, while preceeding through steps 295-301, has been unable to find any control event for the real-time day (or holiday) in the addressed event memory locations corresponding to the set-up load whose event time is at or prior to real-time, that CPU 100 is currently looking at location E1 in the addressed event memory locations, and that the determination in step 300 is affirmative. As a result, CPU 100, in step 308, determines if a valid ET/EV word is stored in location E1, i.e., is there a first control event for the real-time day (or holiday). If the determination in step 308 is affirmative, there is a possibility that the sum of real-time and advance time may activate the first control event of the real-time day (or holiday), so that CPU 100, in step 311 proceeds to call the SHIFT subroutine, wherein CPU 100 computes the advanced real-time by setting RMD=RT+ATx, wherein ATx comprises the advance time information stored in the corresponding field of the ATABLE register. In this situation, the determination in step 566 (FIG. 25) is negative, since the schedule for the next day (or holiday) is not being looked at and the LAND subroutine has not been called. From step 311, CPU 100 proceeds, in step 312, to determine if the sum of real-time and advance time is at or subsequent to the event time of the first control event of the real-time day (or holiday). If the determination in step 312 is affirmative, the first control event of the real-time day (or holiday) is the active control event and the sum of real-time and advance time is the active time so that CPU 100 proceeds directly to the UPDATE subroutine. If the determination in step 312 is negative, the first control event of the day is not an active control event, whereupon CPU 100, in step 313, sets RMD=RT.

If the determination in step 308 is negative, i.e., there is no first control event for the real-time day (or holiday), CPU 100 proceeds, in step 309, to call the LAND subroutine, whereupon CPU 100 looks at location E1 in the event memory locations for the next day (or holiday) corresponding to the set-up load. Thereafter, in step 310, CPU 100 determines if a valid ET/EV word is stored in location E1 for the next day (or holiday). If the determination in step 310 is affirmative, i.e., there is a first control event for the next day (or holiday), CPU 100 proceeds, in steps 311 and 312, to determine if the sum of real-time and advance time will activate that first control event by respectively calling the SHIFT subroutine, in step 311, and determining, in step 312, if the sum computed in step 311 is at or after the event time of the first control event of the next day (or holiday). If the determination in step 312 is affirmative, then CPU 100 proceeds directly to the UPDATE subroutine. If the determination in step 312 is negative, CPU 100 proceeds, in step 313, to set RMD=RT.

If the determination in step 310 or that in step 312 is negative, it necessarily follows that no control event has been found in the event memory locations corresponding to the set-up load for the real-time day (or holiday) and for the next day (or holiday) that will be activated by real-time or by the sum of real-time and advance time. Accordingly, CPU 100 proceeds, in step 314, to address and search all other event memory locations corresponding to the set-up load for the last valid ET/EV word whose event time occurs before real-time. Accordingly, CPU 100 searches backwards through the week, starting from the day immediately preceding the real-time day. In step 315, CPU 100 determines if the search in step 314 was successful. If the determination in step 315 is affirmative, CPU 100 proceeds directly to the UPDATE subroutine, using the thus-found control event as the active control event and real-time as the active time. If the determination in step 315 is negative, e.g., there are no control events entered into the event memory for the set-up load, CPU 100 jumps to a portion of the UPDATE subroutine through UPDATE1 (FIG. 26(b)).

Figure 26A:
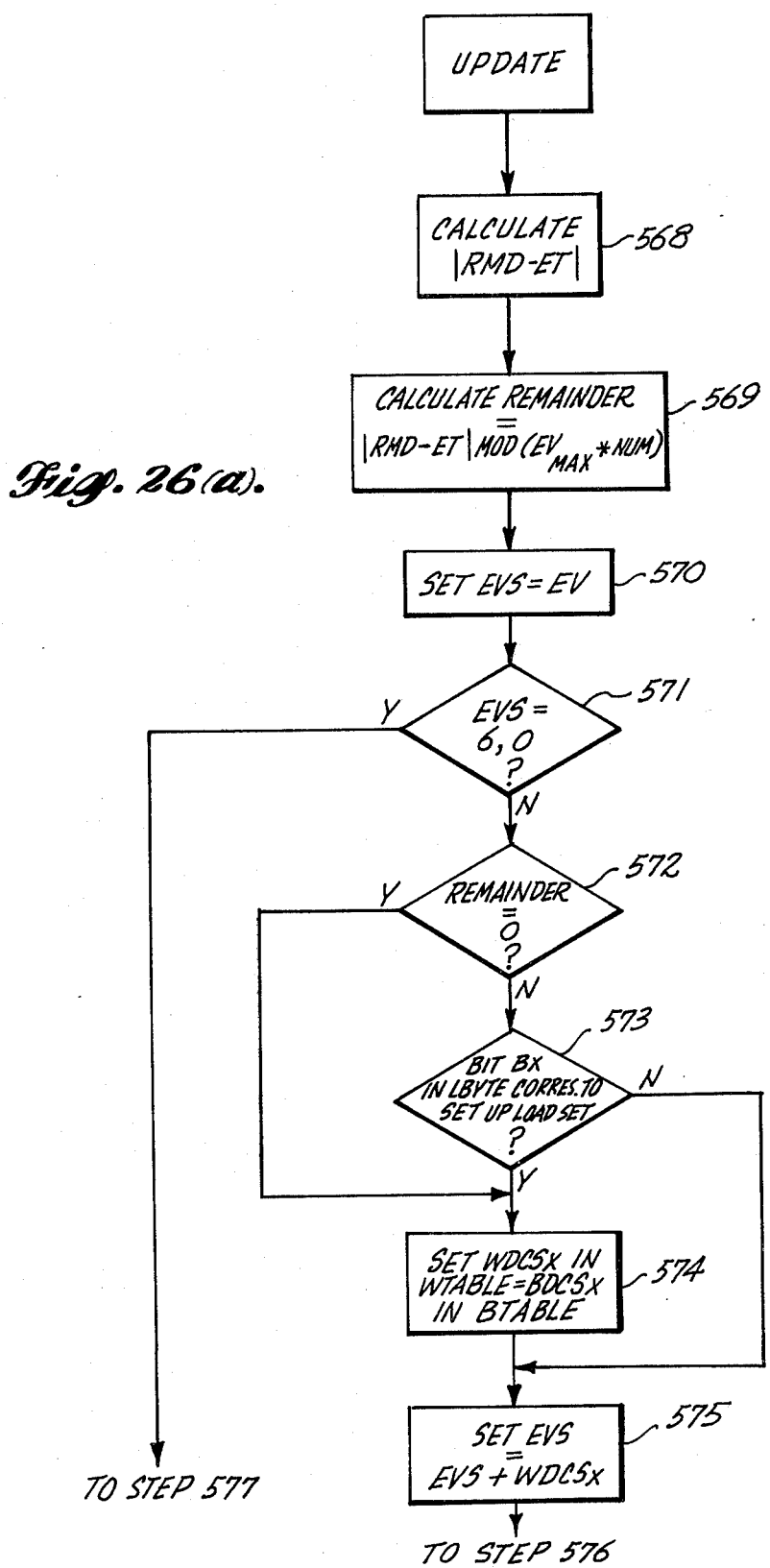
FIGS. 26(a) and 26(b) are a flow chart of the program steps undertaken by the microprocessor in an UPDATE subroutine.
Figure 26B:
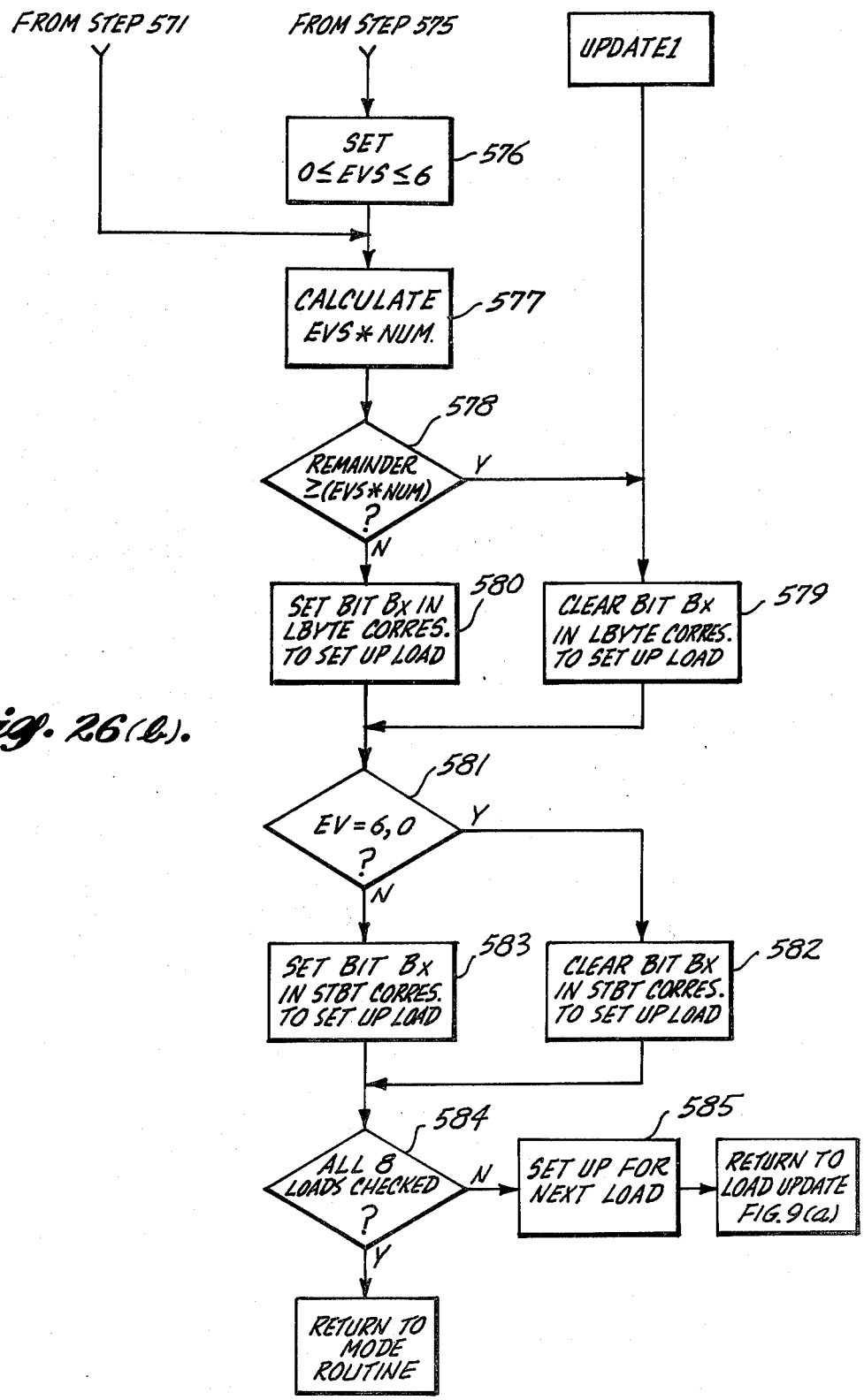

While proceeding through the UPDATE subroutine in FIGS. 26(a) and 26(b), CPU 100 applies the mathematical relationship for load control previously discussed, and utilizes the ET/EV word for the active control event that has been found in the LOAD UPDATE routine, the active time as determined therein (and stored in RMD), and duty-cycle shift data from the BTABLE register.

Specifically, CPU 100, in step 568, calculates |RMD-ET|, and, in step 569, calculates $$\text{Remainder} = |\text{RMD-ET}| \text{MOD}(EV_{max} * NUM)$$

In step 570, CPU 100 transfers the EV of the control event that has been found to an internal register of CPU 100 by setting EVS=EV.

Thereafter, in step 571, CPU 100 determines if EVS=6, 0. If the determination in step 571 is negative, i.e., the active control event represents a duty-cycle control function, CPU 100 proceeds to determine if the duty-cycle shift modification should be made. Specifically, CPU 100, in step 572, determines if Remainder=0. If the determination in step 572 is affirmative, the active time is necessarily at the beginning of a control interval and the load is necessarily being turned on. If the determination in step 572 is negative, the active time is within a control interval and CPU 100 proceeds, in step 573, to determine if the bit Bx in LBYTE corresponding to the set-up load (i.e., load x) has been set. If the determination in step 572 or that in step 573 is affirmative, the set-up load is either just being turned on or is already on during a control interval, whereupon CPU 100 proceeds, in step 574, to transfer the duty-cycle shift DCS BDCSx field in the BTABLE register to the corresponding WDCSx field in the WTABLE register. If the determinations in steps 572 and 573 are both negative, it necessarily follows that the set-up load is being maintained off within a control interval. Since it is desirable that no change in load status be made during a time when a duty-cycle controlled load is off, no change is made to the WTABLE register.

From either step 574, or from step 573 if the determination therein is negative, CPU 100 proceeds, in step 575, to set EVS=EVS+WDCSx. As a result, EVS now has stored therein a number representing the duty-cycle of the active control function, plus any duty-cycle shift therefor. As an example, if EV=4, and WDCSx=1, EVS (after step 575)=5. From step 575, CPU 100 proceeds, in step 576, to limit that value of EVS obtained during step 575 to no greater than 6 and to no less than 0, e.g., the limits for EV previously discussed.

From step 576, or from step 571 if the determination therein is affirmative, CPU 100 proceeds, in step 577, to calculate EVS*NUM. From step 577, CPU 100 proceeds, in step 578, to implement the aforementioned mathematical relationship by determining if Remainder≧(EVS*NUM). From the initial discussion of the mathematical relationship used for load control, it will be appreciated that if the determination in step 578 is affirmative, the set-up load is to be off. If the determination in step 578 is negative, the set-up load is to be on.

If the determination in step 578 is affirmative, CPU 100 proceeds, in step 579, to clear the bit Bx in LBYTE corresponding to the set-up load. If the determination in step 578 is negative, CPU 100 proceeds, in step 580, to set the bit Bx in LBYTE corresponding to the set-up load.

As previously discussed in conjunction with the LOAD UPDATE routine, there may be no control events entered into the event memory for the set-up load. In this case, the determination in step 315 (FIG. 9(b)) is negative, whereupon CPU 100 enters the UPDATE subroutine through UPDATE1 and proceeds in step 579 to clear the corresponding bit in LBYTE. Accordingly, if there are no control events for the set-up load, the load is maintained off.

From either step 579 or step 580, CPU 100 proceeds, in step 581, to determine if EV=6, 0, i.e., does the active control event represent a duty-cycle control function. If should be noted that the determination in step 581 does not take into account any duty-cycle shift that may have been implemented (through EVS). If the determination in step 581 is affirmative, i.e., the active control event does not represent a duty-cycle control function, CPU 100 proceeds, in step 582, to clear the bit Bx in STBT corresponding to the set-up load. If the determination in step 581 is negative, i.e., the active control event represents a duty-cycle control function, CPU 100 proceeds, in step 583, to set the bit Bx in STBT corresponding to the set-up load.

From either step 582 or step 583, CPU 100 proceeds, in step 584, to determine if all eight loads have been checked. If the determination in step 584 is negative, CPU 100 proceeds, in step 585, to set up for the next load, and then returns to the beginning of the LOAD UPDATE routine and proceeds therethrough identically as described for the next load. When all eight loads have been checked, the determination in step 584 is affirmative, whereupon CPU 100 returns to the mode routine.

As previously described in conjunction with the OUTPUT & STAGE routine (FIG. 20), the load statuses contained in the LBYTE and STBT data bytes are used to effect control of the energization states of the loads by the microprocessor.

While the invention has been described with reference to a preferred embodiment thereof, it should be clear that the invention is not limited thereto and that the scope of the invention is to be determined only in accordance with the appended claims.

The embodiments of the invention in which an exclusive property or privilege is claimed are defined as follows:

1. An electronic controller for controlling the energization states of a plurality of electrical loads, said controller comprising:
   a plurality of load control circuits, each said load control circuit being adapted to be interconnected with a load, and having a load-on state when its load is to be on, and a load-off state when its load is to be off;
   clock means for determining real-time;
   sensor means for sensing at least one environmental temperature at a facility at which the plurality of electrical loads are located;
   event memory means storing a time schedule for real-time control of the plurality of electrical loads;
   program memory means storing a set of program instructions; and,
   program means responsive to said set of stored program instructions for:
      obtaining said time schedule from said event memory means;
      obtaining a sensed environmental temperature from said sensor means;
      modifying said time schedule in accordance with said sensed environmental temperature;
      obtaining real-time from said clock means; and,
      placing said load control circuit for each load in said load-on and said load-off states by comparing said real-time with said modified time schedule.

2. A controller as recited in claim 1, wherein said event memory means includes a plurality of event memory locations having stored therein one or more control events and corresponding event times for each load, each said control event representing a period of time during each predetermined control interval subsequent to its corresponding event time that a load is to be on, said control events further representing an on control function in which a load is to be on for the entirety of each control interval, an off control function in which a load is to be off for the entirety of each control interval, and, a duty-cycle control function in which a load is to be on for a predetermined portion of each control interval.

3. A controller as recited in claim 2, wherein said processing means is operative to modify at least one event time associated with a load in accordance with said sensed environmental temperature.

4. A controller as recited in claim 3, wherein said sensor means is adapted to sense outdoor temperature at the facility; and, wherein said processing means is operative to implement an advance start modification of said time schedule by advancing said at least one event time in relation to the deviation of said sensed outdoor temperature from a predetermined reference temperature.

5. A controller as recited in claim 4, further comprising means for selecting any load of the plurality of electrical loads for said advance start modification; and, wherein said processing means is operative to implement said advance start modification only for those loads that have been selected therefor.

6. A controller as recited in claim 5, wherein said means for selecting comprises a manually-actuable switch for each load; and, wherein said processing means is operative to interrogate each said manually-actuable switch to determine those loads that have been selected for said advance start modification.

7. A controller as recited in claim 4, wherein said processing means is operative to determine an advance time, which represents the amount of time by which said at least one event time is advanced under said advance start modification, as a linear function of the deviation of said sensed outdoor temperature from said reference temperature.

8. A controller as recited in claim 7, wherein said processing means is operative to determine said advance time only if said deviation is equal to or greater than a predetermined deadband.

9. A controller as recited in claim 8, wherein said processing means is operative to determine said advance time as a first linear function of said deviation when said sensed temperature is above said deadband, and to determine said advance time as a second linear function of said deviation when said sensed temperature is below said deadband.

10. A controller as recited in claim 9, further comprising means for selecting a first advance gain and means for selecting a second advance gain; and, wherein said processing means is operative to obtain said first and said second advance gains from said selecting means therefor, to vary the slope of said first linear function in proportion to said first advance gain, and to vary the slope of said second linear function in proportion to said second advance gain.

11. A controller as recited in claim 10, wherein said first and said second linear functions each comprise the relationship $$AT = \frac{|TOD - TRFAS| * (G + C)}{K}$$

if $|TOD-TRFAS| \geq$ Deadband where:
   AT = said advance time

TOD = said sensed outdoor temperature

TRFAS = said reference temperature

|TOD-TRFAS| = the absolute value of said deviation

G = said first advance gain, for said first linear function, and said second advance gain, for said second linear function C = a first contant K = a second constant.

12. A controller as recited in claim 7, further comprising storage means, said storage means having a plurality of storage locations, each said storage location being associated with one of the plurality of electrical loads; and, wherein:

said real-time in said clock means represents elapsed time from the beginning of a week;

said event memory locations in said event memory means are grouped by load, and, within each said load group, by day;

said processing means is operative to: sum said real-time with said advance time; address and search each load group in said event memory locations; store said advance time in the corresponding storage location in said storage means only if said sum is before the event time of the first control event in a day group corresponding to the day represented by said real-time, or, said real-time is at or after the event time of the last control event in said day group and said sum is before the event time of the next-subsequent control event in said load group, or, there is no control event in said day group and said sum is before the event time of said next-subsequent control event.

13. A controller as recited in claim 12, wherein said processing means is operative:

to address and search said day group to find a control event whose event time is at or immediately precedes said real-time;

if a control event is found whose event time is at or immediately precedes said real time, to determine if the thus-found control event is the last control event for the day represented by said real-time;

if the thus-found control event is not the last control event, to select said real-time as an active time and to select the thus-found control event as an active control event;

if the thus-found control event is the last control event, to address and search said load group to find the next-subsequent control event therein;

if a sum of said real-time and the advance time in the corresponding storage location in said storage means is at or after the event time of the next-subsequent control event, to select said sum of real-time and advance time from the corresponding storage location of said storage means as said active time and to select said next-subsequent control event as said active control event;

If said sum of real-time and the advance time in the corresponding storage location of said storage means is before the event time of said next-subsequent control event, to select said real-time as said active time and to select said last control event as said active control event;

if a control event is not found whose event time is at or immediately precedes said real-time, to address and search said day group to find a first control event therein;

if a first control event is found is said day group, to determine if said sum of real-time and the advance time from the corresponding storage location of said storage means is at or after the event time of said first control event;

if said sum is at or after the event time of said first control event, to select said sum as said active time and to select said first control event as said active control event;

if said sum is before the event time of said first control event, to address and search backward through the day groups in said load group to find a control event whose event time immediately precedes said real-time, and to select said real-time as said active time and to select said immediately preceding control event as said active control event;

if no control event is found in said day group, to address and search forward in said load group to find the next-subsequent control event therein;

if said sum of real-time and the advance time in the corresponding storage location of said storage means is at or after the event time of said next-subsequent control event, to select said sum as said active time and to select said next-subsequent control event as said active control event;

if said sum is before the event time of said next-subsequent control event, to address and search backward through the day groups in said load group to find a control event whose event time immediately precedes said real-time, and to select said real-time as said active time and to select said immediately-preceding control event as said active control event; and, to determine said load-on and said load-off states for said load control circuit associated with each said load by comparing said active time with said active control event.

14. A controller as recited in claims 12 or 13, further comprising means for flagging any day of a week as a holiday; wherein said event memory locations in said event memory means include a holiday group within each said load group; and, wherein said processing means is operative to address and search said holiday group in each said load group when the day represented by said real-time and the day represented by said sum of real-time and the advance time in the corresponding field of said register means corresponds to the day flagged as a holiday.

15. A controller as recited in claim 12, further comprising means for de-selecting any load of a plurality of electrical loads for said advance start modification; and, wherein said processing means is operative to store a zero in those storage locations of said storage means corresponding to the loads that have been de-selecting for said advance start modification.

16. A controller as recited in claim 2, wherein said processing means is operative to modify at least one control event associated with a load in accordance with said sensed environmental temperature.

17. A controller as recited in claim 16, wherein said sensor means is adapted to sense indoor temperature at the facility; and, wherein said processing means is operative to implement a duty-cycle shift modification of said time schedule by increasing the predetermined portion of each control interval during which a load is on in relation to the deviation of said sensed indoor temperature from a reference temperature, but only when the load is currently being controlled in real-time in accordance with a duty-cycle control function.

18. A controller as recited in claim 17, wherein said sensor means includes a plurality of sensors respectively adapted to sense indoor temperature in a plurality of zones at the facility; and, wherein said processing means is operative to group the plurality of electrical loads by said plurality of zones, and to implement said duty-cycle shift modification for those loads in each said zone in accordance with the corresponding sensed indoor temperature for that zone.

19. A controller as recited in claim 17, further comprising means for selecting any load of the plurality of electrical loads for said duty-cycle shift modification; and, wherein said processing means is operative to implement said duty-cycle shift modification only for those loads that have been selected therefor.

20. A controller as recited in claim 19, wherein said means for selecting comprises a manually-actuable switch for each load; and, wherein said processing means is operative to interrogate each said manually-actuable switch to determine those loads that have been selected for said duty-cycle shift modification.

21. A controller as recited in claim 17, wherein each said control interval is divided into a plurality of equal subintervals; wherein each said control event stored in said event memory locations in said event memory means comprises an integral control event number representing the number of said subintervals during each control interval that a load is to be on; wherein said processing means is operative to determine a duty-cycle shift number as a function of the deviation of said sensed indoor temperature from said reference temperature, and to implement said duty-cycle shift modification for a load by determining if the load is currently being controlled in accordance with a duty-cycle control function, and, if so, by modifying said control event number through summing of said control event number with said duty-cycle shift number, and by placing said load control circuit for each load currently being controlled in accordance with a duty-cycle control function into said load-on state for the predetermined portion of each control interval represented by said modified control event number.

22. A controller as recited in claim 21, wherein said processing means is operative to modify said control event number only if said deviation is equal to or greater than a predetermined deadband.

23. A controller as recited in claim 22, further comprising means for selectively adjusting said predetermined deadband.

24. A controller as recited in claim 21, wherein said processing means is operative to modify said control event number for a load only when the load is on.

25. A controller as recited in claim 21, further comprising means for selecting any load of the plurality of electrical loads for said duty-cycle shift modification; and, wherein said processing means is operative to modify said control event number only for those loads that have been selected for said duty-cycle shift modification.

26. A controller as recited in claim 16, wherein said sensor means is adapted to sense indoor temperature at the facility; and, wherein said processing means is operative to implement a night setback modification of said time schedule by determining an on state for a load whenever said sensed indoor temperature is outside predetermined primary high and low limits, by placing said load control circuit for the load in said load-on state upon occurrence of said on state, and by placing said load control circuit for the load in said load-on and said load-off states in accordance with said time schedule upon occurrence of said off state.

27. A controller as recited in claim 26, wherein said sensor means is includes a plurality of sensors respectively adapted to sense indoor temperatures in a plurality of zones at the facility; and, wherein said processing means is operative to group the plurality of electrical loads by said plurality of zones, and to implement said night setback modification for those loads in each said zone in accordance with the corresponding sensed indoor temperature for that zone.

28. A controller as recited in claim 26, wherein said processing means is operative:
to determine said on state if said indoor temperature is outside said primary limits and if said off state has persisted for a predetermined interval; and,
to determine said off state if said sensed indoor temperature is inside said primary limits, if said on state has persisted for a predetermined interval, and if said sensed indoor temperature is inside secondary high and low limits.

29. A controller as recited in claim 28, further comprising a minimum on timer and a minimum off timer, each said timer being controlled by said processing means to run for said predetermined interval when started by said processing means; and,
wherein said processing means is operative to start said minimum on timer when said sensed indoor temperature is outside said primary limits and said minimum off timer is not running, and to start said minimum off timer when said sensed indoor temperature is inside said primary and said secondary limits and said minimum on timer is not running.

30. A controller as recited in claim 28, further comprising means for selecting any load of the plurality of electrical loads for said night setback modification; and, wherein said processing means is operative to determine said on states and said off states only for those loads that have been selected for said night setback modification.

31. A controller as recited in claim 26, further comprising means for selecting any load of the plurality of electrical loads for said night setback modification; and, wherein said processing means is operative to implement said night setback modification only for those loads that have been selected therefor.

32. A controller as recited in claim 31, wherein said means for selecting comprises a manually-actuable switch for each load; and, wherein said processing means is operative to interrogate each said manually-actuable switch to determine those loads that have been selected for said night setback modification.

33. A controller as recited in claim 2, wherein said sensor means is adapted to sense outdoor temperature and indoor temperature at the facility; and, wherein said processing means is operative:
to implement an advance start modification of said time schedule by advancing at least one event time associated with a load in relation to the deviation of said sensed outdoor temperature from a first reference temperature;
to implement a duty-cycle shift modification of said time schedule by increasing the predetermined portion of each control interval during which a load is on in relation to the deviation of said sensed indoor temperature from a second reference temperature, but only if the load is currently being controlled in real-time in accordance with a duty-cycle control function; and, to implement a night setback modification of said time schedule by determining an on state for a load whenever said sensed indoor temperature is outside predetermined primary high and low limits, by placing said load control circuit for the load in said load-on state upon occurrence of said on state, and by placing said load control circuit for the load in said load-on and said load-off states in accordance with said time schedule upon occurrence of said off-state.

34. A controller as recited in claim 33, further comprising display means for displaying data related to the operation of said controller.

35. A controller as recited in claim 34, further comprising display selection means for enabling the display of one selected type of data of a plurality of predetermined types of data, said plurality of predetermined types of data comprising: data related to said real-time control; the amount by which the event time of a control event is advanced under said advance start modification; said sensed indoor temperature; and said sensed outdoor temperature; and, wherein said processing means is responsive to said display selection means to transfer the type of data selected thereby to said display means.

36. A controller as recited in claim 35, wherein said display selection means comprises a manually-actuable switch having a plurality of positions each designating one of said plurality of predetermined types of data; and, wherein said processing means is operative to interrogate said manually-actuable switch to determine the position thereof and to transfer the type of data corresponding to the thus-determined position to said display means.

37. An apparatus that permits an electronic controller, adapted to provide real-time control of the energization states of a plurality of electrical loads in accordance with a time schedule, to also provide environmentally-adaptive modifications of the time schedule in accordance with temperature at a facility at which the loads are located, the controller including: clock means determining real-time; an event memory storing the time schedule in the form of one or more control events and corresponding event times for each load, each control event representing a period of time during each predetermined control interval subsequent to its corresponding event time that a load is to be on; a program memory storing a set of program instructions for real-time control; and, a processing means for executing the set of program instructions to effect real-time control by comparing real-time from the clock means with the time schedule in the event memory, and by accordingly determining an on state or an off state for each load, and by energizing those loads in an on state and by de-energizing those loads in an off state, said apparatus comprising:

a second program memory storing a set of program instructions for said environmentally-adaptive modifications to real-time control;

means for developing a first analog signal representing an indoor temperature at the facility and a second analog signal representing outdoor temperature at the facility;

digital-to-analog signal conversion means for converting a first digital input signal into a corresponding analog signal;

a comprator for comparing either said first analog signal or said second analog signal with said analog signal from said digital-to-analog signal conversion means to provide a first digital output signal representative of the difference therebetween;

selecting means for selectively supplying either said first analog signal or said second analog signal to said comparator in response to a second digital input signal;

means for transferring said first digital input signal from said processing means to said digital-to-analog signal conversion means;

means for transferring said second digital input signal from said processing means to said selecting means;

means for transferring said first digital output signal to said processing means;

said processing means being operative to execute said set of program instructions stored in said second program memory along with the set of program instructions stored in the program memory to effect said environmentally-adaptive modifications by:

effecting analog-to-digital conversion of said indoor temperature and said outdoor temperature through the selective supplying of said first digital input signal to said digital-to-analog signal conversion means, the selective supplying of said second digital input signal to said selecting means, and the selective monitoring of said first digital output signal from said comparator;

implementing an advance start modification through advancing at least one event time for a load, in relation to the deviation of said outdoor temperature from a first reference temperature;

implementing a duty-cycle shift modification through increasing the time that a load is in said on state during each control interval in relation to the deviation of said indoor temperature from a second reference temperature; and implementing a night setback modification through determining an on state for a load whenever said indoor temperature exceeds predetermined high and low limits thereof.

38. An apparatus as recited in claim 37, wherein said means for developing said first and said second analog signals and said selecting means include:

a first temperature sensor for sensing said indoor temperature;

a second temperature sensor for sensing said outdoor temperature;

a first calibration potentiometer;

a second calibration potentiometer; and a first multiplexing means responsive to said second digital input signal for interconnecting said first temperature sensor and said first calibration potentiometer in a bridge circuit to develop said first analog signal, and for interconnecting said second temperature sensor and said second calibration potentiometer in a bridge circuit to develop said second analog signal.

39. An apparatus as recited in claim 37, further comprising:

a source of a third analog signal representing a selected heat advance gain;

a source of a fourth analog signal representing a selected cool advance gain; and, wherein said means for selectively supplying is adapted to selectively supply either said first, second, third or fourth analog signals to said comparator; and said processing means is operative to obtain said heat advance gain and said cool advance gain by analog-to-digital conversion of said third and fourth analog signals, to vary the amount of time that an event time is advanced in relation to said cool advance gain when said outdoor temperature exceeds said first reference temperature, and in relation to said heat advance gain when said outdoor temperature is less than said first reference temperature.

40. An apparatus as recited in claim 39, wherein said processing means is operative to implement said advance start modification only if said deviation of said outdoor temperature from said first reference temperature is greater than a first deadband.

41. An apparatus as recited in claims 39 or 40, wherein said processing means is operative to implement said duty-cycle shift modification only if said deviation of said indoor temperature from said second reference is greater than a second deadband.

42. An apparatus as recited in claim 41, further comprising a deadband select switch whose position represents a selected predetermined value of said second deadband; means coupling said deadband select switch with said processing means; and, wherein said processing means is operative to interrogate said deadband select switch and to accordingly select a predetermined value of said second deadband in accordance with the position thereof.

43. An apparatus as recited in claim 37, further comprising a plurality of advance start select switches, each said advance start select switch having first and second positions representing, respectively, the selection and de-selection of an associated load for said advance start modification; means coupling said plurality of advance start select switches to said processing means; and, wherein said processing means is operative to interrogate said plurality of advance start select switches and to implement said advance start modification only for those loads whose associated advance start select switch is in said first position.

44. An apparatus as recited in claim 37, further comprising a plurality of duty-cycle shift select switches, each said duty-cycle shift select switch having said first and second positions representing, respectively, the selection and de-selection of an associated load for said duty-cycle shift modification; means coupling said plurality of duty-cycle shift select switches to said processing means; and, wherein said processing means is operative to interrogate said plurality of duty-cycle shift select switches and to implement said duty-cycle shift modification only for those loads whose associated duty-cycle select switch is in said first position.

45. An apparatus as recited in claim 37, further comprising a plurality of night setback select switches, each said night setback select switch having first and second positions representing, respectively, the selection and de-selection of an associated load for said night setback modification; means coupling said plurality of night setback select switches to said processing means; and, wherein said processing means is operative to interrogate said plurality of night setback select switches and to implement said night setback modification only for those loads whose associated night setback select switch is in said first position.

46. An apparatus as recited in claim 37, for use with a controller that further includes display means and in which said processing means is operative to store data related to real-time control, and to transfer said data related to real-time control to said display means for display thereby, said apparatus further comprising: a display select switch having a plurality of positions representing respectively, a desired display of: said data related to real-time control; said indoor temperature; said outdoor temperature; and, the amount of time that said event times are advanced under said advance start modification; means coupling said display select switch with said processing means; and, wherein said processing means is operative to interrogate said display select switch and to transfer the data corresponding to the position thereof to said display means for display thereby.

* * * * *

UNITED STATES PATENT AND TRADEMARK OFFICE
CERTIFICATE OF CORRECTION

PATENT NO. : 4,354,241

DATED : October 12, 1982

INVENTOR(S) : Lawrence J. Barello

It is certified that error appears in the above—identified patent and that said Letters Patent is hereby corrected as shown below:

| | |
|---|---|
| Column 4, | line 23: "is" should read --in-- |
| Column 6, | line 2: "1of" should read --of-- |
| | lines 7 & 8: "modification" should read --modifications-- |
| Column 7, | line 25: "controlmay" should read --control may-- |
| | line 45: delete "30" |
| Column 8, | line 13: "vent" should read --event-- |
| Column 11, | line 46: after "104" insert --,-- |
| | line 52: "realtime" should read --real-time-- |
| Column 12, | line 61: "permits" should read --permit-- |
| Column 15, | line 11: "left hand" should read --left-hand-- |
| | line 13: "right hand" should read --right-hand-- |
| Column 16, | line 45: "controlled" should read --controller-- |
| | line 46: "voltae" should read --voltage-- |
| Column 18, | line 23: "MICROPROCESOR" should read --MICROPROCESSOR-- |
| | line 23: "VENT" should read --EVENT-- |
| | line 34: "1" should read --2-- |
| | line 36: "Mon," should read --MON,-- |
| Column 20, | line 16: "determinaton" should read --determination-- |
| | line 33: "microprocesor" should read --microprocessor-- |
| | line 49: "whereuon" should read --whereupon-- |
| Column 22, | line 33: "CPU 10" should read --CPU 100-- |
| Column 23, | line 63: "ets" should read --sets-- |
| Column 24, | line 16: "ot" should read --to-- |
| Column 27, | line 18: "procedes" should read --precedes-- |
| Column 28, | line 58: "equals" should read --equal-- |
| | line 63: after "affirmative" insert --,-- |
| Column 33, | line 64: "have" should read --has-- |
| Column 35, | line 2 of Table VI: after "4" insert --,-- |
| Column 36, | line 23: "The" should read --the-- |
| | line 42: after "position" insert --,-- |

UNITED STATES PATENT AND TRADEMARK OFFICE
CERTIFICATE OF CORRECTION

PATENT NO. : 4,354,241  
DATED : October 12, 1982  
INVENTOR(S) : Lawrence J. Barello It is certified that error appears in the above—identified patent and that said Letters Patent is hereby corrected as shown below:

| | |
|---|---|
| Column 37, | line 37: "Prom" should read --PROM-- |
| | line 37: "RD1" should read --$\overline{RD1}$-- |
| Column 38, | line 5: "is" should read --in-- |
| | line 9: "RD1" should read --$\overline{RD1}$-- |
| | line 18: "RD1" should read --$\overline{RD1}$-- |
| Column 40, | line 9: delete "and" |
| Column 46, | line 14 of Table VIII: before "(low limit temperature)" insert --TL-- |
| Column 49, | line 8: "cooperation" should read --operation-- |
| Column 51, | line 50: "steps" should read --step-- |
| Column 52, | line 19: "thrugh" should read --through-- |
| | line 62: after "688" insert --,-- |
| | line 63: after "determine" insert --if-- |
| Column 57, | line 32: after "While" insert --in-- |
| | line 68: "DCS=1(0.5" should read --DCS=1 (0.5-- |
| Column 58, | line 12: after "806" insert --,-- |
| | line 18: "vaues" should read --values-- |
| Column 59, | line 15: "cal" should read --call-- |
| | line 48: "seleced" should read --selected-- |
| Column 62, | line 50: "real-tine" should read --real-time-- |
| | line 61: "ensuring" should read --ensuing-- |
| Column 63, | line 60: "correspondiong" should read --corresponding-- |
| Column 64, | line 48: "preceeding" should read --proceeding-- |
| | line 62: after "311" insert --,-- |
| Column 66, | line 68: "If" should read --It-- |
| Column 67, | line 50: "program" should read --processing-- |
| | lines 64 & 65: after "memory" delete --,-- |
| Column 69, | line 40: "real time" should read --real-time-- |
| | line 59: "If" should read --if-- |
| Column 70, | line 1: "is" (second occurrence) should read --in-- |
| | line 55: "de-selecting" should read --de-selected-- |
| Column 72, | line 7: delete "is" |

UNITED STATES PATENT AND TRADEMARK OFFICE
CERTIFICATE OF CORRECTION

PATENT NO. : 4,354,241
DATED : October 12, 1982
INVENTOR(S) : Lawrence J. Barello It is certified that error appears in the above—identified patent and that said Letters Patent is hereby corrected as shown below:

Column 73, line 13: "off-state" should read --off state--
Column 74, line 4: "comprator" should read --comparator--
Column 76, line 34: after "representing" insert --,--

Signed and Sealed this

Twenty-ninth Day of June, 1993

Attest:

MICHAEL K. KIRK

Attesting Officer   Acting Commissioner of Patents and Trademarks